(12) United States Patent
Katagi et al.

(10) Patent No.: US 7,957,527 B2
(45) Date of Patent: *Jun. 7, 2011

(54) CRYPTOGRAPHIC PROCESSING APPARATUS

(75) Inventors: Masanobu Katagi, Kanagawa (JP); Toru Akishita, Tokyo (JP); Izuru Kitamura, Kanagawa (JP); Tsuyoshi Takagi, Hokkaido (JP)

(73) Assignee: Sony Corporation (JP)

( * ) Notice: Subject to any disclaimer, the term of this patent is extended or adjusted under 35 U.S.C. 154(b) by 443 days.

This patent is subject to a terminal disclaimer.

(21) Appl. No.: 11/791,283

(22) PCT Filed: Nov. 15, 2005

(86) PCT No.: PCT/JP2005/020967
§ 371 (c)(1),
(2), (4) Date: May 22, 2007

(87) PCT Pub. No.: WO2006/054559
PCT Pub. Date: May 26, 2006

(65) Prior Publication Data
US 2007/0291937 A1 Dec. 20, 2007

(30) Foreign Application Priority Data
Nov. 22, 2004 (JP) ................. P2004-337186

(51) Int. Cl.
*H04L 9/28* (2006.01)
*H04L 9/30* (2006.01)
(52) U.S. Cl. .............. 380/44; 380/30; 713/168
(58) Field of Classification Search ................. None
See application file for complete search history.

(56) References Cited

OTHER PUBLICATIONS

Wollinger et al Elliptic and Hyperelliptic Curves on embedded IJP ACM Transactions on Embedded Systems, vol. 3, Aug. 2004, pp. 509-533.*
Grace Elias, Ali Miri, Tet Hin Yeap FPGA Design of HECC Coprocessors 2004 IEEE (hereinafter D2).*
Supplementary Partial European Search Report, EP 05 80 6900.
Neal Koblitz, et al., "Hyperelliptic Cryptosystems," Journal of Cryptology (1989), pp. 139-150.
David G. Cantor, "Computing in the Jacobian of a Hyperelliptic Curve," Mathematics of Computation, vol. 48, No. 177, Jan. 1987, pp. 95-101.
David Mumford, "Tata Lectures on Theta II", Progress in Mathematics, vol. 43, 1984.
Kazuto Matsuo, et al., "Fast Genus Two Hyperelliptic Curve Cryptosystems," The Institute of Electronics, Technical Report of IEICE, ISEC2001-31 (Jul. 2001), pp. 89-96.
Masashi Takahashi, "Improving Harley Algorithms for Jacobians of genus 3 Hyperelliptic Curves," SCIS 2002.

(Continued)

*Primary Examiner* — Nasser Moazzami
*Assistant Examiner* — Fatoumata Traore
(74) *Attorney, Agent, or Firm* — Lerner, David, Littenberg, Krumholz & Mentlik, LLP

(57) ABSTRACT

An apparatus and a method for performing a hyperelliptic curve cryptography process at a high speed in a highly secure manner are provided. A base point D is produced such that the base point D and one or more of precalculated data in addition to the base point used in a scalar multiplication operation based on a window algorithm are degenerate divisors with a weight smaller than genus g of a hyperelliptic curve. An addition operation included in the scalar multiplication operation based on the window algorithm is accomplished by performing an addition operation of adding a degenerate divisor and a non-degenerate divisor, whereby a high-speed operation is achieved without causing degradation in security against key analysis attacks such as SPA.

13 Claims, 14 Drawing Sheets

OTHER PUBLICATIONS

Tanja Lange, "Inversion-Free Arithmetic on Genus 2 Hyperelliptic Curves," Information-Security and Cryptography, Dec. 8, 2002, pp. 1-7.

Hiroki Sugizaki, et al, "An Extension of Harley Addition Algorithm for Hyperelliptic Curves over Finite Fields of Characteristic Two," The Institute of Electronics, Technical Report of IEICE, ISEC2002-9 (May 2002), pp. 49-56.

Tanja Lange, "Efficient Arithmetic on Genus 2 Hyperelliptic Curves Over Finite Fields via Explicit Formulae," Information-Security and Cryptography, Dec. 15, 2003, pp. 1-13.

Junichi Kuroki, et al., "Fast Genus Three Hyperelliptic Curve Cryptosystems," SCIS 2002.

Jan Pelzl, et al., Hyperelliptic Curve Cryptosystems: Closing the Performance Gap to Elliptic Curves (Update), Department of Electrical Engineering and Information Sciences, 2003/026, IACR, 2003, pp. 1-15.

Yosuke Miyamoto, et al., "A Fast Addition Algorithm of Genus Two Hyperelliptic Curves," SCIS, 2002.

Naoyuki Takahashi, et al., Efficient exponentiation on Genus Two Hyperelliptic Curves (II), The Institute of Electronics, IT2002-87, ISEC2002-145, 2003.

Tanja Lange, "Weighted Coordinates on Genus 2 Hyperelliptic Curves," Information-Security and Cryptography, Oct. 11, 2002, pp. 1-20.

Koh-ichi Nagao, "Improving Group Law Algorithms for Jacobians of Hyperelliptic Curves," ANTS-IV, LNCS 1838, pp. 439-448, Springer-Verlag, 2000, pp. 439-447.

Paul C. Kocher, "Timing Attacks on Implementations of Diffie-Hellman, RSA, DSS, and Other Systems," CRYPTO '96, LNCS 1109, pp. 104-113.

Paul Kocher, et al., "Differential Power Analysis," CRYPTO '99, LNCS 1666, pp. 388-397, Springer-Verlag, 1999.

Jean-Sebastion Coron, "Resistance against Differential Power Analysis for Elliptic Curve Cryptosystems," CHES '99, LNCS 1717, pp. 292-302.

Katsuyuki Okeya, et al., "Secure and Fast Elliptic Scalar Multiplication basend on wNAF," The Institute of Electronics, Technical Report of IEICE, ISEC2003-9 (May 2003), pp. 49-56.

Masanobu Katagi, et al., "Novel Efficient Implementations of Hyperelliptic Curve Cryptosystems using Degenerate Divisors", Report 2003/203, pp. 1-18.

* cited by examiner

CRYPTOGRAPHIC PROCESSING APPARATUS

CROSS REFERENCE TO RELATED APPLICATIONS

The present application is a national phase entry under 35 U.S.C. §371 of International Application No. PCT/JP2005/020967 filed Nov. 15, 2005, which claims priority from Japanese Provisional Patent Application No. P2004-337186 filed Nov. 22, 2004.

TECHNICAL FIELD

The present invention relates to a cryptographic processing method, a cryptographic processing apparatus, and a computer program. More particularly, the present invention relates to a cryptographic processing method, an encryption apparatus, and a computer program, which allow high-speed processing of a scalar multiplication operation in a hyperelliptic curve cryptography process.

BACKGROUND ART

With increasing progress and popularity of network communications and e-commerce in recent years, it has become very important to achieve high security. One method to achieve high security is to use encryption in communication, and many encryption techniques are known.

For example, there is a known system in which a cryptographic processing module is disposed in a small-sized apparatus such as an IC card whereby, when data is transmitted between the IC card and a data reader/writer, processing including authentication and encryption/decryption of data is performed.

IC cards having a capability of performing cryptographic processing are widely used. For example, such IC cards are used to pass through entrance gates of stations, to perform payment in shopping centers, etc. In many applications of IC cards, there is an increasing demand for reduction in size and increase in processing speed.

Cryptography methods are categorized into two types: common key cryptography and public key cryptography. The common key cryptography is also called symmetric key cryptography. In the common key cryptography, a sender and a receiver both have a common key. A specific example of a common key cryptography technique is that using a DES (Data Encryption Standard) algorithm. In the DES algorithm, encryption and decryption can be accomplished in substantially the same manner.

In the public key cryptography (also called asymmetric key cryptography), in contrast to the common key cryptography, different keys are used by a sender and a receiver. Compared with the common key cryptography in which a common key is used in both encryption and decryption, the public key cryptography is advantageous in that only one specific person needs to have a secret key which must be kept secret and thus it is easy to manage the secret key. However, the public key cryptography is low in processing speed compared with the common key cryptography. Because of the low processing speed, the public key cryptography is generally used in applications which deal with only small data size, such as transmission of a secret key, digital signature, etc. Specific examples of public-key cryptography is RSA (Rivest-Shamir-Adleman) cryptography and ECC (Elliptic Curve Cryptography).

In the elliptic curve cryptography, encryption is performed using an elliptic curve $y^2=x^3+ax+b$ ($4a^3+27b^2 \neq 0$) on a prime field or an elliptic curve $y^2+xy=x^3+ax^2+b$ ($b \neq 0$) on an extension field of 2. If a point (O) at infinity is added to a set of points on such a curve, the resultant set forms a finite group with respect to addition, and the point (O) at infinity is an element of the finite group. The operation of addition over the finite group is denoted by +. Addition of two points P and Q on the finite group, that is, P+Q, is referred to as "addition of points", and addition of point P and point P, P+P=2P, is referred to as "doubling of a point". An operation of repeatedly adding of point P k times such that P+P+ . . . +P=kP is referred to as "scalar multiplication of a point".

It is known that scalar multiplication of a point can be accomplished by addition of points and doubling of a point. Details of addition, doubling, and scalar multiplication of points on an elliptic curve over a prime field or points on an elliptic curve over an extension field of degree 2 in an affine coordinate system (x, y) or a projective coordinate system (X, Y, Z) are described in IEEE P1363/D13 Standard Specifications for Public Key Cryptography.

Koblitz and Cantor have proposed hyperelliptic curve cryptography (HECC) which is generalization of the elliptic curve cryptography. Descriptions of the hyperelliptic curve cryptography can be found, for example, in Non-Patent Document 1 and Non-Patent Document 2.

In the elliptic curve cryptography, when a point P on an elliptic curve defined over a finite field $F_q$ is given, if a point Q=kP (k∈Z), that is, a point obtained by multiplying point P by a scalar k is further given, it is known that a problem of finding k for the given point Q reduces to a discrete logarithm problem. On the other hand, in the case of public key cryptography based on the hyperelliptic curve cryptography, when a divisor $D_1$ which is a formal sum of points and a divisor $D_2$ obtained by multiplying $D_1$ by a scalar k are given, a problem of finding k from $D_2$ reduces to a discrete logarithm problem on a Jacobian variety of a hyperelliptic curve.

A hyperelliptic curve is characterized by a genus g. When $q=p^n$ where p is a prime and n is a positive integer, a hyperelliptic curve C of genus g defined over a finite field $F_q$ is defined by the following equation:

$$y^2+h(x)y=f(x)$$

where h(x), f(x)∈$F_q$[x], and f(x) is a monic polynomial of degree 2g+1.

A point −P opposite to the point P=(x, y) on the hyperelliptic curve C is defined by (x, y+h(x)). When P=−P, this point P is called a ramification point.

It is known that in the hyperelliptic curve cryptography, a security level comparable to that obtained by the elliptic curve cryptography can be achieved by a field of definition of a hyperelliptic curve with a processing size which is 1/g times that of the elliptic curve. This small processing size provides a great merit in implementation of the hyperelliptic curve cryptography, which is one of the advantages of the hyperelliptic curve cryptography.

Fundamental matters of the hyperelliptic curve cryptography are explained. In the hyperelliptic curve cryptography, as described above, when a divisor $D_1$ which is a formal sum of points and a divisor $D_2$ obtained by multiplying $D_1$ by a scalar k are given, a problem of finding k from $D_2$ reduces to a discrete logarithm problem on a Jacobian variety of a hyperelliptic curve, and this problem can be applied to public key cryptography.

The divisors can be expressed in the following form:
[Mathematic Expression 1]

$$D = \sum_i m_i P_i - \left(\sum_i m_i\right) P_\infty, \quad m_i \geq 0$$

In the above expression, $P_i=(x_i, y_i)$, and $Pi \neq Pj$ when $i \neq j$. The divisor in this form is called a semi reduced divisor.

$\Sigma m_i$ is referred to as a weight of D. When the weight of a semi reduced divisor is equal to or smaller than the genus g, the semi reduced divisor is called a reduced divisor.

An arbitrary semi reduced divisor D on a Jacobian variety of a hyperelliptic curve can be expressed in a Mumford form $D=(U, V)$ using the following polynomials U and V (U, V $\in F_q$ [x]). A further detailed description of the Mumford expression may be found, for example, in Non-Patent Document 3.

$$U = \Pi(x-x_i)^{m_i}$$

$$V(x_i) = y_i$$

$$V(x)^2 + V(x)h(x) - f(x) \equiv 0 \bmod U(x), \deg V < \deg U$$

[Mathematic Expression 2]

An arbitrary reduced divisor D of genus 2 can be expressed in the Mumford form using a set of polynomials of degree 2 or less whose coefficients are elements of the finite field $F_q$, as follows:

$$(U, V) = (x^2 + u_1 x + u_0, v_1 x + v_0)$$

An arbitrary reduced divisor D of genus 3 can be expressed in the Mumford form using a set of polynomials of degree 3 or less whose coefficients are elements of the finite field $F_q$, as follows:

$$(U, V) = (x^3 + u_2 x^2 + u_1 x + u_0, v_2 x^2 + v_1 x + v_0)$$

In the following description, it is assumed that the divisor D is a reduced divisor unless otherwise specified. Note that, as described above, the reduced divisor is a semi reduced divisor with a weight equal to or smaller than genus g.

Of reduced divisors, those other than a divisor with a weight equal to genus g, that is, reduced divisors having a weight smaller than genus g, are called degenerate divisors.

For example, when genus g=2, degenerate divisors are divisors with a weight equal to 1, and when genus g=3, degenerate divisors are divisors with a weight equal to 1 or 2.

For genus g=2 and for genus g=3, respectively, degenerate divisors can be represented using the Mumford expresses as follows:

(a) degenerate divisors of genus 2 (weight of 1): $(U, V) = (x+u, v)$ (b) degenerate divisors of genus 3 (weight of 1): $(U, V) = (x+u_0, v_0)$ (c) degenerate divisors of genus 3 (weight of 2): $(U, V) = (x^2+u_1 x+u_0, v_1 x+v_0)$ Scalar multiplication of a divisor used in the hyperelliptic curve cryptography is explained below. Scalar multiplication of a divisor can be accomplished by a combination of addition of divisors and doubling of the divisor. This algorithm is called an addition algorithm. Some examples of addition algorithms are explained below.

A first proposed practical algorithm is known as a Cantor algorithm. A detailed description of the Cantor algorithm may be found, for example, in Non-Patent Documents 1 and 2. This Cantor algorithm is applicable to a divisor on a hyperelliptic curve of any genus. However, the Cantor algorithm has a disadvantage that, compared with an elliptic curve, the Cantor algorithm is complicated and needs a great amount of calculation.

Harley has proposed an algorithm in which hyperelliptic curves are limited to those of genus 2, and calculation is performed differently in an optimized manner depending on the weight of divisors thereby minimizing the amount of calculation. The proposal of this algorithm by Harley has stimulated further research on the calculation algorithm of the hyperelliptic curve cryptography (HECC) to achieve further improvement or extension.

In the Harley algorithm, a prime field is given as the field of definition, the curve is of genus=2, and divisors are expressed in the Mumford form. Examples of improvements in terms of the amount of calculation of the algorithm may be found, for example, in Non-Patent Document 4, Non-Patent Document 5, and Non-Patent Document 6. Examples of an algorithm extended to the case where an extension field of degree of 2 is given as the field of definition may be found, for example, in Non-Patent Document 7 and Non-Patent Document 8. Examples of extension of the Harley algorithm to genus 3 may be found, for example, in Non-Patent Document 9 and Non-Patent Document 10. Examples of reducing the amount of calculation by expressing divisors in the extended Mumford expression or using the weighted coordinates may be found, for example, in Non-Patent Document 11, Non-Patent Document 12, Non-Patent Document 6, and Non-Patent Document 13.

The Harley algorithm is explained below with reference to FIGS. 1 and 2. FIG. 1(A) shows an example of a process of addition $D_1 + D_2$ for the case of genus 2. In this example, it is assumed that divisors $D_1$ and $D_2$ are respectively given as $D_1 = (U_1, V_1)$ and $D_2 = (U_2, V_2)$. First, a calculation mode is selected depending on the weight of divisors. More specifically, one of calculation modes is selected depending on the weights of the respective divisors $D_1$ and $D_2$ as follows.

(1) weight=2 for $D_1$, weight=2 for $D_2$ (2) weight=2 for $D_1$, weight=1 for $D_2$ (3) exception handling 1

In the case where divisors with weight=2 are added together, that is, in the case of (1) weight=2 for $D_1$ and weight=2 for $D_2$, if the greatest common divisor gcd($U_1$, $U_2$)=1 for the divisors $D_1 = (U_1, V_1)$ and $D_2 = (U_2, V_2)$, the two divisors $D_1 = (U_1, V_1)$ and $D_2 = (U_2, V_2)$ include neither a common point nor opposite points. In this case, addition is performed according to the Harley algorithm. This addition process is denoted as follows:

(1a) HarleyADD

In the technique disclosed in Non-Patent Document 7, this process (1a) HarleyADD is called a Most-Frequent-Case process, because this process is performed most frequently in the addition of $D_1 + D_2$ for the case of genus of 2.

A specific process of HarleyADD performed as the Most-Frequent-Case process for genus 2 is shown below in [Table 1].

[Mathematic Expression 3]

TABLE 1

HarleyADD(genus 2)
Input: $D_1 = (u_1, v_1)$, deg $u_1 = 2$, $D_2 = (u_2, v_2)$, deg $u_2 = 2$
Output: $D_3 = (u_3, v_3) = D_1 + D_2$

| | | |
|---|---|---|
| 1 | Compute r = res($u_1, u_2$): <br> $w_1 \leftarrow u_{11} + u_{21}$, $w_0 \leftarrow u_{21}w_1 + u_{10} + u_{20}$, $r \leftarrow (u_{10} + u_{20})w_0 + u_{20}w_1^2$, | 4M |
| 2 | Compute $I = i_1 x + i_0 \equiv r u_1^{-1} \bmod u_2$ <br> $i_1 \leftarrow w_1$, $i_0 \leftarrow w_0$; | |
| 3 | Compute $T = t_1 x + t_0 \equiv (v_1 + v_2)I \bmod u_2$: <br> $t_2 \leftarrow (v_{11} + v_{21})w_1$, $t_0 \leftarrow (v_{10} + v_{20})w_0$, <br> $t_1 \leftarrow (v_{11} + v_{21} + v_{10} + v_{20})(w_0 + w_1) + t_2 + t_0$, <br> $t_1 \leftarrow t_1 + t_2 u_{21}$, $t_0 \leftarrow t_0 + t_2 u_{20}$; | 5M |
| 4 | If $t_1 = 0$ then call exceptional procedure. | |
| 5 | Compute $S = s_1 x + s_0$: <br> $w_2 \leftarrow (rt_1)^{-1}$, $w_3 \leftarrow w_2 r$, $w_4 \leftarrow w_2 t_1$, $w_5 \leftarrow w_3 r$, $s_1 \leftarrow w_4 t_1$, $s_0 \leftarrow w_4 t_0$; | 1I + 6M |
| 6 | Compute $u_3 = x^2 + u_{31}x + u_{30} = s_1^{-2}(f + h(Su_1 + v_1) + (Su_1 + v_1)^2)/u_1 u_2$: <br> $u_{31} \leftarrow w_1 + w_5(1 + w_5)$, $u_{30} \leftarrow u_{21}w_1 + u_{10} + u_{20} + w_5(s_0 + s_0^2 + w_1)$; | 5M |
| 7 | Compute $v_3 = v_{31}x + v_{30} \equiv Su_1 + v_1 + h \bmod u_3$: <br> $w_1 \leftarrow u_{11} + u_{31}$, $w_0 \leftarrow u_{10} + u_{30}$, $w_2 \leftarrow s_1 w_1$, $w_3 \leftarrow s_0 w_0$, <br> $w_4 \leftarrow (s_1 + s_0)(w_1 + w_0) + w_2 + w_3$, $w_2 \leftarrow w_2 + 1$, $w_1 \leftarrow w_4 + w_2 u_{31}$, <br> $w_0 \leftarrow w_3 + w_2 u_{30}$, $v_{31} \leftarrow w_1 + v_{11} + h_1$, $v_{30} \leftarrow w_0 + v_{10} + h_0$; | 5M |
| total | HarleyADD | 1I + 25M |

The probability of occurrence of the process of (1a) HarleyADD is very high, while the probability of occurrence of exception handling is very low. In the case where the condition of the Most Frequent Case is not satisfied that is, in the case where the greatest common divisor gcd($U_1, U_2$)≠1 for the divisors $D_1 = (U_1, V_1)$ and $D_2 = (U_2, V_2)$, exception handling is performed. The exception handling process performed in this case is denoted as follows:

(1b) Exception Handling 2

In the case of (2) weight=2 for $D_1$ and weight=1 for $D_2$, determination is made as to whether gcd($U_1, U_2$)=1. If it is determined that gcd($U_1, U_2$)=1, then the following process is performed.

(2a) ExHarADD$^{2+1 \rightarrow 2}$

However, if it is determined that gcd($U_1, U_2$)≠1, then the following exception handling is performed.

(2b) Exception Handling 3

The algorithm of (2a) ExHarADD$^{2+1 \rightarrow 2}$ is described in Non-Patent Document 8. A specific process of ExHarADD$^{2+1 \rightarrow 2}$ is shown below in [Table 3].

[Mathematic Expression 4]

(3) If it is determined that the weights satisfy neither (1) nor (2), then the exception process (3) is performed.

FIG. 1(B) shows an example of a doubling operation process for genus=2. The doubling operation is an operation to determine D+D=2D. The doubling operation is performed in a different mode depending on which one of values described below is assigned to the weight of the divisor D.

(4) weight=2

(5) weight=1

(6) weight=0

(4) When weight=2, it is checked whether the divisor includes a ramification point. If it is determined that the divisor includes no ramification point, then (4a) HarleyDBL is performed. On the other hand, if the divisor includes a ramification point, then (4b) exception process 6 is performed.

In Non-Patent Document 7, it is described that the process (4a) HarleyDBL occurs most frequently. A specific process of HarleyDBL is shown below in [Table 2].

TABLE 3

ExHarADD$^{2+1 \rightarrow 2}$ (genus 2)
Input: $D_1 = (u_1, v_1)$, deg $u_1 = 1$, $D_2 = (u_2, v_2)$, deg $u_2 = 2$
Output: $D_3 = (u_3, v_3) = D_1 + D_2$

| | | |
|---|---|---|
| 1 | Compute $r \equiv u_2 \bmod u_1$ <br> $r \leftarrow u_{20} + (u_{21} + u_{10})u_{10}$. | 1M |
| 2 | Compute inverse of $u_2 \bmod u_1$: <br> inv $\leftarrow 1/r$. | 1I |
| 3 | Compute $s_0 = \text{inv}(v_1 + v_2) \bmod u_1$: <br> $s_0 \leftarrow \text{inv}(v_{10} + v_{20} + v_{21}v_{10})$. | 2M |
| 4 | Compute $l = s \cdot u_2 = s_0 x^2 + l_1 x + l_0$: <br> $l_1 \leftarrow s_0 u_{21}$, $l_0 \leftarrow s_0 u_{20}$. | 2M |
| 5 | Compute $k = (f + v_2 h + v_2^2)/u_2 = x^3 + k_2 x^2 + k_1 x + k_0$: <br> $k_2 \leftarrow f_4 + u_{21}$, $k_1 \leftarrow f_3 + (f_4 + u_{21})u_{21} + v_{21} + u_{20}$. | 1M |
| 6 | Compute $u_3 = (k + s(l + h))/u_1 = x^2 + u_{31} x + u_{30}$: <br> $u_{31} \leftarrow k_2 + s_0^2 + s_0 + u_{10}$, <br> $u_{30} \leftarrow k_1 + s_0(l_1 + h_1) + u_{10}u_{31}$. | 3M |
| 7 | Compute $v_3 = v_{31}x + v_{30} \equiv (l + v_2) + h \bmod u_3$: <br> $v_{31} \leftarrow u_{31}(h_2 + s_0) + (h_1 + l_1 + v_{21})$, <br> $v_{30} \leftarrow u_{30}(h_2 + s_0) + (h_0 + l_0 + v_{20})$. | 2M |
| total | ExHarADD$^{2+1 \rightarrow 2}$ | 1I + 11M |

[Mathematic Expression 5]

TABLE 2

HarleyDBL(genus 2)
Input: $D_1 = (u_1, v_1)$, deg $u_1 = 2$
Output: $D_3 = (u_3, v_3) = 2D_1$

| | | |
|---|---|---|
| 1 | Compute $r = \text{res}(u_1, h)$:<br>$w_1 \leftarrow h_1 + u_{11}, w_0 \leftarrow h_0 + u_{10} + u_{11}w_{11}, r \leftarrow u_{10}(u_{10} + h_0 + h_1w_1) + h_0w_0;$ | 4M |
| 2 | Compute $I = i_1 x + i_0 \equiv rh^{-1} \bmod u_1$<br>$i_1 \leftarrow w_1, i_0 \leftarrow w_0;$ | |
| 3 | Compute $T = t_1 x + t_0 \equiv I(f + hv_1 + v_1^2)/u_1 \bmod u_1$:<br>$w_2 \leftarrow f_3 + v_{11} + u_{11}^2, w_3 \leftarrow v_{10} + v_{11}(v_{11} + h_1),$<br>$t_1 \leftarrow w_0w_2 + w_1w_3, t_0 \leftarrow (u_{11}w_0 + u_{10}w_1)w_2 + w_0w_3;$ | 8M |
| 4 | If $t_1 = 0$ then call exceptional procedure. | |
| 5 | Compute $S = s_1 x + s_0$:<br>$w_0 \leftarrow (rt_1)^{-1}, w_2 \leftarrow w_0r, w_3 \leftarrow w_0t_1, w_4 \leftarrow w_2r, s_1 \leftarrow w_3t_1, s_0 \leftarrow w_3t_0;$ | 1I + 6M |
| 6 | Compute $u_3 = x^2 + u_{31}x + u_{30} = s_1^{-2}(f + h(Su_1 + v_1) + (Su_1 + v_1)^2)/u_1^2$:<br>$u_{31} \leftarrow w_4(1 + w_4), u_{30} \leftarrow w_4(w_4(s_0(1 + s_0)) + w_1);$ | 4M |
| 7 | Compute $v_3 = v_{31}x + v_{30} \equiv Su_1 + v_1 + h \bmod u_3$:<br>$w_1 \leftarrow u_{11} + u_{31}, w_0 \leftarrow u_{10} + u_{30}, w_2 \leftarrow s_1w_1, w_3 \leftarrow s_0w_0,$<br>$w_4 \leftarrow (s_1 + s_0)(w_1 + w_0) + w_2 + w_3, w_2 \leftarrow w_2 + 1, w_1 \leftarrow w_4 + w_2u_{31},$<br>$w_0 \leftarrow w_3 + w_2u_{30}, v_{31} \leftarrow w_1 + v_{11} + h_1, v_{30} \leftarrow w_0 + v_{10} + h_0;$ | 5M |
| total | HarleyDBL | 1I + 27M |

The addition operation and the doubling operation for genus=3 are described below with reference to FIG. 2. The basic idea of the process for genus=2 can be applied to the case of genus=3. However, in the case of genus=3, the weight of the divisor can be up to 3, and thus there are much greater number of modes than in the case of genus=2.

In the addition operation shown in FIG. 2(A), when divisors $D_1=(U_1, V_1)$ and $D_2=(U_2, V_2)$ are given, an operation mode is selected depending on the weights of the divisors. More specifically, the operation mode is determined depending on the weights of the respective divisors $D_1$ and $D_2$ as follows.

(1) weight=3 for $D_1$, weight=3 for $D_2$
(2) weight=3 for $D_1$, weight=2 for $D_2$
(3) weight=3 for $D_1$, weight=1 for $D_2$
(4) Exception Process 7

In the case of (1) weight=3 for $D_1$ and weight=3 for $D_2$, if the greatest common divisor gcd($U_1$, $U_2$)=1 for the divisors $D_1=(U_1,V_1)$ and $D_2=(U_2,V_2)$, then the following operation is performed.

(1a) HarleyADD

This operation occurs most frequently in the addition operation for genus=3.

A further detailed description of the operation of HarleyADD, which is a most-frequent-case operation in the addition operation for genus=3, can be found, for example, in Non-Patent Document 9 and Non-Patent Document 10. An algorithm of HarleyADD, which is a most-frequent-case operation in the addition operation for genus=3, is shown below in [Table 4].

[Mathematic Expression 6]

TABLE 4

HarleyADD(genus 3)
Input: $D_1 = (u_1, v_1)$, deg $u_1 = 3$, $D_2 = (u_2, v_2)$, deg $u_2 = 3$
Output: $D_3 = (u_3, v_3) = D_1 + D_2$

| | | |
|---|---|---|
| 1 | Compute $r = \text{res}(u_1, u_2)$: | 14M |
| 2 | Compute almost, inverse $\text{inv} \equiv r/u_1 \bmod u_2$: | 4M |
| 3 | Compute $s' \equiv rs \equiv \text{inv}(v_1 + v_2) \bmod u_2$: | 11M |

TABLE 4-continued

HarleyADD(genus 3)
Input: $D_1 = (u_1, v_1)$, deg $u_1 = 3$, $D_2 = (u_2, v_2)$, deg $u_2 = 3$
Output: $D_3 = (u_3, v_3) = D_1 + D_2$

| | | |
|---|---|---|
| 4 | Compute $s = (s'/r)$ and make s monic: | 1I + 8M |
| 5 | Compute $z = su_1$: | 6M |
| 6 | Compute $u_3 = (s(z + w_4h) - w_5(f + hv_1 + v^1)/u_1)/u_2$: | 16M |
| 7 | Compute $v_3 = -(w_3z + h + v_1) \bmod u_3$: | 8M |
| 8 | Compute $u_3 = (f + hv + v^2)/u_3$: | 8M |
| 9 | Compute $v_3 = v_{32}x^2 + v_{31}x + v_{30} \equiv v_3 + h \bmod u_3$: | 3M |
| total | HarleyADD | 1I + 78M |

In the case of (2) weight=3 for $D_1$ and weight=2 for $D_2$, if the greatest common divisor gcd($U_1$, $U_2$)=1 for the divisors $D_1=(U_1,V_1)$ and $D_2=(U_2,V_2)$, then the following operation is performed.

(2a) ExHarADD$^{3+2\to3}$ if the greatest common divisor gcd($U_1$, $U_2$)≠1, then the following exception handling is performed.

(2b) Exception Handling 9

In the case of (3) weight=3 for $D_1$ and weight=1 for $D_2$, if the greatest common divisor gcd($U_1$, $U_2$)=1 for the divisors $D_1=(U_1,V_1)$ and $D_2=(U_2,V_2)$, then the following operation is performed.

(3a) ExHarADD$^{3+1\to3}$

If the greatest common divisor gcd($U_1$, $U_2$)≠1, then the following exception handling is performed.

(3b) Exception Handling 10

Although algorithms for the respective operations are not explicitly described in published documents, papers, or the like, formulae can be written as described below for the case where field of definition is $F_{2^n}$. That is, algorithms for ExHarADD$^{3+1\to3}$ and ExHarADD$^{3+2\to3}$ are shown below in [Table 6] and [Table 7]

[Mathematic Expression 7]

TABLE 6

ExHarADD$^{3+1\to3}$ (genus 3)
Input: $D_1 = (u_1, v_1)$, deg $u_1 = 3$, $D_2 = (u_2, v_2)$, deg $u_2 = 1$
Output: $D_3 = (u_3, v_3) = D_1 + D_2$

| | | |
|---|---|---|
| 1 | Compute $r = \text{res}(u_1, u_2)$:<br>$w_0 \leftarrow u_{20}^2$, $w_1 \leftarrow w_0(u + 12 + u_{20})$, $w_2 \leftarrow u_{20}u_{11}$, $r \leftarrow w_1 + w_2 + u_{10}$. | 3M |
| 2 | Compute inverse of $u_1$ mod $u_2$:<br>inv $\leftarrow 1/r$. | 1I |
| 3 | Compute $s_0 = \text{inv}(v_1 + v_2)$ mod $u_2$:<br>$z_0 \leftarrow w_0v_{12}$, $s_0 \leftarrow \text{inv}(v_{10} + v_{20} + v_{20}v_{11} + z_0)$. | 3M |
| 4 | Compute $u_3 = (f + hv + v^2)/(u_1u_2)$, $v = s_0u_1 + v_1$:<br>$u_{32} \leftarrow s_0^2 + s_0 + u_{20} + u_{12} + f_0$<br>$t_0 \leftarrow f_6 + s_0^2 + u_{12}$, $t_1 \leftarrow u_{12}t_0$, $t_2 \leftarrow u_{20}u_{32}$, $t_3 \leftarrow h_2s_0$,<br>$u_{31} \leftarrow t_1 + t_2 + t_3 + u_{11} + v_{12} + f_5$,<br>$t_4 \leftarrow u_{20}(t_6 + v_{12} + f_5 + t_3 + u_{11})$, $t_5 \leftarrow v_{12}(v_{12} + u_{12} + h_2)$,<br>$t_6 \leftarrow u_{12}(u_{12}(f_6 + u_{12}) + f_5)$,<br>$u_{30} \leftarrow w_0u_{32} + t_4 + t_5 + u_{12}t_0 + s_0h_1 + t_0 + u_{10} + f_4 + v_{11}$, | 12M |
| 5 | Compute $v_3 = v_{32}x^2 + v_{31}x + v_{30} \equiv s_0u_1 + v_1 + h$ mod $u_3$:<br>$v_{32} \leftarrow v_{12} + h_2 + s_0(u_{12} + u_{32}) + u_{32}$:<br>$v_{31} \leftarrow v_{11} + h_2 + s_0(u_{11} + u_{31}) + u_{31}$:<br>$v_{30} \leftarrow v_{10} + h_2 + s_0(u_{10} + u_{30}) + u_{30}$: | 3M |
| total | ExHarADD$^{3+1\to3}$ | 1I + 21M |

[Mathematic Expression 8]

TABLE 7

ExHarADD$^{1+2\to3}$, ExHarADD$^{1+2\to2}$ (genus 3)
Input: $D_1 = (u_1, v_1)$, deg $u_1 = 3$, $D_2 = (u_2, v_2)$, deg $u_2 = 2$
Output: $D_3 = (u_3, v_3) = D_1 + D_2$

| | | |
|---|---|---|
| 1 | Compute $r = \text{res}(u_1, u_2)$:<br>$w_0 \leftarrow u_{20}^2$, $w_1 \leftarrow u_{11}^2$, $w_2 \leftarrow u_{21}^2$, $w_3 \leftarrow u_{12} + u_{21}$.<br>$w_4 \leftarrow w_0(u_{20} + u_{12}w_3)$, $w_5 \leftarrow u_{21}(u_{10} + u_{11}w_3)$, $w_5 \leftarrow u_{20}(w_5 + w_1)$,<br>$w_6 \leftarrow w_3w_2 + u_{21}u_{11}$, $w_6 \leftarrow u_{10}(u_{10} + w_6)$, $r \leftarrow w_4 + w_5 + w_6$ | 11M |
| 2 | Compute $ru_1^{-1}$ mod $u_2 \equiv i_1x + i_0$:<br>$i_2 \leftarrow u_{21}u_{12}$, $i_3 \leftarrow u_{21}u_{11}$, $i_4 \leftarrow u_{20}u_{12}$,<br>$i_1 \leftarrow i_2 + w_2 + u_{20} + u_{11}$: $i_0 \leftarrow w_2w_3 + i_3 + i_4 + u_{10}$ | 4M |
| 3 | Compute $t \equiv t_1x + t_0 \equiv r(v_1 + v_2)u_1^{-1}$ mod $u_2$:<br>$c_1 \leftarrow v_{11} + v_{21} + v_{12}u_{21}$, $c_0 \leftarrow v_{20} + v_{10} + v_{12}u_{20}$,<br>$t_2 \leftarrow i_1c_1$, $t_3 \leftarrow i_0c_0$, $t1 = t_2u_{21} + (i_1 + i_0)(c_1 + c_0) + t_2 + t_3$,<br>$t_0 \leftarrow t_3 + t_2u_{20}$. | 7M |
| 4 | If $t_1 = 0$ then goto 5'. | |
| 5 | Compute $s = t/r \equiv s_1x + s_0$:<br>$z_1 \leftarrow rt_1$, $z_2 \leftarrow 1/z_1$, $z_3 \leftarrow z_2r$, $z_4 \leftarrow z_2t_1$, $z5 \leftarrow z_3r$, $s_1 \leftarrow z_4t_1$, $s_0 \leftarrow z_4t_0$. | 1I + 6M |
| 6 | Compute $v = su_1 + v_1 \equiv s_1x^4 + k_3x^3 + k_2x^2 + k_1x + k_0$:<br>$t_0 \leftarrow s_0u_{12}$, $t_1 \leftarrow s_0u_{10}$, $t_2 \leftarrow s_1u_{11}$,<br>$k_3 \leftarrow (s_1 + s_0)(1 + u_{12}) + s_1 + t_0$, $k_2 \leftarrow t_0 + t_2 + v_{12}$,<br>$k_1 \leftarrow (s_1 + s_0)(u_{11} + u_{10}) + t_2 + t_1 + v_{11}$, $k_0 \leftarrow t_1 + v_{10}$. | 5M |
| 7 | Compute $u_3 = s_1^{-2}(f + hv + v^2)/(u_1u_2)$:<br>$u_{32} \leftarrow z_5(z_5 + 1) + u_{12} + u_{21}$, $t_0 \leftarrow k_3^2$, $t_1 \leftarrow u_{12}^2$,<br>$t_2 \leftarrow z_5(z_5(f_6 + u_{12} + u_{21} + t_0 + k_3) + u_{21} + h_2 + u_{12})$,<br>$u_{31} \leftarrow i_2 + u_{11} + u_{20} + t_1 + w_2 + t_2$,<br>$t_3 \leftarrow (t_1 + w_2)(u_2l + u_12) + i_3 + i_4 + u_{10}$,<br>$t_4 \leftarrow i_2 + u_{20} + w_2 + u_{11} + t_1 + f_5 + (u_{21} + u_{12})(t_0 + f_6 + k_3) + k_2$,<br>$t_4 \leftarrow z_5(t_4 + k_3h_2) + h_2(u_{12} + u_{21}) + t_1 + w_2 + i_2 + u_{20} + u_{11} + h_1$, $t_4 \leftarrow z_5t_4$,<br>$u_{30} \leftarrow t_3 + t_4$. | 11M |
| 8 | Compute $v_3 = v_{32}x^2 + v_{31}x + v_{30} \equiv su_1 + v_1 + h$ mod $u_3$:<br>$t_0 \leftarrow s_0(u_{32} + u_{12})$, $t_1 \leftarrow s_1(u_{31} + u_{11})$, $t_2 \leftarrow s_1(u_{12} + u_{32})$.<br>$v_{32} \leftarrow t_0 + t_1 + t_2u_{32} + u_{32} = v_{12} + h_2$,<br>$t_4 \leftarrow s0(u_{30} + u_{10})$, $t_5 \leftarrow (s_1 + s_0)(u_{31} + u_{11} + u_{30} + u_{10})$,<br>$v_{31} \leftarrow t_5 + t_1 + t_4 + t_2u_{31} + u_{31} + v_{11} + h_1$,<br>$v_{30} \leftarrow t_4 + t_2u_{30} + u_{30} + v_{10} + h_0$, | 8M |
| total | ExHarADD$^{3+2\to3}$ | 1I + 52M |
| 5' | Compute $s = t_0/r \equiv s_0$:<br>$s_0 \leftarrow t_0/r$. | 1I + 1M |
| 6' | Compute $u_3 = x^2 + u_{31}x + u_{30} = (f + hv + v^2)/(u_1v_2)$:<br>$w_1 \leftarrow s_0^2$, $u_{31} \leftarrow u_{21} + u_{12} + w_1 + s_0$,<br>$u_{30} \leftarrow (w_1 + u_{12})(u_{21} + u_{12}) + (h_2 + u_{21})s_0 + w_0 + u_{20} + u_{11} + v_{12} + f_5$. | 3M |

TABLE 7-continued

ExHarADD$^{1+2\to 3}$, ExHarADD$^{1+2\to 2}$ (genus 3)
Input: $D_1 = (u_1, v_1)$, deg $u_1 = 3$, $D_2 = (u_2, v_2)$, deg $u_2 = 2$
Output: $D_3 = (u_3, v_3) = D_1 + D_2$

| | | |
|---|---|---|
| 7' | Compute $v_3 = v_{31}x + v_{30} \equiv s_0 u_1 + v_1 + h \mod u_3$: | 6M |
| | $v_{31} \leftarrow (u_{30} + u_{31}(u_{31} + u_{12}) + u_{11})s_0 + u_{31}(u_{31} + h_2 + v_{12}) + u_{30} + h_1 + v_{11}$, | |
| | $v_{30} \leftarrow (u_{10} + u_{30}(u_{31} + u_{12}))s_0 + u_{30}(u_{31} + h_2 + v_{12}) + v_{10} + h_0$. | |
| total | ExHarADD$^{3+2\to 2}$ | 1I + 32M |

FIG. 2(B) shows an example of a doubling operation process for genus=3. The doubling operation is an operation to determine D+D=2D. The doubling operation is performed in a different mode depending on which one of values described below is assigned to the weight of the divisor D.

(4) weight=3
(5) weight=2
(6) weight=1
(7) weight=0

(4) When weight=3, it is checked whether the divisor includes a ramification point. If it is determined that the divisor includes no ramification point, then (4a) HarleyDBL is performed. On the other hand, if the divisor includes a ramification point, then (4b) exception process 11 is performed.

In Non-Patent Document 9 or 10, it is described that the process (4a) HarleyDBL occurs most frequently. A specific process of HarleyDBL is shown below in [Table 5].
[Mathematic Expression 9]

TABLE 5

HarleyDBL(genus 3)
Input: $D_1 = (u_1, v_1)$, deg $u_1 = 3$
Output: $D_3 = (u_3, v_3) = 2D_1$

| | | |
|---|---|---|
| 1 | Compute $r = \text{res}(u_1, h)$: | 15M |
| 2 | Compute almost inverse $\text{inv} = r/h \mod u_1$: | 4M |
| 3 | Compute $z = (f + hv_1 + v_1^2)/u_1 \mod u_1$: | 12M |
| 4 | Compute $s' = z \cdot \text{inv} \mod u_1$: | 11M |
| 5 | Compute $s = (s'/r)$ and make s monic: | 1I + 8M |
| 6 | Compute $G = su_1$: | 6M |
| 7 | Compute $u' = s_1^{-2}[(G + w_4 v_1)^2 + w_4 hG + w_5(hv_1 + f)]$: | 6M |
| 8 | Compute $v' = Gw_3 + h + v_1 \mod u'$: | 8M |
| 9 | Compute $u_3 = (f + hv + v^2)/u'$: | 8M |
| 10 | Compute $v_3 = v' + h \mod u_3$: | 3M |
| total | HarleyDBL | 1I + 81M |

The operations of HarleyADD and HarleyDBL for both genus=2 and genus=3 are called most-frequent-case operations, because the probability of occurrence of these operations is very high when addition or doubling is performed for randomly generated divisors. A further detailed description of the fact that the operations of HarleyADD and HarleyDBL occur most frequently may be found, for example, in Non-Patent Document 14.

According to Non-Patent Document 14, the probability of occurrence of operations other than the most-frequent-case operations is $O(1/q)$ where q is the number of elements of the field of definition. In practical use of cryptography that provides a reasonably high security level, $q^g$ is as large as a value representable by about 160 bits, and thus only HarleyADD or HarleyDBL occurs in practical operations.

Therefore, in many cases, when the addition algorithm of the hyperelliptic curve cryptography (HECC) is implemented using the Harley algorithm or a modification thereto in cryptographic processing means such as an IC card, only HarleyADD and HarleyDBL are implemented, and the other exceptional operations which hardly occur are not performed. In this case, the exceptional operations may be performed, for example, in accordance an algorithm such as a Cantor algorithm which does not need selection of the mode depending on the weight. The processing load for the complicated exceptional operations increases with genus, as discussed in Non-Patent Document 9 or 10.

Scalar multiplication of a divisor according to the hyperelliptic curve cryptography (HECC) algorithm is explained below. In the hyperelliptic curve cryptography (HECC) algorithm, scalar multiplication of a divisor can be accomplished by a combination of hyperelliptic curve addition and hyperelliptic curve doubling. Two typical algorithms of the scalar multiplication are a binary algorithm and a double-and-add-always algorithm.

In the elliptic curve cryptography, as described above, when a point P on an elliptic curve defined over a finite field $F_q$ is given, if a point $Q=kP$ ($k \in Z$), that is, a point obtained by multiplying point P by a scalar k is further given, it is known that a problem of finding k for the given point Q reduces to a discrete logarithm problem. On the other hand, in the case of public key cryptography based on the hyperelliptic curve cryptography, when a divisor $D_1$ which is a formal sum of points and a divisor $D_2$ obtained by multiplying $D_1$ by a scalar k are given, a problem of finding k from $D_2$ reduces to a discrete logarithm problem on a Jacobian variety of a hyperelliptic curve, and this problem can be applied to public key cryptography.

The scalar value d given as the multiplier to be multiplied with the divisor D in the scalar multiplication operation (D=dD) is expressed in a binary form as follows.

$$d=(d_{l-1}, \ldots, d_0)$$

where $d_{l-1}=1$, $d_{l-2}, \ldots, _0=1$ or 0.

A basic algorithm of scalar multiplication based on the binary method is described below in [Algorithm 1].

[Mathematic Expression 10]

```
Binary Method (Algorithm1)
Input D₀
Output D = dD₀

D ← D₀
for i from l - 2 to 0
{
    D ← 2D    ||HarleyDBL doubling operation
    if dᵢ = 1 then D ← D + D₀    ||HarleyADD addition operation
}
return D
```

Next, a calculation algorithm based on the double-and-add-always method is described.

A method to know secret information by attacking a weak point of implementation of a cryptography technique is called side channel attack (SCA). Specific examples of SCA include timing attack (TA), simple power analysis (SPA), and differential power analysis (DPA). In the SCA, an attack is made by detecting a processing time of a process having a correlation to secret information. In power attach such as the SPA or DPA, an attack is made by detecting a correlation between secret information and power consumption. A further detailed description of the timing attach (TA) may be found, for example, in Non-Patent Document 15, and that of the power attack may be found, for example, in Non-Patent Document 16.

In the simple power analysis (SPA), secret information is revealed by directly detecting a waveform of power consumption dependent on bit information of a secret key. To enhance resistance of the cryptography algorithm against attack by the SPA, it is needed that the algorithm do not produce a correlation between bit information of the secret key and the power waveform. On the other hand, to increase resistance to the timing attack (TA), it is needed that the algorithm do not produce a correlation between bit information of the secret key and the processing time.

It is known that the double-and-add-always method can provide high resistance against the timing attack (TA) or the power attack (SPA) to the elliptic curve cryptography (ECC) or the hyperelliptic curve cryptography (HECC). A further detailed description of the resistance of the double-and-add-always method against the attack can be found in the Non-Patent Document 17. In the double-and-add-always algorithm, unlike the binary algorithm described above, a dummy addition is always performed so that the processing time or the power waveform does not vary depending on the bit value of the scalar multiplier d.

A basic algorithm of scalar multiplication based on the double-and-add-always method is described below in [Algorithm 2].

[Mathematic Expression 11]

```
Double-and-add-always Method (Algorithm2)
Input D₀
Output D = dD₀

D[0] ← D₀
for i from l - 2 to 0
{
    D[0] ← 2D[0]    ||HarleyDBL doubling operation
    D[1] ← D[0] + D₀    ||HarleyADD addition operation
    D[0] ← D[dᵢ]
}
return D[0]
```

Next, a process of producing a base point is described below. When scalar multiplication is used in cryptography, an input divisor $D_0$ can be categorized into two types:

(1) predetermined divisors (2) unpredictable divisors which occur randomly

When an input divisor is of the type (1), that is, a predetermined divisor, the input divisor is called a base point.

A general algorithm of producing a base point is described below.

(a)

First, g elements on the field of definition $F_q$ are selected at random, and g points $P_i$ (i=1, . . . , g) on a hyperelliptic curve are produced.

(a1) Let $x_i$ (i=1, . . . , g) denote the x coordinate of each if the elements randomly selected above. The y coordinate which is on the hyperelliptic curve and which corresponds to the x coordinate $x_i$ is determined for each element.

(b)

The base point is defined by a divisor $D_0=(U(x), V(x))$ where (b1) $U(x)=(x-x_1)(x-x_2) \ldots (x-x_g)$ (b2) $V(x)=v_{g-1}x^{g-1}+v_{g-2}x^{g-2}+ \ldots +v_0$ The coefficients $v_i$ of $V(x)=v_{g-1}x^{g-1}+v_{g-2}x^{g-2}+ \ldots +v_0$ are determined. For example, when there is no duplication in the produced points, $v_i$ can be determined from $V(x_i)=y_i$.

(c) The divisors produced in the above algorithm have a weight equal to g.

In the case where a predetermined divisor is employed as the divisor $D_0$ used as the base point in the scalar multiplication operation in the cryptographic process, the divisor used as the base point with a weight equal to g can be produced via steps (a) to (c) described above.

[Non-Patent Document 1] N. Koblitz, Hyperelliptic curve cryptosystems", J. Cryptology, vol. 1, No. 3, pp. 139-150,

[Non-Patent Document 2] D. G. Cantor, Computing in the Jacobian of hyperelliptic curve", Math. Comp., Vol. 48, No. 177, pp. 95-101, 1987

[Non-Patent Document 3] D. Mumford, Tata lectures on theta II", Progress in Mathematics, no. 43, Birkhauser, 1984

[Non-Patent Document 4] K. Matsuo, J. Chao, and S. Tsujii, Fast Genus two hyperelliptic curve cryptosystems", Technical Report ISEC2001-31, IEICE Japan, 2001

[Non-Patent Document 5] Improving Harley algorithms for Jacobians of genus 2 hyperelliptic curves", SCIS2002 (written in Japanese)

[Patent Document 6] T. Lange, Inversion-free arithmetic on genus 2 hyperelliptic curves", Cryptology ePrint Archive, 2002/147, IACR, 2002

[Patent Document 7] T. Sugizaki, K. Matsuo, J. Chao, and S. Tsujii, An extension of Harley addition algorithm for hyperelliptic curves over finite fields of characteristic two", ISEC2002-9, IEICE, 2001

[Patent Document 8] T. Lange, "Efficient arithmetic on genus 2 hyperelliptic curves over finite fields via explicit formulae", Cryptology ePrint Archive, 2002/121, IACR, 2002

[Patent Document 9] J. Kuroki, M. Gonda, K. Masuo, J. Chao and S. Tsujii, Fast genus three hyperellipitc curve cryptosystems", SCIS2002

[Patent Document 10] J. Pelzl, T. Wollinger, J. Guajardo, and C. Paar, Hyperelliptic curve Cryptosystems: Closing the Performance Gap to Elliptic Curves", Cryptology ePrint Archive, 2003/026, IACR, 2003

[Patent Document 11] Y. Miyamoto, H. Doi, K. Matsuo, J. Chao and S. Tsujii, A fast addition algorithm of genus two hyperelliptic curves", SCIS2002 (written in Japanese)

[Patent Document 12] N. Takahashi, H. Morimoto and A. Miyaji, Efficient exponentiation on genus two hyperelliptic curves (II)", ISEC2002-145, IEICE, 2003 (written in Japanese)

[Patent Document 13] T. Lange, Weighed coordinate on genus 2 hyperellipitc curve", Cryptology ePrint Archive, 2002/153, IACR, 2002

[Patent Document 14] N. Nagao, Improving group law algorithms for Jacobians of hyperelliptic curves", ANTS-IV, LNCS 1838, pp. 439-448, Springer-Verlag, 2000

[Patent Document 15] C. Kocher, "Timing Attacks on Implementations of Diffie-Hellman, RSA, DSS, and Other Systems", CRYPTO '96, LNCS 1109, pp. 104-113, 1996

[Patent Document 16] C. Kocher, J. Jaffe, and B. Jun, "Differential Power Analysis", CRYPTO '99, LNCS 1666, pp. 388-397, Springer-Verlag, 1999

[Patent Document 17] J.-S. Coron, "Resistance against Differential Power Analysis for Elliptic Curve Cryptosystems", CHES '99, LNCS 1717, pp. 292-302, Springer-Verlag, 1999

DISCLOSURE OF INVENTION

Problems to be Solved by the Invention

The elliptic curve cryptography (ECC) algorithm is in a phase in which it is practically used. In contrast, the hyperelliptic curve cryptography (HECC) algorithm, which is an extension of the elliptic curve cryptography (ECC) algorithm, is in a phase in which techniques to improve calculation speed, techniques to implement the algorithm, and other related techniques are under research and development. Although a considerable improvement in the processing speed of the scalar multiplication of the hyperelliptic curve cryptography (HECC) has been achieved, it is still lower than that of the elliptic curve cryptography (ECC), and there is a need for improvement in the processing speed.

In view of the above, it is an object of the present invention to provide a cryptographic processing method, a cryptographic processing apparatus, and a computer program, capable of performing a scalar multiplication operation associated with a process of hyperelliptic curve cryptography (HECC) at a high speed.

More specifically, it is an object of the present invention to provide a cryptographic processing method, a cryptographic processing apparatus, and a computer program, capable of performing a cryptographic process at a high speed in a highly secure manner by selecting, as a base point, a degenerate divisor with a weight smaller than the genus g of the hyperelliptic curve and performing a scalar multiplication operation using a window algorithm such that precalculated data used in the window algorithm are expressed using degenerate divisors and an addition operation in the scalar multiplication operation is accomplished in the form of an addition of a degenerate divisor and a non-degenerate divisor.

Still more specifically, it is an object of the present invention to provide a cryptographic processing method, a cryptographic processing apparatus, and a computer program, capable of performing a cryptographic process at a high speed in a highly secure manner by efficiently searching for a degenerate divisor D used as the base point on a curve of genus (g)=2 such that the base point D and 5D both have a weight=1, and performing a scalar multiplication operation using the window algorithm using precalculated degenerate divisors D and 5D, or by efficiently searching for a degenerate divisor D used as the base point on a curve of genus (g)=3 such that the base point D and 3D both have a weight=2, and performing a scalar multiplication operation using the window algorithm using precalculated degenerate divisors D and 3D.

Means for Solving the Problems

According to a first aspect of the present invention, there is provided a cryptographic processing method of performing a cryptographic processing operation based on hyperelliptic curve cryptography, comprising the steps of:

producing a base point such that the base point given as input divisor in a scalar multiplication operation based on the hyperelliptic curve cryptography and one or more of precalculated data, in addition to the base point, used in the scalar multiplication operation based on a window algorithm are degenerate divisors with a weight $g_0$ smaller than genus g of a hyperelliptic curve (where $1 \leq g_0 < g$);

producing precalculated degenerate divisor data used in the window algorithm from the base point produced in the base point producing step, such that the precalculated data includes only degenerate divisors; and performing the scalar multiplication operation based on the window algorithm using the precalculated degenerate divisor data produced in the precalculated degenerate divisor data producing step such that the scalar multiplication operation is accomplished by performing an addition operation of adding degenerate divisors including a precalculated degenerate divisor.

In an embodiment of the cryptographic processing method according to the present invention, the operation performing step includes the steps of converting a multiplier d to be multiplied with a divisor D in the scalar multiplication operation D=dD into a wNAF (width-wNon-Adjacent Form) form based on the window algorithm thereby producing wNAF data; and relating the precalculated degenerate divisor data to the wNAF data produced in the conversion step.

In an embodiment of the cryptographic processing method according to the present invention, the operation performing step includes the steps of converting a multiplier d to be multiplied with a divisor D in the scalar multiplication operation D=dD into a wNAF (width-wNon-Adjacent Form) form based on the window algorithm thereby producing wNAF data; if precalculated data to be produced from the wNAF data produced in the conversion step includes data other than the precalculated degenerate divisor data, further converting the wNAF data into modified wNAF data expressed only by the precalculated degenerate divisor data; and relating the precalculated degenerate divisor data to the modified wNAF data produced in the further-conversion step.

In an embodiment of the cryptographic processing method according to the present invention, the base point producing step is the step of producing the base point D such that the base point D and one or more of precalculated data nD (where n is an integer other than 1) in addition to the base point used in the algorithm of executing the scalar multiplication operation based on the window algorithm are degenerate divisors with a weight $g_0$ smaller than genus g of the hyperelliptic curve (where $1 \leq g_0 < g$).

In an embodiment of the cryptographic processing method according to the present invention, the cryptographic processing method is a method of performing a scalar multiplication operation on a hyperelliptic curve with genus g=2; and wherein the base point producing step is the step of producing the base point such that the base point D and 5D are degenerate divisors with a weight=1, the operation performing step includes the steps of converting a multiplier d to be multiplied with a divisor D in the scalar multiplication operation D=dD into a wNAF (width-wNon-Adjacent Form) form based on the window algorithm using a window size=3 thereby producing wNAF data; if precalculated data to be produced from the wNAF data produced in the conversion step includes data other than the degenerate divisor D or 5D, further converting the wNAF data into modified wNAF data expressed only by the degenerate divisors D and 5D; and performing the addition operation included in the scalar multiplication operation such that the degenerate divisors D and 5D are related to the modified wNAF data produced in the further-conversion step, and the addition operation is performed by adding degenerate divisors including the degenerate divisor D and/or 5D.

In an embodiment of the cryptographic processing method according to the present invention, the cryptographic processing method is a method of performing a scalar multiplication operation on a hyperelliptic curve with genus g=3; and wherein the base point producing step is the step of producing the base point such that the base point D and 3D are degenerate divisors with a weight=2, the operation performing step includes the steps of converting a multiplier d to be multiplied with a divisor D in the scalar multiplication operation D=dD into a wNAF (width-wNon-Adjacent Form) form based on the window algorithm using a window size=2 thereby producing wNAF data; performing the addition operation included in the scalar multiplication operation such that the degenerate divisors D and 3D are related to the wNAF data produced in the conversion step, and the addition operation is performed by adding degenerate divisors including the degenerate divisor D and/or 3D.

According to a second aspect of the present invention, there is provided an cryptographic processing apparatus configured to perform a cryptographic processing operation based on hyperelliptic curve cryptography, comprising:

a base point producing means for producing a base point such that the base point given as input divisor in a scalar multiplication operation based on the hyperelliptic curve cryptography and one or more of precalculated data, in addition to the base point, used in the scalar multiplication operation based on a window algorithm are degenerate divisors with a weight $g_0$ smaller than genus g of a hyperelliptic curve (where $1 \leq g_0 < g$);

precalculated degenerate divisor data producing means for producing precalculated degenerate divisor data used in the window algorithm from the base point produced by the base point producing means, such that the precalculated data includes only degenerate divisors; and operation means for performing the scalar multiplication operation based on the window algorithm using the precalculated degenerate divisor data produced by the precalculated degenerate divisor data producing means such that the scalar multiplication operation is accomplished by performing an addition operation of adding degenerate divisors including a precalculated degenerate divisor.

In an embodiment of the cryptographic processing apparatus according to the present invention, the cryptographic processing apparatus further comprises conversion means for converting a multiplier d to be multiplied with a divisor D in the scalar multiplication operation D=dD into a wNAF (width-wNon-Adjacent Form) form based on the window algorithm, thereby producing wNAF data, wherein the operation means performs an operation of relating the precalculated degenerate divisor data to the wNAF data produced by the conversion means.

In an embodiment of the cryptographic processing apparatus according to the present invention, the cryptographic processing apparatus further comprises conversion means for converting a multiplier d to be multiplied with a divisor D in the scalar multiplication operation D=dD into a wNAF (width-wNon-Adjacent Form) form based on the window algorithm, thereby producing wNAF data; and further-conversion means for, if precalculated data to be produced from the wNAF data produced by the conversion means includes data other than the precalculated degenerate divisor data, further converting the wNAF data into modified wNAF data expressed only by the precalculated degenerate divisor data, wherein the operation means performs an operation of relating the precalculated degenerate divisor data to the modified wNAF data produced by the further-conversion means.

In an embodiment of the cryptographic processing apparatus according to the present invention, the base point producing means is configured to produce the base point D such that the base point D and one or more of precalculated data nD (where n is an integer other than 1) in addition to the base point used in the algorithm of executing the scalar multiplication operation based on the window algorithm are degenerate divisors with a weight $g_0$ smaller than genus g of the hyperelliptic curve (where $1 \leq g_0 < g$).

In an embodiment of the cryptographic processing apparatus according to the present invention, the cryptographic processing apparatus is configured to perform a scalar multiplication operation on a hyperelliptic curve with genus g=2; and wherein the base point producing means is configured to produce the base point such that the base point D and 5D are degenerate divisors with a weight=1, and the base point producing means includes conversion means for converting a multiplier d to be multiplied with a divisor D in the scalar multiplication operation D=dD into a wNAF (width-wNon-Adjacent Form) form based on the window algorithm using a window size=3 thereby producing wNAF data; further-conversion means for, if precalculated data to be produced from the wNAF data produced by the conversion means includes data other than the degenerate divisor D or 5D, further converting the wNAF data into modified wNAF data expressed only by the degenerate divisors D and 5D; and operation means for performing the addition operation included in the scalar multiplication operation such that the degenerate divisors D and 5D are related to the modified wNAF data produced by the further-conversion means, and the addition operation is performed by adding degenerate divisors including the degenerate divisor D and/or 5D.

In an embodiment of the cryptographic processing apparatus according to the present invention, the cryptographic processing apparatus is configured to perform a scalar multiplication operation on a hyperelliptic curve with genus g=3; and wherein the base point producing means is configured to produce the base point such that the base point D and 3D are degenerate divisors with a weight=2, and the base point producing means includes conversion means for converting a multiplier d to be multiplied with a divisor D in the scalar multiplication operation D=dD into a wNAF (width-wNon-Adjacent Form) form based on the window algorithm using a window size=2 thereby producing wNAF data; and operation means for performing the addition operation included in the scalar multiplication operation such that the degenerate divisors D and 3D are related to the wNAF data produced by the conversion means, and the addition operation is performed by adding degenerate divisors including the degenerate divisor D and/or 3D.

According to a third aspect of the present invention, there is provided a computer program configured to be executed on a computer to perform cryptographic processing operation based on hyperelliptic curve cryptography, comprising the steps of producing a base point such that the base point given as input divisor in a scalar multiplication operation based on the hyperelliptic curve cryptography and one or more of precalculated data, in addition to the base point, used in the scalar multiplication operation based on a window algorithm are degenerate divisors with a weight $g_0$ smaller than genus g of a hyperelliptic curve (where $1 \leq g_0 < g$);

producing precalculated degenerate divisor data used in the window algorithm from the base point produced in the base point producing step, such that the precalculated data includes only degenerate divisors; and performing the scalar multiplication operation based on the window algorithm using the precalculated degenerate divisor data produced in the precalculated degenerate divisor data producing step such that the scalar multiplication operation is accomplished by performing an addition operation of adding degenerate divisors including a precalculated degenerate divisor.

The computer program may be provided to a computer system capable of executing various computer program codes via a storage medium such as a CD, an FD, or an MO on which the program is stored in a computer-readable manner or via a communication medium such as a network. By providing the program in the computer-readable form as described above, it becomes possible to execute processes on the computer system in accordance with the program.

Further objects, features, and advantages of the present invention will become apparent from the following description of exemplary embodiments with reference to the accompanying drawings. In the present description, the term "system" is used to describe a logical collection of a plurality of apparatuses, and it is not necessarily required that the plurality of apparatuses be disposed in a single case.

Advantages

In an aspect of the present invention, as described above, a base point D is produced such that the base point D and one or more of precalculated data in addition to the base point used in the algorithm of executing the scalar multiplication operation based on the window algorithm are degenerate divisors with a weight $g_0$ smaller than genus g of the hyperelliptic curve (where $1 \leq g_0 < g$), and the addition operation included in the scalar multiplication operation based on the window algorithm is accomplished by performing an addition operation of adding degenerate divisors including a precalculated degenerate divisor. Thus, a high-speed operation is achieved. Besides, because the addition operations do not include an addition operation of divisors including no degenerate divisor, there is no difference in power consumption which would otherwise occur depending on the difference in processing time between degenerate divisors and non-degenerate divisors. Thus, a high-speed calculation is achieved without causing degradation in resistance against the attack such as the SPA or the TA.

In an aspect of the present invention, a multiplier d to be multiplied with a divisor D in the scalar multiplication operation D=dD is converted into a wNAF (width-wNon-Adjacent Form) form based on the window algorithm, thereby producing wNAF data. If precalculated data to be produced from the wNAF data produced above includes data other than the degenerate divisors, then the wNAF data is further converted so as to obtain modified wNAF data expressed only by the degenerate divisors. The degenerate divisor data are related to the modified wNAF data, and the addition operation in the scalar multiplication is performed in the form of addition between a non-degenerate divisor and a degenerate divisor. Thus, a high-speed calculation is achieved without causing degradation in resistance against the attack such as the SPA or the TA.

BEST MODE FOR CARRYING OUT THE INVENTION

Figure 1:
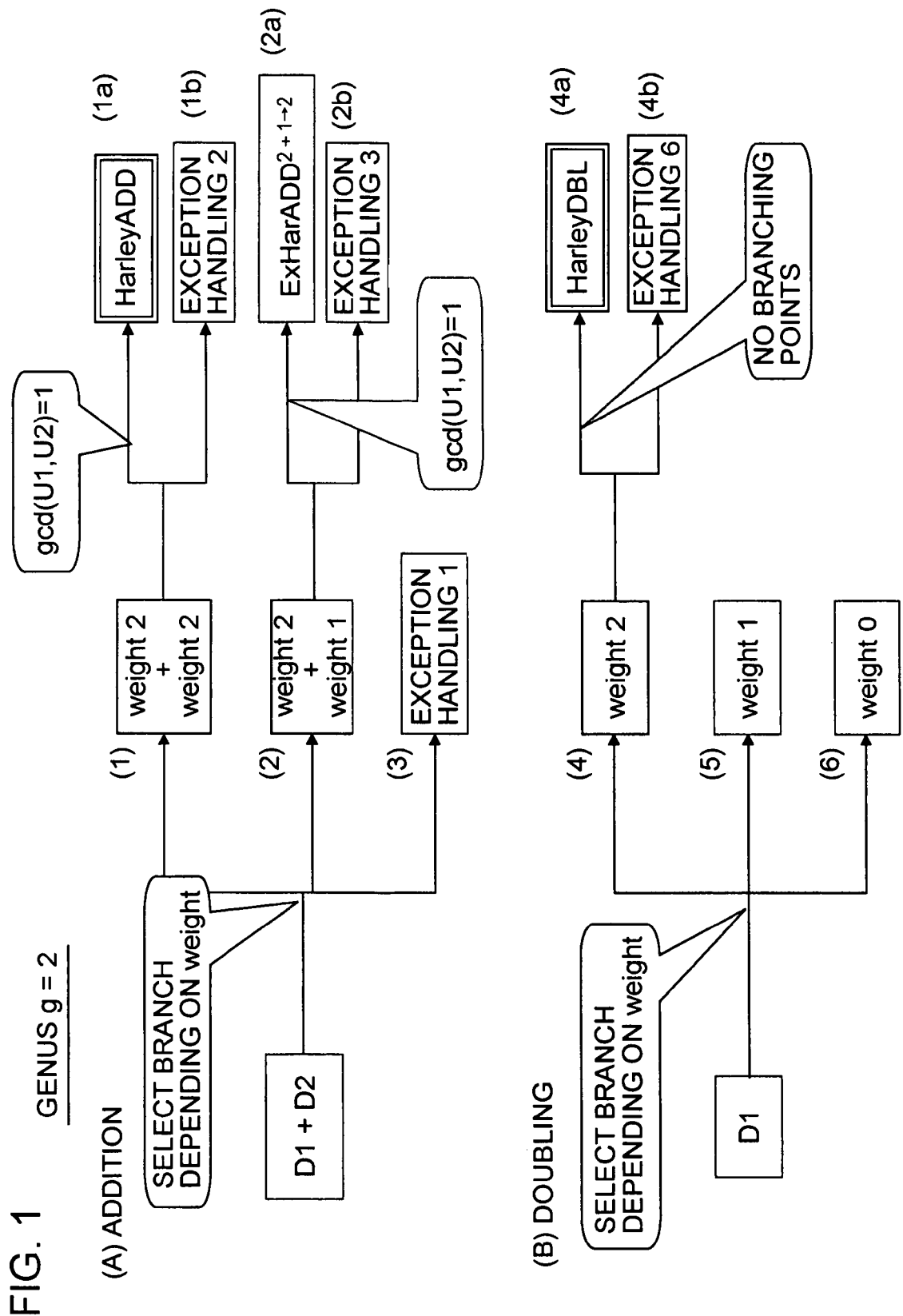
FIG. 1 is a diagram showing algorithms of an addition operation and a doubling operation in scalar multiplication in hyperelliptic curve cryptography with a genus of 2.
Figure 2:
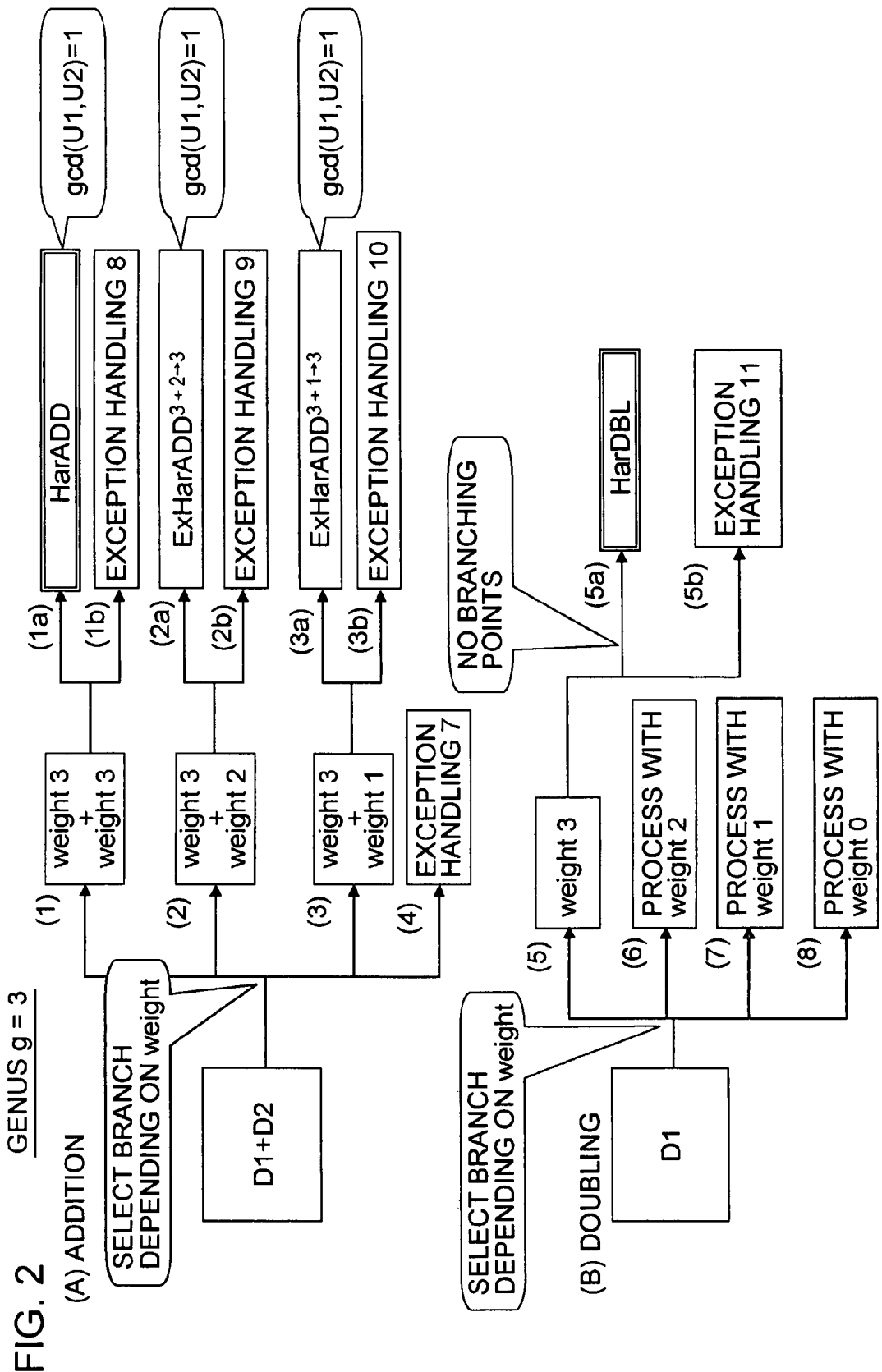
FIG. 2 is a diagram showing algorithms of an addition operation and a doubling operation in scalar multiplication in hyperelliptic curve cryptography with a genus of 3.

A cryptographic processing apparatus, a cryptographic processing method, and a computer program according to the present invention are described below in a further detail below with respect to items listed below.

1. Basic methods of increasing the processing speed of the hyperelliptic curve cryptography algorithm according to the present invention
   (1A) Algorithm in which a degenerate divisor is employed as a base point
   (1B) Algorithm based on the window algorithm
2. Algorithm of a process of setting a degenerate divisor as a base point and performing a process based on a window algorithm, according to an embodiment of the present invention
3. Functional configuration of cryptographic processing apparatus
4. Examples of applications of the present invention to production and verification of digital signature
5. Example of a hardware configuration of cryptographic processing apparatus 1. Basic Methods of Increasing the Processing Speed of the Hyperelliptic Curve Cryptography Algorithm According to the Present Invention First, basic methods of increasing the processing speed of the hyperelliptic curve cryptography algorithm according to the present invention are described, in particular, on the following two algorithms.
   (1A) Algorithm in which a degenerate divisor is employed as a base point
   (1B) Algorithm based on the window algorithm (1A) Algorithm in which a Degenerate Divisor is Employed as a Base Point First, an algorithm of a process of setting a degenerate divisor as a base point is discussed. This technique is disclosed in Japanese Patent Application No. 2004-71757 filed previously by the present applicant.

The purpose of this technique is to increase the processing speed of the hyperelliptic curve cryptography (HECC) which is extension of the elliptic curve cryptography. As described above, a hyperelliptic curve is characterized by genus g. When $q=p^n$ where p is a prime and n is a positive integer, a hyperelliptic curve C of genus g defined over a finite field $F_q$ is defined by the following equation:

$$y^2 + h(x)y = f(x)$$

where $h(x), f(x) \in F_q[x]$, and f(x) is a monic polynomial of degree 2g+1.

A point −P opposite to the point P=(x, y) on the hyperelliptic curve C is defined by (x, y+h(x)). When P=−P, this point P is called a ramification point.

It is known that in the hyperelliptic curve cryptography, a security level comparable to that obtained by the elliptic curve cryptography can be achieved by a field of definition of a hyperelliptic curve with a processing size which is 1/g times that of the elliptic curve. This small processing size provides a great merit in implementation of the hyperelliptic curve cryptography, which is one of the advantages of the hyperelliptic curve cryptography.

In the hyperelliptic curve cryptography, as described above, when a divisor $D_1$ which is a formal sum of points and a divisor $D_2$ obtained by multiplying $D_1$ by a scalar k are given, a problem of finding k from $D_2$ reduces to a discrete logarithm problem on a Jacobian variety of a hyperelliptic curve.

As described above, the divisors can be expressed in the following form:

[Mathematic Expression 12]

$$D = \sum_i m_i P_i - \left(\sum_i m_i\right) P_\infty, \quad m_i \geq 0$$

In the above expression, $P_i=(x_i, y_i)$, and $P_i \neq P_j$ when $i \neq j$. The divisor in this form is called a semi reduced divisor. $\Sigma m_i$ is referred to as a weight of D. When the weight of a semi reduced divisor is equal to or smaller than the genus g, the semi reduced divisor is called a reduced divisor.

An arbitrary semi reduced divisor D on a Jacobian variety of a hyperelliptic curve can be expressed in a Mumford form D=(U, V) using the following polynomials U and V (U, V∈$F_q$[x]).

$$U = \Pi(x-x_i)^{m_i}$$

$$V(x_i) = y_i$$

$$V(x)^2 + V(x)h(x) - f(x) \equiv 0 \bmod U(x),$$
$$\deg V < \deg U \quad \text{[Mathematic Expression 13]}$$

An arbitrary reduced divisor D of genus 2 can be expressed in the Mumford form using a set of polynomials of degree 2 or less whose coefficients are elements of the finite field $F_q$, as follows:

$$(U, V) = (x^2 + u_1 x + u_0, v_1 x + v_0)$$

An arbitrary reduced divisor D of genus 3 can be expressed in the Mumford form using a set of polynomials of degree 3 or less whose coefficients are elements of the finite field $F_q$, as follows:

$$(U, V) = (x^3 + u_2 x^2 + u_1 x + u_0, v_2 x^2 + v_1 x + v_0)$$

Divisors may be expressed in other forms such as a modified Mumford expression or a weighted coordinate expression. The modified Mumford expression corresponds to projective coordinates in the ECC (elliptic curve cryptography) and expresses a divisor by (U, V, Z) obtained by multiplying the Mumford expression (U, V) by a constant Z.

In the weighted coordinate expression, a divisor is expressed by (U, V, Z1, Z2) obtained by multiplying the Mumford expression (U, V) by a plurality of constants Z1 and Z2. Both the modified Mumford expression and the weighted coordinate expression can reduce the amount of computation of a Harley algorithm described below.

As described above, when scalar multiplication is used in cryptography, an input divisor $D_0$ can be categorized into two types:
   (1) predetermined divisors
   (2) unpredictable divisors which occur randomly When an input divisor is of the type (1), that is, a predetermined divisor, this input divisor is used as a base point.

Note that in the present description, as described above, divisors D are reduced divisors which are semi reduced divisors with a weight equal to or smaller than genus g. Divisors other than those with a weight equal to genus g, that is, reduced divisors having a weight smaller than genus g, are called degenerate divisors.

For example,
when genus g=2, degenerate divisors are divisors with a weight equal to 1, and
when genus g=3, degenerate divisors are divisors with a weight equal to 1 or 2.

Degenerate divisors can be expressed using the Mumford form depending on whether genus g=2 or 3, as shown below.
(a) degenerate divisors of genus 2: (U, V)=(x+u, v)
(b) degenerate divisors of genus 3 (with weight=1): (U, V)=(x+$u_0$, $v_0$)
(c) degenerate divisors of genus 3 (with weight=2): (U, V)=($x^2$+$u_1$x+$u_0$, $v_1$x+$v_0$)

As described above, a base point is generally produced according to the following algorithm.
(a) First, g elements on the field of definition $F_q$ are selected at random, and g points $P_i$ (i=1, . . . , g) on a hyperelliptic curve are produced.
(a1) Let $x_i$ (i=1, . . . , g) denote the x coordinate of each if the elements randomly selected above. The y coordinate which is on the hyperelliptic curve and which corresponds to the x coordinate $x_i$ is determined for each element.
(b) Let a divisor at a base point be denoted as $D_0$=(U(x), V(x)).
(b1) U(x)=(x−$x_1$)(x−$x_2$) . . . (x−$x_g$)
(b2) Coefficients $v_i$ of V(x)=$v_{g-1}x^{g-1}$+$v_{g-2}x^{g-2}$+ . . . +$v_0$ are determined. For example, when there is no duplication in the produced points, $v_i$ can be determined from V($x_i$)=$y_i$.
(c) The divisor generated via the above-described algorithm has a weight=g.

As described above, when a divisor is generated by the conventional algorithm and apparatus designed to produce a base point on a hyperelliptic curve of genus g, the resultant divisor is generally a divisor with a weight=g.

Japanese Patent Application No. 2004-71757 filed previously by the present applicant discloses an algorithm in which a degenerate divisor is employed as a base point. More specifically, a degenerate divisor, that is, a divisor with a weight=$g_0$ smaller than genus g of a hyperelliptic curve is produced, and this degenerate divisor is employed as the base point.

Figure 3:
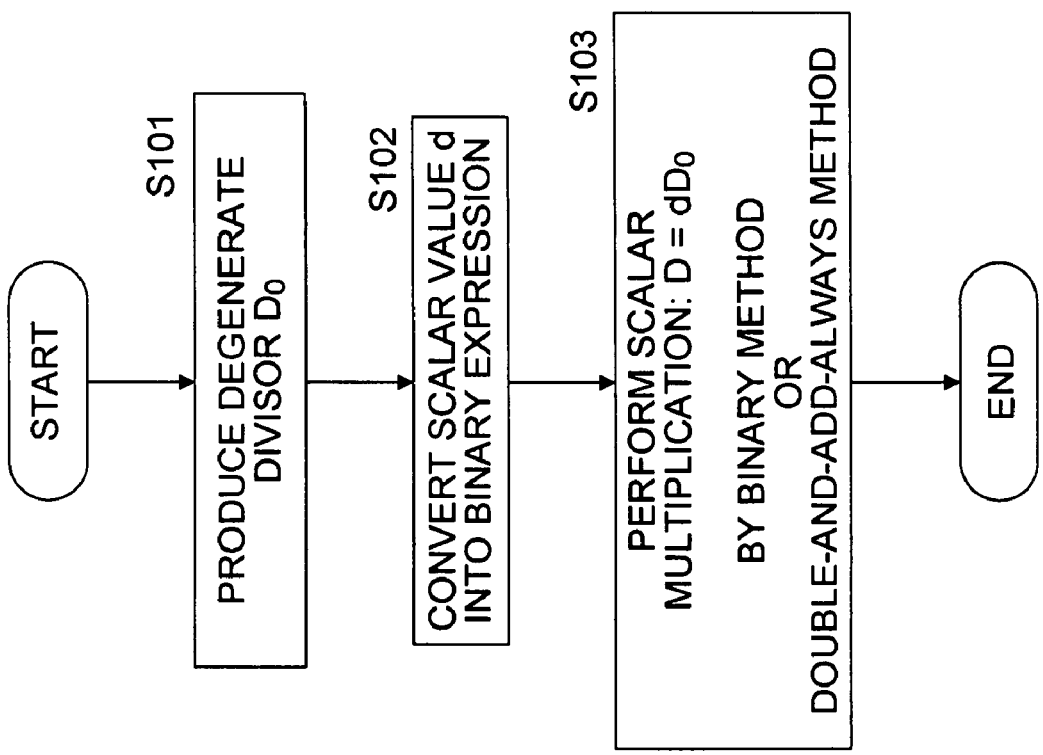
FIG. 3 is a flow chart of a total sequence of producing a degenerate divisor and performing scalar multiplication.

A total sequence of scalar multiplication according to this algorithm is described below with reference to FIG. 3. In this scalar multiplication algorithm using a degenerate divisor as the base point, first, in step S101, a degenerate divisor ($D_0$) with a weight=$g_0$ smaller than genus g of a hyperelliptic curve is produced. That is,
a divisor with a weight=1 is generated when genus g=2, and
a divisor with a weight=1 or 2 is generated when genus g=3.

Next, in step S102, a scalar value d used as a multiplier in the scalar multiplication operation (D=d$D_0$) is converted into a binary expression. In step S103, the scalar value d in the binary form and the degenerate divisor ($D_0$) produced in step S101 are subjected to the scalar multiplication operation (D=d$D_0$). The scalar multiplication operation (D=d$D_0$) is accomplished, for example, using the binary method or the double-and-always method.

The details of the process of step S101, that is, the process of producing a degenerate divisor ($D_0$) with a weight=$g_0$ smaller than genus g of a hyperelliptic curve are described below.

In the present example, it is assumed that a base point on the hyperelliptic curve of genus g is given by a degenerate divisor with a weight=$g_0$ satisfying the following condition:
$g_0$<g
By setting the base point at the degenerate divisor satisfying the above condition, an increase in the processing speed of the scalar multiplication in the hyperelliptic curve cryptography is achieved.

Figure 4:
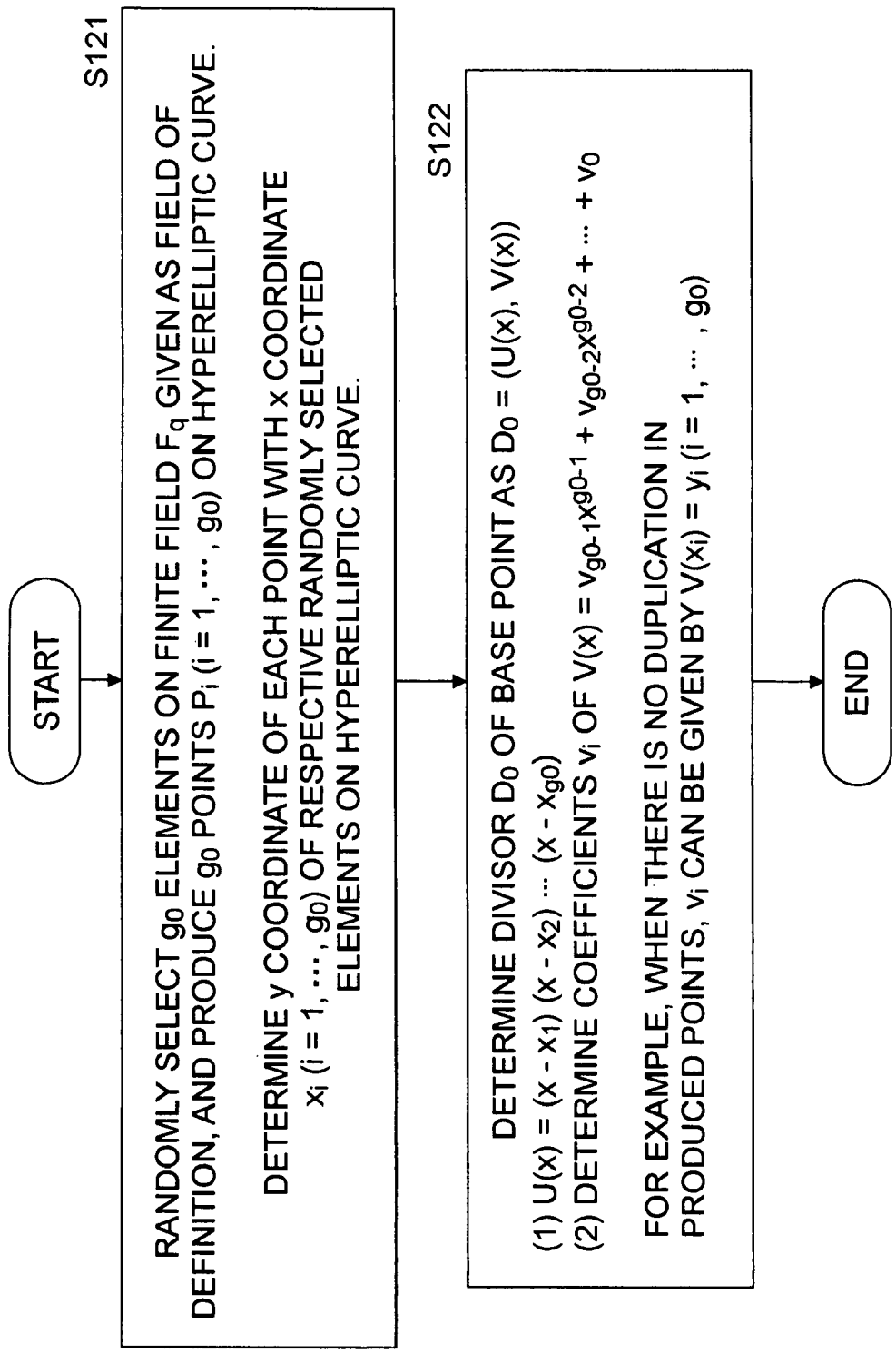
FIG. 4 is a flow chart showing a process of setting a base point using a degenerate divisor in a hyperelliptic curve cryptography process.

In many cases, divisors used in hyperelliptic curve cryptography using a hyperelliptic curve of genus g have a weight equal to genus g, that is, most divisors are not degenerate divisors. When a divisor is generated randomly, the probability for the produced divisor being a degenerate divisor is O(1/q) where q is the number of elements of the finite field. For example, when genus=2, q for use in cryptography is set to be as large as about 280. Therefore, when a divisor is selected randomly, the probability for the selected divisor being a degenerate divisor is very low. In the case of the scalar multiplication for a fixed base point, it is possible to intentionally produce a degenerate divisor. A method of producing a degenerate divisor is described below with reference to FIG. 4.

In the case of a conventional algorithm of setting a base point at a divisor with a weight=g on a hyperelliptic curve of genus g, the algorithm includes a process of selecting g points on the hyperelliptic curve. In contrast, in the present algorithm of producing the base point, $g_0$ points on the hyperelliptic curve are selected such that 1≦$g_0$<g. The details of the present algorithm of producing the base point are described below.

(Step S121)
$g_0$ elements on the finite field $F_q$ given as the field of definition are randomly selected, and $g_0$ points $P_i$ (i=1, . . . , $g_0$) are produced on the hyperelliptic curve.
(1) Let $x_i$ (i=1, . . . , $g_0$) denote the x coordinate of each of the elements randomly selected above. The y coordinate which is on the hyperelliptic curve and which corresponds to the x coordinate $x_i$ is determined for each element.
(Step S122)
A divisor $D_0$=(U(x), V(x)) is employed as a base point, where $$U(x)=(x-x_1)(x-x_2) \ldots (x-x_{g0}) \quad (1)$$

$$V(x)=v_{g0-1}x^{g0-1}+v_{g0-2}x^{g0-2}+\ldots+v_0 \quad (2)$$

and coefficients $v_i$ of V(x)=$v_{g0-1}x^{g0-1}$+$v_{g0-2}x^{g0-2}$+ . . . +$v_0$ are determined. For example, when there is no duplication in the produced points, $v_i$ can be determined from V($x_i$)=$y_i$ (i=1 . . . $g_0$).

Thus, in the step described above, the divisor with a weight=$g_0$ smaller than genus g of the hyperelliptic curve is selected as the base point.

For example, in the case of a hyperelliptic curve of genus g=3, a divisor with a weight=3 is generally selected as a base point in the conventional technique. In contrast, in the algorithm of setting a base point according to the present embodiment, a divisor with a weight smaller than genus g=3 is selected as the base point. That is, a divisor with a weight=1 or 2 is selected as the base point.

On the other hand, in the case of a hyperelliptic curve of genus g=2, a divisor with a weight=2 is generally selected as a base point in the conventional technique. In contrast, in the algorithm of setting a base point according to the present embodiment, a divisor with a weight smaller than genus g=2, that is, a divisor with a weight=1 is selected as the base point.

In the case where, on a hyperelliptic curve of genus g, a divisor with a weight=$g_0$ smaller than g is produced as a base point using the algorithm described above with reference to FIG. 4, when scalar multiplication is performed using this divisor, the addition operation in the scalar multiplication algorithm is performed according to a formula different from that used in the case where the base point has a weight equal to the genus g.

More specifically, when a divisor with a weight smaller than the genus g is selected as the base point, the addition in the scalar multiplication is not accomplished by HarleyADD but the addition is performed between a divisor with a weight g and a divisor with a weight smaller than g. The calculation cost for the addition between the divisor with the weight g and the divisor with the weight smaller than g in this algorithm is lower than that by HarleyADD, because the divisor the divisor with the weight smaller than g is represented by a polynomial of a reduced degree, and thus the calculation of the scalar multiplication can be performed in a shorter time.

In the case where a degenerate divisor is selected as the base point, the scalar multiplication can be performed so as to provide resistance against simple power analysis (SPA) according to an algorithm based on the double-and-add-always method, described below in [Algorithm 3].

[Mathematic Expression 14]

---
Double-and-add-always Method (Algorithm3)
Input $D_0$
Output $D = dD_0$ $D[0] \leftarrow D_0$  ||set degenerate divisor
for i from l − 2 to 0
{
    $D[0] \leftarrow 2D[0]$    ||HarleyDBL doubling operation
    $D[1] \leftarrow D[0] + D_0$   ||addition with degenerate divisor
    $D[0] \leftarrow D[d_i]$
}
return $D[0]$

---

In the present example, the calculation is performed according to the algorithm described above. In general, addition with a degenerate divisor needs a less amount of calculation than addition between two non-degenerate divisors, and thus it is possible to perform scalar multiplication at a higher speed compared with the case where a degenerate divisor is not intentionally produced.

(1B) Algorithm Based on Window Algorithm

An example of a technique to increase the processing speed of the hyperelliptic curve cryptography algorithm by using a window algorithm is described.

A description of a technique using the window algorithm to process hyperelliptic curve cryptography such that high resistance is provided against the simple power analysis (SPA) can be found, for example, in [K. Okeya and T. Takagi, The Width-w NAF Method Provides Small Memory and Fast Elliptic Scalar Multiplications Secure against Side Channel Attacks, CT-RSA 2003, LNCS 2612, pp 328-343, Springer-Verlag, 2003]. The hyperelliptic curve cryptography is an extension of the elliptic curve cryptography, and the speeding-up technique based on the window algorithm can be applied to the hyperelliptic curve cryptography without gaps.

Figure 5:
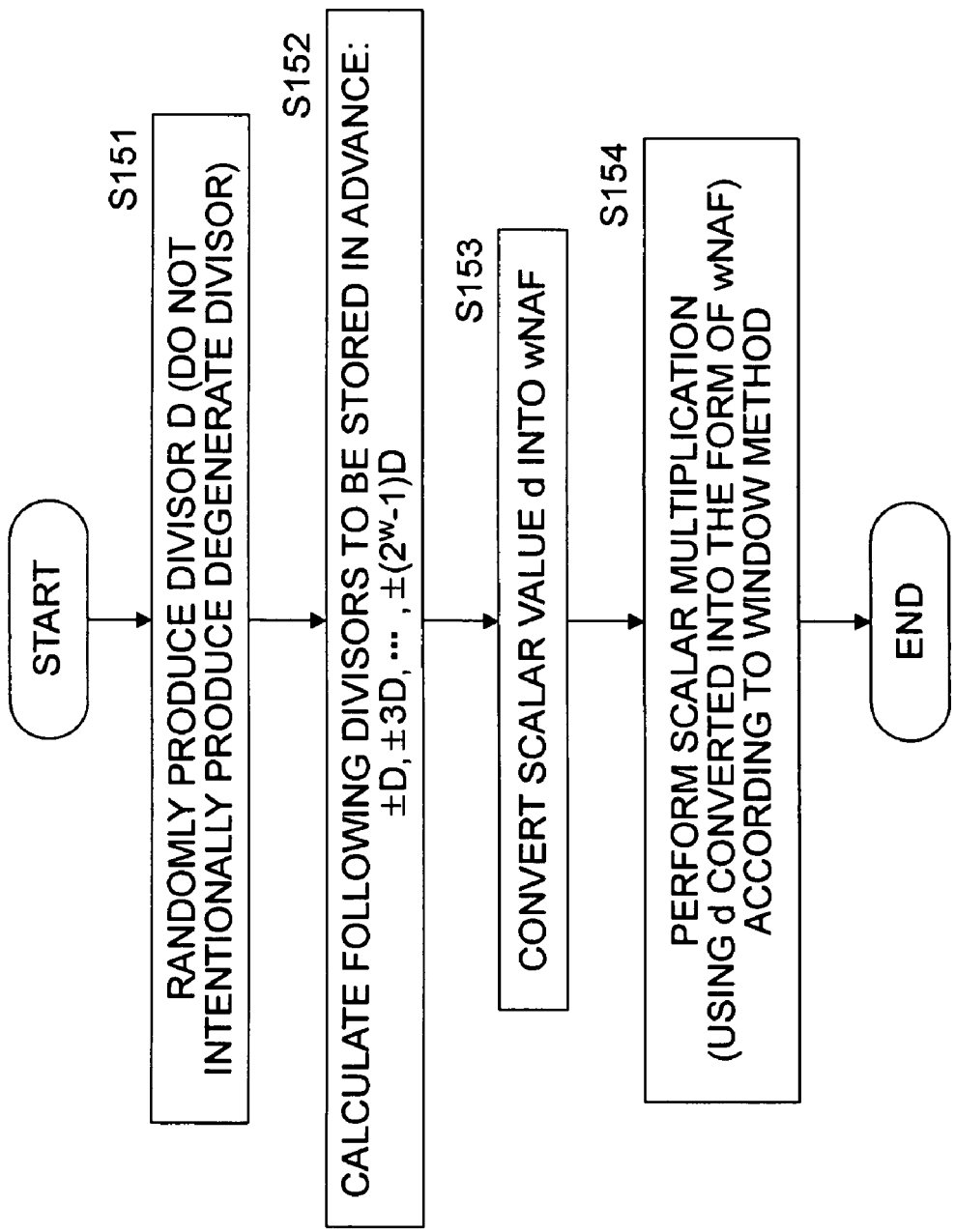
FIG. 5 is a diagram showing a total sequence of a scalar multiplication operation using the window algorithm.

Referring to FIG. 5, a total sequence of a scalar multiplication process using the window algorithm is described below.

The window algorithm can be categorized into a few types. In the most fundamental type, a scalar value d used as a multiplier to be multiplied with a divisor D in a scalar multiplication operation [D=dD] is converted into a binary form. The scalar value in the binary form is then divided at proper digits between the most and least significant bits into a plurality of blocks. A table is prepared in advance which indicates the product dD of each possible combination of bits of each block of the multiplier d and each possible value of the multiplicand D. In the actual scalar multiplication operation, the multiplication is performed by referring to the table. Use of the table makes it possible to obtain the product without having to perform the multiplication operation, and thus an increase in the processing speed can be achieved.

For example, when a scalar value d=2674 . . . 223 (in decimal form) is given as a multiplier to be used in the scalar multiplication operation [D=dD], if the given scalar value d can be converted into the following binary form
    d=1110101001 . . . 00101110011
then the resultant binary expression is divided by windows with 3 bits (with a window size w=3) into a plurality of blocks as shown below.
    [111], [010], [100] . . .

If there is a prepared table indicating products of the divisor D and respective possible combinations of bits in one block, it is possible to obtain the result of the scalar multiplication simply by extracting precalculated data from the table. This makes it possible to obtain the result in a short time by performing a simple process. The data pre-calculated and described in the form of the table can be provided in many ways.

One technique to describe the pre-calculated data in the table is a NAF conversion method, which allows a reduction in the data size of the pre-calculated data. In this technique, a multiplier (d) is converted into a NAF (Non-Adjacent Form) which is a signed binary form in which non-zero bits (1 or −1) are not allowed to be adjacent. In this form, the number of non-zero bits is minimized.

In the NAF conversion, the multiplier d converted in the binary form is further converted into the NAF form by applying [−1] to a data part in which [1]s successively appear so as to be converted into a series of bits 0, 1, −1.

A wNAF (width-w Non-Adjacent Form) method has been proposed to further reduce the amount of data precalculated and stored in the table. The details of this technique are described in [K. Okeya and T. Takagi, The Width-w NAF Method Provides Small Memory and Fast Elliptic Scalar Multiplications Secure against Side Channel Attacks, CT-RSA 2003, LNCS 2612, pp 328-343, Springer-Verlag, 2003] cited above.

In the wNAF conversion, products of a multiplicand (D) and respective blocks each consisting of a predetermined number of digits are precalculated, and the resultant products $\pm D, \pm 3D, \pm 5D, \ldots, \pm(2^w-1)D$ are stored in the table. The multiplier d expressed in the binary form is divided by the window (with the predetermined window size) into blocks as follows.
    |00 . . . 0x|00 . . . 0x|00 . . . 0x| . . .
where x is an odd integer ($\pm 1, \pm 3, \ldots$).

Because the multiplier d is divided into the blocks in the above described manner, it is sufficient for the table to include only the following precalculated data.
    $\pm D, \pm 3D, \pm 5D, \ldots, (2^w-1)D$ Thus, the precalculated data is limited to those described above, that is, a reduction in the amount of precalculated data is achieved.

With reference to a flow chart shown in FIG. 5, a total sequence of a scalar multiplication process using the window algorithm (wNAF algorithm) is described below. In step S151, a divisor on the hyperelliptic curve of genus g is randomly produced. Note that in this step, a degenerate divisor is not intentionally produced, and thus, in most cases, the produced divisor has a weight equal to g. The produced divisor is employed as the base point.

Next, in step S152, the precalculated data described above is produced. In this step, the window size w is given by signed odd numbers 1, 3, . . . , $2^w-1$, and the products of the base point D and the respective signed odd numbers, that is,
    $\pm D, \pm 3D, \pm 5D, \ldots, \pm(2^w-1)D$ are calculated as the precalculated data and stored in the memory.

Next, in step S153, the scalar value d used as the multiplier in the scalar multiplication operation [D=dD] is converted into the wNAF form. More specifically, the scalar value d given as the multiplier is divided into blocks as follows.

|00 . . . 0x|00 . . . 0x|00 . . . 0x| . . .

where x is an odd integer (±1, ±3, . . . ).

Thus, the scalar value d is converted into blocks with the fixed window size (the fixed number of digits) each consisting of a signed odd integer.

An algorithm of converting a scalar value d into the wNAF form is shown below in [Algorithm 4].

[Mathematic Expression 15]

---

Conversion into wNAF (Algorithm4)
Input: odd scalar values    d, k = ⌈n/w⌉
Output: dw[n],dw[n−1],....,dw[0]

1. u[0] ← d mod $2^w$
2. d ← d − u[0]
3. d ← d/$2^w$
4. For i from 1 to k
   4.1 u[i] ← d mod $2^w$, u'[i] ← u[i]
   4.2 If u[i] is even
     b ← sign(u[i − 1]),u[i] ← u[i]+b, u[i − 1] ← u[i − 1]−b$2^w$
   4.3 dw[(i − 1)w] ← u[i − 1],dw[(i − 1)w+1] ← 0, ....,dw[(i − 1)w+w−1] ← 0
   4.4. d ← d − u'[i],d ← d/$2^w$
5. dw[kw] ← u[k],dw[kw+1] ← 0,...,dw[kw+w−1] ← 0
6. Return dw[n],dw[n−1],....,dw[0]

---

Next, in step S154, the scalar multiplication operation [D=dD] is performed. More specifically, a given scalar value d is expressed in the wNAF form and the scalar multiplication operation is performed by referring to the precalculated product data ±D, ±3D, ±5D, . . . , ±($2^w$−1)D prepared in step S152.

An algorithm of the scalar multiplication [D=dD] is shown below in [Algorithm 5].

[Mathematic Expression 16]

---

Scalar Multiplication (Algorithm5)
Input: wNAF d[i], base point D, recalculated divisor d[i]D
Output.dD 1. D ← d[n]P
2. For i from n − 1to0
   2.1.D ← 2D
   2.2.If d[i] ≠ 0 thenD ← D + d[i]D
3. Return D

---

In the present algorithm, in the wNAF conversion performed in step S153, the scalar value d is divided into blocks each consisting of 0 and a signed odd integer 1, 3, . . . , $2^w$−1. Like the case where the scalar value is converted into the binary form, the amount of calculation needed for the scalar multiplication decreases with decreasing number of non-zero digits appearing in the scalar value. The present algorithm is a method that minimizes the number of non-zero digits. The pattern obtained as a result of the conversion is always in the form of DD . . . DAD . . . DA (where D is doubling of the divisor and A is addition of the divisor), and thus the present algorithm provides high resistance against simple power analysis (SPA). In the case of the scalar multiplication in step S154, the obtained pattern itself has high resistance against simple power analysis (SPA), and thus it is not needed to perform dummy operation unlike the double-and-add-always method in which d is converted into the binary form.

2. Algorithm of a Process of Setting a Degenerate Divisor as a Base Point and Performing a Process Based on a Window Algorithm, According to an Embodiment of the Present Invention An algorithm of a process of setting a degenerate divisor as a base point and performing a process based on a window algorithm, according to an embodiment of the present invention is described below. The above-described two methods to increase the processing speed of the hyperelliptic curve cryptography algorithm, that is, (1A) Algorithm in which a degenerate divisor is employed as the base point
   (1B) Algorithm based on the window algorithm are different in terms of the manner of achieving the improvement in the processing speed of the hyperelliptic curve cryptography algorithm.

In the window algorithm described above, the processing speed is improved by using a fixed non-degenerate divisor as the base point. In this window algorithm, if it is allowed to employ a degenerate divisor as the base point as in the algorithm described in [(1A) Algorithm in which a degenerate divisor is employed as the base point], then addition can be accomplished using the technique employed in step S154 in FIG. 5 based on the technique described in [(1B) Algorithm based on the window algorithm]. More specifically, the addition of the degenerate divisor can be accomplished by using the addition step (2.2) in [Algorithm 5] associated with the scalar multiplication [D=dD]. The addition of divisors including a degenerate divisor can be performed at a higher speed than the addition of divisors including no degenerate divisor, and thus it is possible to further increase the processing speed of the window algorithm.

In order to use a degenerate divisor as the base point in the algorithm described in [(1B) Algorithm based on the window algorithm] while maintaining the security against the cryptography attack, it is required that in step S152 in FIG. 5 of the process based on the window algorithm, all divisors of precalculated points D to ($2^w$−1)D (where w is the window size) should be degenerate divisors.

It is possible to set divisors such that precalculated data is prepared for non-degenerate divisors other than the divisor employed as the base point, and the window algorithm is applied to the scalar multiplication. However, this method is weak against various kinds of attack. That is, if the algorithm is implemented by a combination of an addition operation using a degenerate divisor as the base point and an addition operation of divisors including non-degenerate divisor, a difference in power consumption or calculation time occurs depending on whether divisors in the scalar multiplication [dD] includes the base point D or not, which can cause weakness against the simple power analysis (SPA) or the timing attack (TA).

In order to ensure high resistance against attacks, it is needed that all precalculated points should be degenerate divisors. When the base point is given by a degenerate divisor D, it is technically very difficult to find a base point by checking all precalculated points such as ±D, ±3D, ± 5D, . . . , ±($2^w$−1)D which are degenerate divisors, because the ratio of the number of possible degenerate divisors to the total number of divisors is very small and thus the probability that a plurality of divisors are both degenerate divisors is extremely small.

For example, in the case of a curve with genus=2, the number of elements of a Jacobian variety is as large as #J∼$q^2$ as indicated by the Hasse's theorem. However, on the curve with genus=2, the number of degenerate divisors having a weight smaller than g=2, that is, the number of degenerate divisors having a weight=1 is as small as q at most. Thus, the probability that two divisors randomly selected from the Jacobian variety are both degenerate divisors is as small as $1/q^2$. In cryptography, q is selected to be as large as about 280, and thus it is very difficult to find a combination of two divisors by randomly generating divisors and checking the generated divisors. This also holds true for the case of genus=3.

Therefore, in order to extend the algorithm described in the [(1B) Algorithm based on the window algorithm] such that it is allowed to employ a degenerate divisor as the base point, it is needed to establish a method of efficiently finding a base point so that the base point and any odd multiple of the base point are degenerate divisors, which are needed to be prepared as precalculated points.

For the above-described purpose, the present invention provides two algorithms A and B.

(Algorithm A) Algorithm of efficiently searching for degenerate divisors D and 5D on a curve of genus (g)=2 such that the base point D and 5D both have a weight=1, converting the wNAF data into the form expressed using only the detected degenerate divisors D and 5D, and performing the scalar multiplication using the resultant converted wNAF data (Algorithm B) Algorithm of efficiently searching for degenerate divisors D and 3D on a curve of genus (g)=3 such that the base point D and 3D both have a weight=2, converting the wNAF data into the form expressed using only the detected degenerate divisors D and 3D, and performing the scalar multiplication using the resultant converted wNAF data The details of the two algorithms (Algorithm A) and (Algorithm B) are described below.

(Algorithm A) Algorithm of efficiently searching for degenerate divisors D and 5D on a curve of genus (g)=2 such that the base point D and 5D both have a weight=1, converting the wNAF data into the form expressed using only the detected degenerate divisors D and 5D, and performing the scalar multiplication using the resultant converted wNAF data In this algorithm, the window algorithm is applied to a hyperelliptic curve of genus (g) of 2. A degenerate divisor D is set as the base point, and precalculated data are prepared such that all data can be calculated based on degenerate divisors using the window algorithm. In any case, the addition operation in the scalar multiplication is performed in the form of addition of a non-degenerate divisor and a degenerate divisor.

In the present algorithm, on the hyperelliptic curve of genus (g) of 2, divisors are detected in an efficient manner such that the base point [D] and [5D] are both degenerate divisors with a weight=1, the wNAF conversion is performed for the detected degenerate divisors D and 5D, and the scalar multiplication is performed using the wNAF data including only degenerate divisors.

As described above, on the curve with genus=2, the number of degenerate divisors having a weight smaller than g=2, that is, the number of degenerate divisors having a weight=1 is as small as q at most. Thus, the probability that two divisors randomly selected from the Jacobian variety are both degenerate divisors is as small as $1/q^2$. Because of this low probability, it is substantially impossible to find a combination of two divisors by randomly generating divisors and checking whether both the base point D and 5D are degenerate divisors.

The present algorithm allows it to efficiently find a base point D which is degenerate at both D and 5D. In the scalar multiplication operation, only D and 5D are prepared as precalculated divisors, and all precalculated divisors necessary in the window algorithm are calculated using D and 5D. The present algorithm includes the following three processes.

(Process A1) Process of efficiently finding D which is degenerate and has a weight=1 at both the base point D and 5D (Process A2) Process of performing the wNAF conversion using the degenerate divisors D and 5D to obtain wNAF data including only degenerate divisors (Process A3) Process of performing scalar multiplication using the precalculated data expressed only by the degenerate divisors D and 5D The details of the respective processes (Process A1) to (Process A3) are described below.

(Process A1) Process of Efficiently Finding D which is Degenerate and has a Weight=1 at Both the Base Point D and 5D Searching for a divisor D used as the base point such that the base point D and a multiple thereof 5D are both degenerate divisors with a weight (w)=1 is accomplished by applying a method of determining a condition that w(D)=w(5D)=1 by calculating 5D from the base point D using the Harley formula, where w(D)=w(5D)=1 denotes that weight (w)=1 for both divisors D and 5D.

In the Harley algorithm, as described above, a prime field is given as the field of definition, the curve is of genus=2, and divisors are expressed in the Mumford form. Any reduced divisor D of genus 2 can be expressed in the Mumford form using a set of polynomials of degree 2 or less whose coefficients are elements of the finite field $F_q$, as follows:

$$(U,V)=(x^2+u_1x+u_0, v_1x+v_0)$$

In order to determine a condition for D to have w(D)=w(5D)=1, let us calculate 5D from D by an addition chain based on the Harley formula. Let divisors D, 2D, and 4D be expressed in the Mumford form as follows.

$$D=(x+u,v)$$

$$2D=(x^2+u_1x+u_0, v_1x+v_0)$$

$$4D=(x^2+w_1x+w_0, z_1x+z_0)$$

The calculations D→2D, 2D→4D, and 4D→5D can be performed using the following Harley formulae:

$$D \rightarrow 2D: \text{ExHarDBL}^{1 \rightarrow 2} \text{ (Table 8)}$$

$$2D \rightarrow 4D: \text{HarleyDBL (Table 2)}$$

$$4D \rightarrow 5D: \text{ExHarADD}^{2+1 \rightarrow 1}$$

Of the Harley formulae described above, 4D→5D: ExHarADD$^{2+1 \rightarrow 1}$ is performed by addition of divisors D and 4D, which corresponds to the addition of weight 1+weight 2 in the Harley algorithm for genus g=2 described above with reference to FIG. 1. Thus, HarADD$^{2+1 \rightarrow 2}$ or exception handling 3 is selected.

Algorithms of the other Harley formulae $$D \rightarrow 2D: \text{ExHarDBL}^{1 \rightarrow 2} \text{ and}$$

$$2D \rightarrow 4D: \text{HarleyDBL}$$

are respectively shown below in [Table 8] and [Table 2].

[Mathematic Expression 17]

TABLE 8

ExHarDBL$^{1\rightarrow 2}$(genus 2)
Input: $D_1 = (u_1, v_1)$, deg $u_1 = 1$
Output: $D_3 = (u_3, v_3) = 2D_1$

| | | |
|---|---|---|
| 1 | Compute $u_1^2 = x^2 + u_{10}^2$:<br>$u_{30} \leftarrow u_{10}^2, u_{31} \leftarrow 0$ | 1M |
| 2 | Compute $v_{31} = (f'(u_{10}) + h'(u_{10})v_{10})/h(u_{10})$:<br>$w_0 \leftarrow u_{30}^2, w_1 \leftarrow f_3 u_{30}, w_2 \leftarrow h_1 v_{10}, w_0 \leftarrow w_0 + w_1 + f_1 + w_2$,<br>$w_3 \leftarrow h_1 u_{10}, w_1 \leftarrow u_{30} + w_3 + h_0, v_{31} \leftarrow w_0/w_1$; | 1I + 5M |
| 3 | Compute $v_{30} = u_{10} v_{31} + v_{10}$:<br>$w_0 \leftarrow u_{10} v_{21}, v_{30} \leftarrow w_0 + v_{10}$; | 1M |
| total | ExHarDBL$^{1\rightarrow 2}$ | 1I + 7M |

[Mathematic Expression 18]

TABLE 2

HarleyDBL(genus 2)
Input: $D_1 = (u_1, v_1)$, deg $u_1 = 2$
Output: $D_3 = (u_3, v_3) = 2D_1$

| | | |
|---|---|---|
| 1 | Compute $r = \text{res}(u_1, h)$:<br>$w_1 \leftarrow h_1 + u_{11}, w_0 \leftarrow h_0 + u_{10} + u_{11} w_{11}, r \leftarrow u_{10}(u_{10} + h_0 + h_1 w_1) + h_0 w_0$; | 4M |
| 2 | Compute $I = i_1 x + i_0 \equiv rh^{-1} \mod u_1$<br>$i_1 \leftarrow w_1, i_0 \leftarrow w_0$; | |
| 3 | Compute $T = t_1 x + t_0 \equiv I(f + hv_1 + v_1^2)/u_1 \mod u_1$:<br>$w_2 \leftarrow f_3 + v_{11} + u_{11}^2, w_3 \leftarrow v_{10} + v_{11}(v_{11} + h_1)$,<br>$t_1 \leftarrow w_0 w_2 + w_1 w_3, t_0 \leftarrow (u_{11} w_0 + u_{10} w_1) w_2 + w_0 w_3$; | 8M |
| 4 | If $t_1 = 0$ then call exceptional procedure. | |
| 5 | Compute $S = s_1 x + s_0$:<br>$w_0 \leftarrow (rt_1)^{-1}, w_2 \leftarrow w_0 r, w_3 \leftarrow w_0 t_1, w_4 \leftarrow w_2 r, s_1 \leftarrow w_3 t_1, s_0 \leftarrow w_3 t_0$; | 1I + 6M |
| 6 | Compute $u_3 = x^2 + u_{31} x + u_{30} = s_1^{-2}(f + h(Su_1 + v_1) + (Su_1 + v_1)^2)/u_1^2$:<br>$u_{31} \leftarrow w_4(1 + w_4), u_{30} \leftarrow w_4(w_4(s_0(1 + s_0)) + w_1)$; | 4M |
| 7 | Compute $v_3 = v_{31} x + v_{30} \equiv Su_1 + v_1 + h \mod u_3$:<br>$w_1 \leftarrow u_{31} + u_{31}, w_0 \leftarrow u_{10} + u_{30}, w_2 \leftarrow s_1 w_1, w_3 \leftarrow s_0 w_0$,<br>$w_4 \leftarrow (s_1 + s_0)(w_1 + w_0) + w_2 + w_3, w_2 \leftarrow w_2 + 1, w_1 \leftarrow w_4 + w_2 u_{31}$,<br>$w_0 \leftarrow w_3 + w_2 u_{30}, v_{31} \leftarrow w_1 + v_{11} + h_1, v_{30} \leftarrow w_0 + v_{10} + h_0$; | 5M |
| total | HarleyDBL | 1I + 27M |

5D, which is a scalar multiplication of the base point D, can be obtained via a sequence of above-described additions D→2D→4D→5D. By using the relational expressions obtained in the above calculation process, a base point D is detected so that divisors D and 5D are both of the degenerate type, that is, both D and 5D have a weight=1. The details of the process of searching for the base point D are described below with reference to FIG. 6.

(Step 1)

Parameters $u_1, u_0, v_1$, and $v_0$ in the Mumford expression of the divisor 2D shown below $$2D = (x^2 + u_1 x + u_0, v_1 x + v_0)$$

are expressed by u and v appearing in the Mumford expression of D (D=(x+u, v)).

Figure 6:
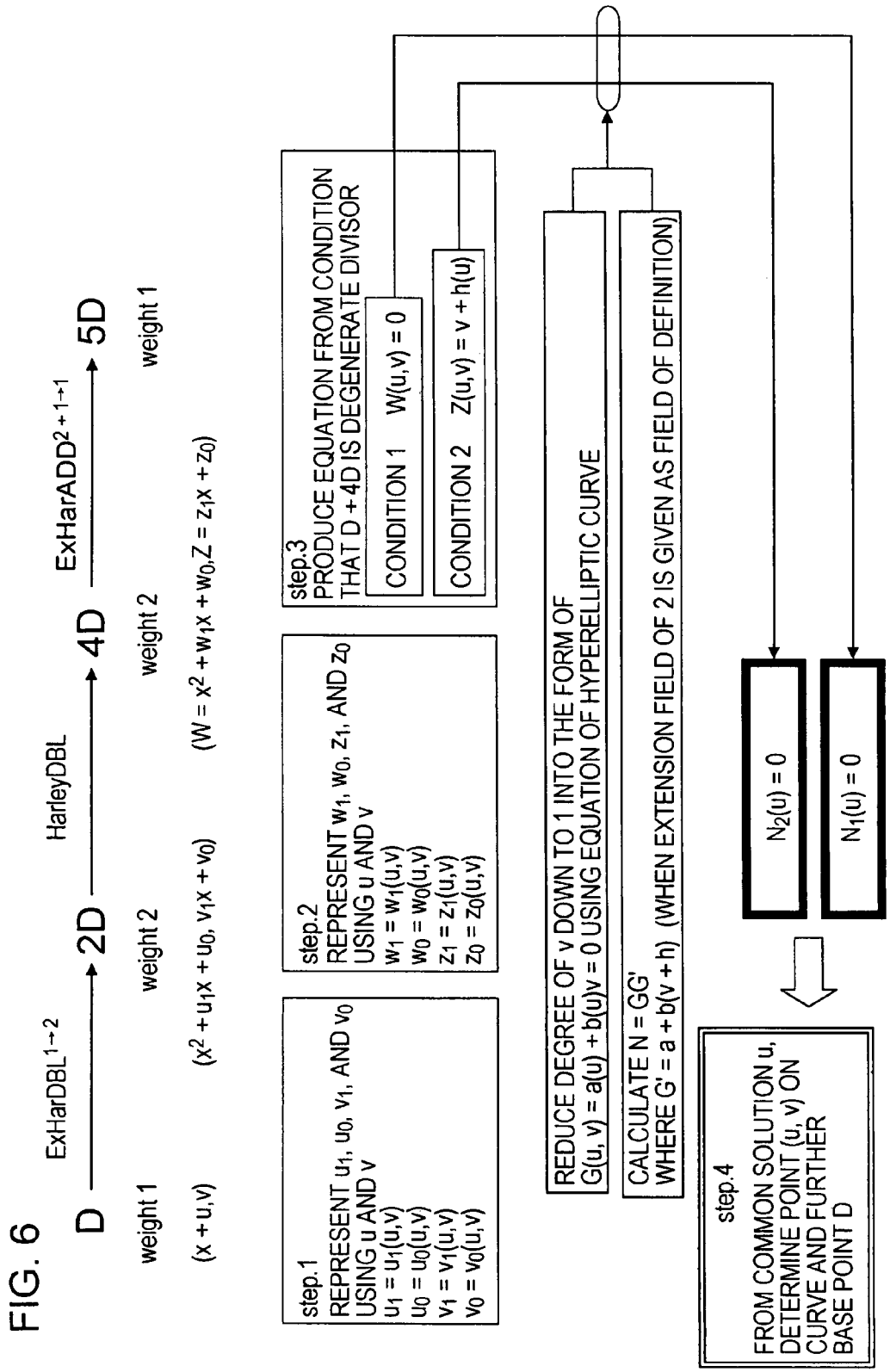
FIG. 6 is a diagram showing in detail a process of detecting a divisor D used as a base point and a divisor 5D on a hyperelliptic curve of genus (g) of 2 such that both D and 5D are degenerate divisors with a weight=1.

These parameters are denoted in the same manner as in step 1 in FIG. 6, that is, they are denoted as follows:

$$u_1 = u_1(u, v)$$

$$u_0 = u_0(u, v)$$

$$v_1 = u_1(u, v)$$

$$v_0 = u_0(u, v)$$

From the formula applied to the process D→2D, that is, from the formula [ExHarDBL$^{1\rightarrow 2}$] shown in table 8, the following relational expressions (1) are obtained.

[Mathematic Expression 19]

$$u_1 = 0,$$ (Equation 1)

$$u_0 = u^2,$$

$$v_1 = \frac{u^4 + f_3 u^2 + f_1 + h_1 v}{u^2 + h_1 u + h_0},$$

$$v_0 = \frac{u^4 + f_3 u^2 + f_1 + h_1 v}{u^2 + h_1 u + h_0} u + v.$$

(Equation 1)

(Step 2)

Parameters $w_1, w_0, z_1$, and $z_0$ in the Mumford expression of the divisor 4D shown below $$4D = (x^2 + w_1 x + w_0, z_1 x + z_0)$$

are expressed by u and v appearing in the Mumford expression of D (D=(x+u, v)).

These parameters are denoted in the same manner as in step 2 in FIG. 6, that is, they are denoted as follows:

$$w_1 = w_1(u, v)$$

$$w_0 = w_0(u, v)$$

$$z_1 = z_1(u, v)$$

$$z_0 = z_0(u, v)$$

From the formula applied to the process 2D→4D, that is, from the formula [HarleyDBL] shown in table 2, relational expressions of r in step 1 and $t_1$ and $t_0$ in step 3 with respect to $u_1$, $u_0$, $v_1$, and $v_0$ are obtained, and $w_1$, $w_0$, $z_1$, and $z_0$ are expressed using $u_1$, $u_0$, $v_1$, $v_0$, $t_1$, $t_0$, and r as shown below in (Equation 2).

[Mathematic Expression 20]

$$t_1 = (h_0 + u_0 + u_1(h_1 + u_1))(f_3 + v_1 + u_1^2) + \quad \text{(Equation 2)}$$
$$(h_1 + u_1)(v_0 + v_1(v_1 + h_1))$$
$$t_0 = (u_1(h_0 + u_0 + u_1(h_1 + u_1)) +$$
$$u_0(h_1 + u_1))(f_3 + v_1 + u_1^2) +$$
$$(h_0 + u_0 + u_1(h_1 + u_1))(v_0 + v_1(v_1 + h_1))$$
$$r = u_0(u_0 + h_0 + h_1(h_1 + u_1)) +$$
$$h_0(h_0 + u_0 + u_1(h_1 + u_1))$$
$$w_1 = \frac{1}{rt_1}\left(1 + \frac{1}{rt_1}\right)$$
$$w_0 = \frac{r}{t_1}\left(\frac{t_0}{t_1}\left(1 + \frac{t_0}{r}\right) + h_1 + u_1\right)$$
$$z_1 = \left(\frac{t_1}{r} + \frac{t_0}{r}\right)(u_1 + w_1 + u_0 + w_0) +$$
$$\frac{t_1}{r}(u_1 + w_1) + \frac{t_0}{r}(u_0 + w_0) +$$
$$\left(\frac{t_1}{r}(u_1 + w_1) + 1\right)w_1 + v_1 + h_1$$
$$z_0 = \frac{t_0}{r}(u_0 + w_0) + \left(\frac{t_1}{r}(u_1 + w_1) + 1\right)w_0 + v_0 + h_0$$

(Equation 2)

By substituting the above result (obtained in step 1) into (Equation 2), $w_1$, $w_0$, $z_1$, and $z_0$ are expressed using only u and v appearing in the Mumford expression of D.

(Step 3)

Using the condition for 5D=D+4D to have a weight=1, an one-variable equation of u is produced.

The calculation of D+4D is accomplished using the formula ExHarADD$^{1+2 \to 1}$. In the determination on the branching to select an adequate addition formula of Harley shown in FIG. 1, the addition of divisors D and 4D is determined to correspond to weight 1+weight 2, and thus ExHarADD$^{2+1 \to 2}$ or exception handling 3 is selected as the formula to be used.

An algorithm of ExHarADD$^{2+1 \to 2}$ is shown below in [Table 3]

[Mathematic Expression 21]

TABLE 3

ExHarADD$^{2+1 \to 2}$ (genus 2)
Input: $D_1 = (u_1, v_1)$, deg $u_1 = 1$, $D_2 = (u_2, v_2)$, deg $u_2 = 2$
Output: $D_3 = (u_3, v_3) = D_1 + D_2$

| | | |
|---|---|---|
| 1 | Compute r = $u_2$ mod $u_1$: <br> r ← $u_{20} + (u_{21} + u_{10})u_{10}$. | 1M |
| 2 | Compute inverse of $u_2$ mod $u_1$: <br> inv ← 1/r. | 1I |
| 3 | Compute $s_0 = \text{inv}(v_1 + v_2)$ mod $u_1$: <br> $s_0$ ← inv($v_{10} + v_{20} + v_{21}v_{10}$). | 2M |
| 4 | Compute l = s - $vu_2 = s_0 x^2 + l_1 x + l_0$: <br> $l_1$ ← $s_0 u_{21}$, $l_0$ ← $s_0 u_{20}$. | 2M |
| 5 | Compute k = (f + $v_2$h + $v_2^2$)/$u_2$ = $x^3 + k_2 x^2 + k_1 x + k_0$: <br> $k_2$ ← $f_4 + u_{21}$, $k_1$ ← $f_3 + (f_4 + u_{21})u_{21} + v_{21} + u_{20}$. | 1M |
| 6 | Compute $u_3$ = (k + s(l + h))/$u_1$ = $x^2 + u_{31}x + u_{30}$: <br> $u_{31}$ ← $k_2 + s_0^2 + s_0 + u_{10}$, <br> $u_{30}$ ← $k_1 + s_0(l_1 + h_1) + u_{10}u_{31}$. | 3M |
| 7 | Compute $v_3 = v_{31}x + v_{30} \equiv (l + v_2) + h$ mod $u_3$: <br> $v_{31}$ ← $u_{31}(h_2 + s_0) + (h_1 + l_1 + v_{21})$, <br> $v_{30}$ ← $u_{30}(h_2 + s_0) + (h_0 + l_0 + v_{20})$. | 2M |
| total | ExHarADD$^{2+1 \to 2}$ | 1I + 11M |

As can be seen from [Table 3], there is no branch that causes the output of ExHarADD$^{2+1 \to 2}$ to be a degenerate divisor (with a weight=1). Therefore, it is needed to perform exception handling 3 to determine the condition for the output to be a degenerate divisor. In the exception handling 3, 5D can be a degenerate divisor having a weight=1 when D and 4D satisfy the following condition.

[Condition]

$$D = P - P_\infty$$

$$4D = -P + Q - 2P_\infty$$

The above condition reduces to two conditions described below, and two equations with respect of u and v of the base point D corresponding to the two conditions are obtained.

(Condition 1)

$$w_1(u,v) \times u + w_0(u,v) = 0 \quad \text{(Equation 3a)}$$

(Condition 2)

$$z_1(u,v) \times u + z_0(u,v) = v + h(u) \quad \text{(Equation 4a)}$$

Equations corresponding to the respective conditions 1 and 2 are denoted as (Equation 3a) and (Equation 4a). These conditions 1 and 2 are required to be satisfied in step 3 shown in FIG. 6.

Equations 3a and 4a are with respect to u and v appearing in the Mumford expression of D, that is, D=(x+u, v). Both equations 3a and 4a can be converted into one-variable equations with respect to u as described below.

From the equation defining the hyperelliptic curve, $v^2$ is given as $$v^2 = h(u)v + f(u)$$

By using this equation, any term including $v^2$ can be converted into a linear expression of v. By repeatedly applying this operation, it is possible to reduce the degree of v. Thus, equation 3a can be formally expressed as follows.

$$G_1(u,v) = a_1(u) + b_1(u)v = 0$$

Furthermore, if a polynomial conjugate to G is defined as $$G_1(u,v)=a_1(u)+b_1(u)(v+h(u))$$

then $$N_1=G_1 \times G_1{'}=a_1^2+a_1 b_1 h+b_1^2 f$$

is obtained and thus finally an one-variable equation (Equation 3b) with respect to u is obtained as shown below.

$$N_1(u)=0 \quad \text{(Equation 3b)}$$

A similar process is performed for Equation 4a to obtain an one-variable equation of u shown below.

$$N_2(u)=0 \quad \text{(Equation 4b)}$$

If $N_1$ and $N_2$ in (Equations 3b) and (Equation 4b) are calculated by performing the above-described steps, polynomials of u of degree 53 and 72 are finally obtained. It is known that one-variable polynomial equations of finite degree can be generally solved within a polynomial time. Solutions of u are determined for the respective polynomial equations.

(Step 4)

If there is a common solution in the solutions of the two equations determined in step 3, the common solution is employed as u of the divisor.

The obtained u is then substituted into the hyperelliptic curve equation $v^2+h(u)=f(u)$, thereby determining v.

Using the determined u and v, the degenerate divisor of the base point is determined by calculating $D=(x-u, v)$.

The base point D determined in the above-described manner is a degenerate divisor with a weight=1, and it is guaranteed that 5D is also a degenerate divisor with a weight=1.

Figure 7:
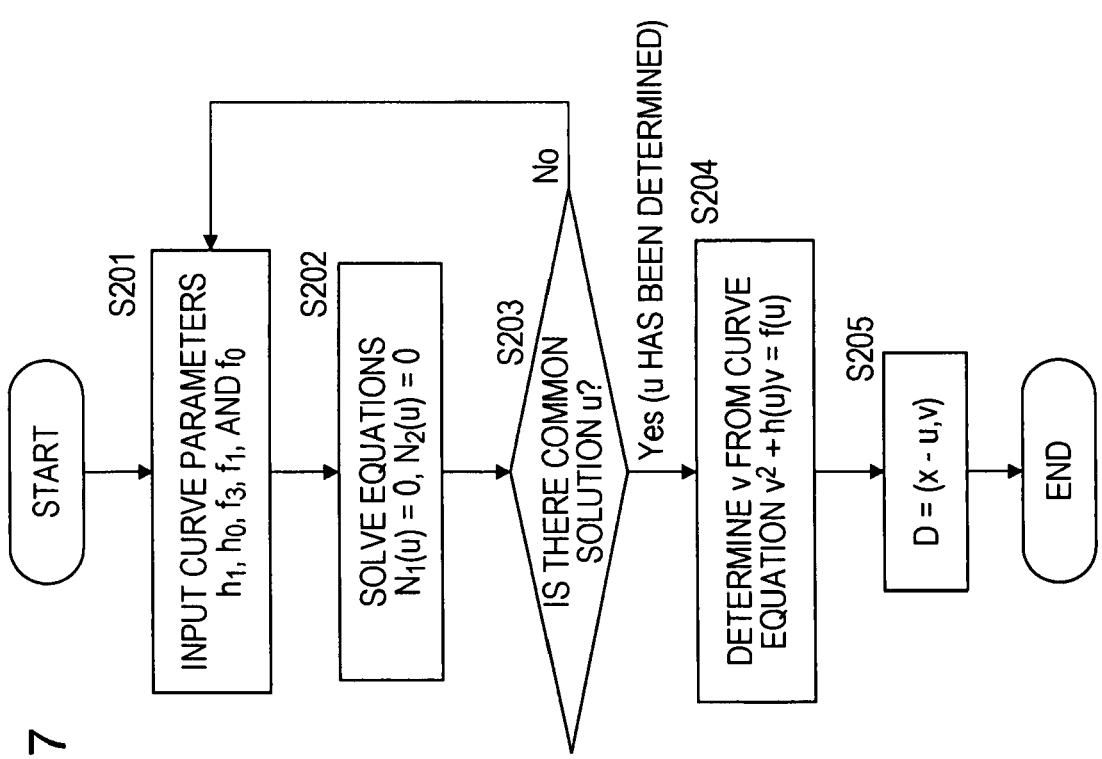
FIG. 7 is a flow chart a process of detecting a divisor D used as a base point and a divisor 5D on a hyperelliptic curve of genus (g) of 2 such that both D and 5D are degenerate divisors with a weight=1.

Now, referring to a flow chart shown in FIG. 7, a process of producing degenerate divisors D and 5D is described below. First, in step S201, parameters of the hyperelliptic curve are input. As described above, the hyperelliptic curve is characterized by the genus g. When $q=p^n$ where p is a prime and n is a positive integer, a hyperelliptic curve C of genus g defined over a finite field $F_q$ is defined by the following equation:

$$y^2+h(x)y=f(x)$$

where h(x), $f(x) \in F_q[x]$, and f(x) is a monic polynomial of degree 2g+1.

More specifically, the hyperelliptic curve equation $y^2+h(x)=f(x)$ is defined by $$h(x)=x^2+h_1 x+h_0$$

$$f(x)=x^5+f_3 x^3+f_1 x+f_0$$

Thus, as described above, the hyperelliptic curve of genus g=2 has been defined by setting the parameters $h_1$, $h_0$, $f_3$, $f_1$, and $f_0$.

In step S202, the common solution (u) of the one-variable equations of u determined by using the condition for 5D=D+4D to have a weight=1, that is, the common solution of the following two equations is determined.

$$N_1(u)=0 \quad \text{(Equation 3b)}$$

$$N_2(u)=0 \quad \text{(Equation 4b)}$$

These equations are obtained, as described above, from the [Condition] required for 5D to be a degenerate divisor with a weight=1 in the exception handling 3 shown in FIG. 1 in the addition process of 5D=D+4D. That is, from the following condition

[Condition]

$$D=P-P_\infty$$

$$4D=-P+Q-2P_\infty$$

the following two conditions are obtained.

(Condition 1)

$$w_1(u,v) \times u + w_0(u,v)=0 \quad \text{(Equation 3a)}$$

(Condition 2)

$$z_1(u,v) \times u + z_0(u,v)=v+h(u) \quad \text{(Equation 4a)}$$

Furthermore, by applying the following equation defining the hyperelliptic curve $$v^2=h(u)v+f(u)$$

to Equations 3a and 4a, thereby converting them into the form of a linear equation of v. Thus, Equation 3a is converted into the following form.

$$G_1(u,v)=a_1(u)+b_1(u)v=0$$

Furthermore, a polynomial conjugate to G is defined as follows.

$$G_1(u,v)=a_1(u)+b_1(u)(v+h(u)) \text{ Thus,}$$

$$N_1=G_1 \times G_1{'}=a_1^2+a_1 b_1 h+b_1^2 f$$

Thus, $$N_1(u)=0 \quad \text{(Equation 3b)}$$

is obtained and finally the following equation is obtained.

$$N_2(u)=0 \quad \text{(Equation 4b)}$$

In step S202, the common solution (u) of the above two equations, which are shown again below, is determined.

$$N_1(u)=0 \quad \text{(Equation 3b)}$$

$$N_2(u)=0 \quad \text{(Equation 4b)}$$

In a case where there is no common solution for the above equation (that is, if the answer to step S203 is No), the process returns to step S201 to set the parameters $h_1$, $h_0$, $f_3$, $f_1$, and $f_0$ to other values and perform the calculation to find the common solution (u).

If the common solution (u) has been found (that is, if the answer to step S203 is Yes), the process proceeds to step S204. In step S204, the substitution of the hyperelliptic curve $v^2+h(u)=f(u)$ is performed and v is determined. Next, in step S205, using the determined u and v, the degenerate divisor used as the base point $D=(x-u, v)$ is determined.

(Process A2) The wNAF Conversion is Performed Using the Degenerate Divisors D and 5D to Obtain wNAF Data Including Only Degenerate Divisors In the previous process, the degenerate divisor used as the base point D with a weight=1 which is also degenerate when multiplied into 5D on the hyperelliptic curve of genus (g)=2 has been found. Using these degenerate divisors D and 5D, a wNAF data having resistance against the analysis attach such as the simple power analysis (SPA) is produced as described below.

In the wNAF conversion, as described above with reference to the window algorithm, the scalar value [d] used in the scalar multiplication operation [D=dD] is divided into blocks each having a predetermined number of digits. More specifically, the scalar value d given as the multiplier is divided into the following blocks.

|00 . . . 0x|00 . . . 0x|00 . . . 0x| . . .

where x is an odd integer ($\pm 1$, $\pm 3$, . . . ).

The scalar multiplication simply using only the degenerate divisors D and 5D detected above does not provide high resistance against the SPA. To achieve high security for the case where the scalar value [d] is divided into bocks with a block size (number of digits) of 2 by the window algorithm (wNAF) as follows,

|01|, |03|, |0(−1)|, |0(−3)|, it is needed to prepare, in the table, the precalculated data ±D and ±3D corresponding to the above blocks.

In the case where the scalar value [d] is divided into blocks with a block size of 3 as follows,

|001|, |003|, |005|, |0079|,
|00(−1)|, |00(−3)|, |00(−5)|, |00(−7)| it is needed to prepare, in the table, the precalculated data ±D, ±3D, ±5D, and ±7D corresponding to the above blocks.

However, in the present algorithm, only degenerate divisors D and 5D are produced in the process described above, and all data necessary as precalculated data have not yet been obtained. For example, in the case where the scalar value [d] is divided into blocks with a block size (the number of digits) of 3, some of the necessary data ±D, ±3D, ±5D, and ±7D have not yet been calculated, and it is impossible to accomplish the window algorithm. It is possible to calculate 3D and 7D separately from D and 5D. However, in this case, there is very high probability that the resultant values are not degenerate. The result of this is that the addition operation in the scalar multiplication includes a mixture of addition of divisors including a degenerate divisor and addition of divisors which are all of the non-degenerate type. In this case, the difference in power consumption or processing time in the process can cause a weakness against analysis attack such as the simple power analysis (SPA).

In the present algorithm, to avoid the above problem, the scalar multiplication based on the window algorithm is performed using the degenerate divisors D and 5D detected in the previous step while maintaining high resistance against the analysis attack such as the simple power analysis (SPA).

Figure 8:
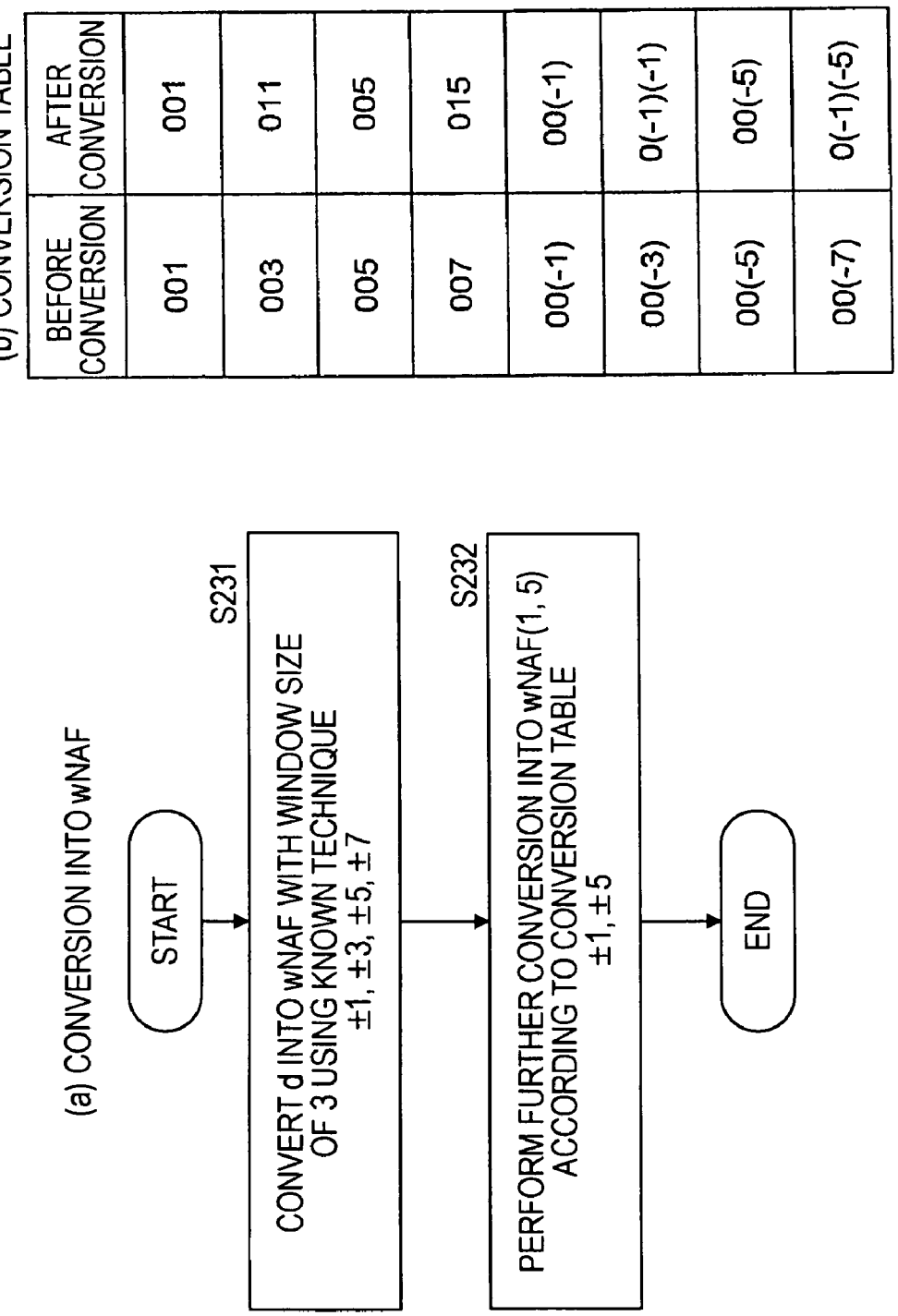
FIG. 8 is a diagram showing an improved wNAF conversion process and an improved wNAF(1, 5) process using degenerate divisors D and 5D in a scalar multiplication operation based on a window algorithm while maintaining high resistance against simple power analysis (SPA).

The improved wNAF conversion method used herein in the scalar multiplication operation based on the window algorithm using the degenerate divisors D and 5D while maintaining the high resistance against the simple power analysis (SPA) is called wNAF(1, 5). The wNAF(1, 5) process includes a wNAF conversion process based on the above-described technique and a process of further converting the wNAF data according to a conversion table. The process of further converting the wNAF data is shown in FIG. 8.

First, in step S231, the wNAF conversion process is performed in a similar manner to step S153 in FIG. 5 described above in the [(1B) Algorithm based on the window algorithm].

That is, the scalar value d given as the multiplier is converted into the wNAF form. More specifically, the scalar value d given as the multiplier is divided into blocks as follows.

|00 . . . 0x|00 . . . 0x|00 . . . 0x| . . .

where x is an odd integer (±1, ±3, . . . ).

Herein, by way of example, it is assumed that the window size is set to be 3 in the wNAF conversion process. In this case, ±D, ±3, ±5D, and ±7D are selected as precalculated data [dD] to be stored in the table.

Next, in step S232, the precalculated data ±D, ±3, ±5D, and ±7D to be stored in the table are converted, using the conversion table shown in FIG. 8(b), into a form expressible using only the degenerate divisors D and 5D which have already been calculated.

According to conversion table shown in FIG. 8(b), the conversion is performed as follows.

block associated with calculation of +D: [001]→[001] (no change occurs)
block associated with calculation of +3D: [003]→[011]
block associated with calculation of +5D: [005]→[005] (no change occurs)
block associated with calculation of +7D: [007]→[015]
block associated with calculation of −D: [00(−1)]→[00(−1)] (no change occurs)
block associated with calculation of −3D: [00(−3)]→[0(−1)(−1)]
block associated with calculation of −5D: [00(−5)]→[00(−5)] (no change occurs)
block associated with calculation of −7D: [00(−7)]→[0(−1)(−5)]

Thus, by performing the above conversion using the conversion table, the precalculated data [±D, ±3, ±5D, and ±7D] to be stored in the table has been converted into the form using only ±1 and ±5 so that the data can be expressed using the degenerate divisors D and 5D.

That is, via the above conversion process, the precalculated data [±D, ±3, ±5D, and ±7D] to be stored in the table has been converted into the form using only ±1 and ±5 so that the data can be expressed using the degenerate divisors D and 5D. The scalar multiplication D=dD is accomplished by performing addition operations using the degenerate divisors D and 5D in the above-described form, that is, by performing addition operations using only degenerate divisors.

(Process A3) The Scalar Multiplication is Performed Using the Precalculated Data Expressed Only by the Degenerate Divisors D and 5D The details of the algorithm of converting the precalculated data [±D, ±3, ±5D, and ±7D] to be stored in the table into the form including only the degenerate divisors D and 5D, and performing the scalar multiplication [D=dD] using these data are described below.

The algorithm of the scalar multiplication is shown below in [Algorithm 7].

[Mathematic Expression 22]

| Scalar Multiplication (Algorithm7) |
|---|
| Input: d[i] converted into wNAF(1, 5), base point D, k = [n/3] |
| Output:dD |
| 0.Precompute (\|d[i]\|)P   for all   d[i](\|d[i]\|D ← D for d[i] = 0) |
| 1.D[0] ← d[n − 2]D |
| 2.D[1] ← d[n − 3]D |
| 3.D[0] ← 2D[0] |
| 4.D[0] ← D[0] + d[n − 3]D |
| 5.D[0] ← D[~δ(d[n − 2])] |
| 6. For i from k − 1 to 0 |
|     7.1.D[0] ← 2 times 2D[0] |
|     7.2 D[1] ← D[0] + d[3i + 1]D |
|     7.3.D[0] ← D[δ(d[i])] |
|     7.4 D[0] ← 2D[0] |
|     7.5 D[0] ← D[0] + d[3i]D |
| 7.Retuen D[0] |

In the algorithm described above, δ is a function which returns 0 for d[i]=0 and 1 for any other values of d[i], and [~] denotes a bit inversion of δ, that is, [~] causes δ=1 to be inverted into 0 and 0 into 1.

In the above algorithm, ±D, ±3, ±5D, and ±7D] are expressed using only the degenerate divisors D and 5D which have already been detected, and any addition operation occurring in the scalar multiplication operation is accomplished by addition of a degenerate divisor and a non-degenerate divisor. In the case where in the converted table, if a 2nd bit is 0, a dummy operation is performed. Thus, a high-speed calculation is possible. Besides, because the addition operations do not include addition of non-degenerate divisors, there is no difference in power consumption which would otherwise occur depending on the difference in processing time between degenerate divisors and non-degenerate divisors. Thus, a high-speed calculation is achieved without causing degradation in resistance against the attack such as the SPA or the TA.

Referring to a flow chart shown in FIG. 9, there is described below a total sequence of searching for degenerate divisors D and 5D on the curve of genus (g)=2 such that the base point D and 5D both have a weight=1, converting the wNAF data into the modified wNAF data expressed using only the detected degenerate divisors D and 5D, performing the scalar multiplication operation using the modified wNAF data.

Figure 9:
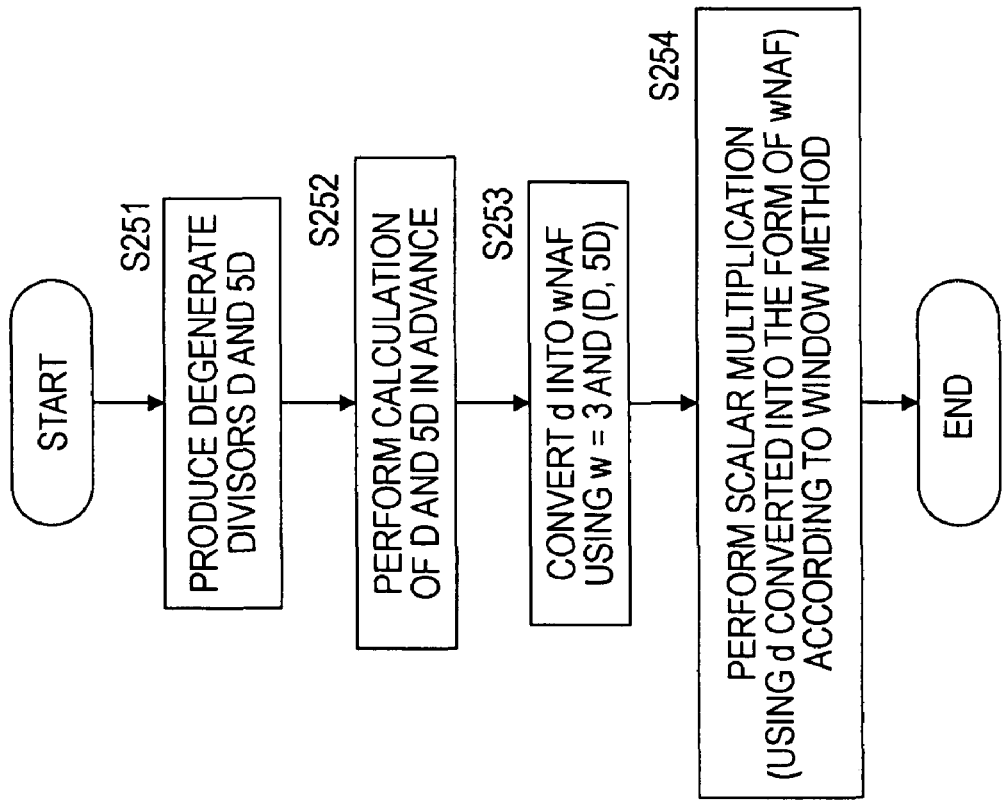
FIG. 9 is a flow chart showing a total sequence of detecting a divisor D used as a base point and a divisor 5D on a curve of genus (g) of 2 such that both D and 5D are degenerate divisors with a weight=1, converting wNAF data into modified wNAF data expressed using only the detected degenerate divisors D and 5D, and performing a scalar multiplication operation using the modified wNAF data.

First, in step S251 in FIG. 9, a divisor is detected such that the base point [D] and [5D] are both degenerate divisors with a weight=1. The detection of such a divisor can be accomplished by the process described above with reference to FIGS. 6 and 7. That is, according to the [Condition] required for 5D to be a degenerate divisor, that is, to have a weight=1 in the exception handling 3 shown in FIG. 1 and according to the equation $v^2=h(u)v+f(u)$ defining the hyperelliptic curve, the common solution (u) for the following equations is determined.

$N_1(u)=0$ (Equation 3b)

$N_2(u)=0$ (Equation 4b)

Thereafter, v is determined by substituting the obtained u into the hyperelliptic curve equation $v^2+h(u)=f(u)$. Using the determined u and v, the degenerate divisor D=(x−u, v) of the base point is determined.

In step S252, another degenerate divisor 5D is precalculated from the base point D calculated in step S251. This can be accomplished by performing a sequence of operations described below.

D→2D: ExHarDBL$^{1\rightarrow 2}$ (Table 8)

2D→4D: HarleyDBL (Table 2)

4D→5D: ExHarADD$^{2+1\rightarrow 1}$

In step S253, the scalar value d given as the multiplier used in the scalar multiplication operation d=dD is converted into the wNAF form. From the resultant wNAF data, modified wNAF data expressed only by the degenerate divisors D and 5D calculated in steps S251 and S252 is produced. For example, in the case of the window size=3, data [±D, ±3, ±5D, and ±7D] appearing in the ordinal wNAF form are expressed using only the degenerate divisors D and 5D. The conversion is accomplished using the conversion table shown in FIG. 8.

Finally, in step S254, the scalar multiplication operation D=dD is performed. This scalar multiplication operation is performed using the precalculated data expressed only by the degenerate divisors D and 5D according to [Algorithm 7] described above. In this scalar multiplication, data [±D, ±3, ±5D, and ±7D] appearing in the ordinal wNAF form are converted into expressions using only the degenerate divisors D and 5D, and any addition operation occurring in the scalar multiplication operation is accomplished by addition of degenerate divisors. Thus, a high-speed calculation is possible. Besides, because the addition operations do not include addition of non-degenerate divisors, there is no difference in power consumption which would otherwise occur depending on the difference in processing time between degenerate divisors and non-degenerate divisors. Thus, a high-speed calculation is achieved without causing degradation in security against the attack such as the SPA or the TA.

(Algorithm B) Algorithm of efficiently searching for degenerate divisors D and 3D on a curve of genus (g)=3 such that the base point D and 3D both have a weight=2, converting wNAF data into a modified wNAF data expressed using only the detected degenerate divisors D and 3D, and performing the scalar multiplication using the resultant modified wNAF data Now, there is described an algorithm of efficiently searching for degenerate divisors D and 3D on a curve of genus (g)=3 such that the base point D and 3D both have a weight=2, converting wNAF data into a modified wNAF form expressed using only the detected degenerate divisors D and 3D, and performing the scalar multiplication using the resultant modified wNAF data.

In this algorithm, a base point [D] and [3D] on the hyperelliptic curve of genus (g)=3 are efficiently detected such that [D] and [3D] are both degenerate divisors with a weight=2, wNAF data is converted into a form expressed using only D and 3D, and the scalar multiplication is performed using the resultant modified wNAF data including only degenerate divisors.

As described above, it is substantially impossible to find a base point D by randomly generating divisors and checking whether both the base point D and 3D are simultaneously degenerate divisors. The present algorithm provides a method of efficiently finding a base point D such that D and 3D are both degenerate. In the scalar multiplication operation, D and 3D are prepared as precalculated divisors, and all precalculated divisors necessary in the window algorithm are obtained using D and 3D. In the case of genus (g)=3, unlike the case of genus (g)=2, further conversion of wNAF data is not necessary, and it is sufficient to prepare only D and 3D as the precalculated divisors. The present algorithm includes the following three processes.

(Process B1) Process of efficiently finding D such that the base point D and 3D are both degenerate divisors with a weight=2

(Process B2) Process of performing scalar multiplication using the precalculated data expressed only by the degenerate divisors D and 3D The details of the respective processes (Process B1) and (Process B2) are described below.

(Process B1) Process of efficiently finding D such that the base point D and 3D are both degenerate divisors with a weight=2

Searching for a divisor D such that the base point D and 3D are both degenerate divisors with a weight 2 is accomplished by applying a method of determining a condition that w(D)= w(3D)=2 by calculating 3D from the base point D using the Harley formula, where w(D)=w(3D)=3 denotes that weight (w)=2 for both the divisors D and 3D.

In order to determine the condition for D to have w(D)=w(3D)=2, let us calculate 3D from D by an addition chain based on the Harley formula. Let divisors D and 2D be expressed in the Mumford form as follows.

$$D = (x^2 + u_{21}x + u_{20}, v_{21}x + v_{20})$$

$$2D = (x^3 + u_{12}x^2 + u_{11}x + u_{10}, v_{12}x^2 + v_{11}x + v_{10})$$

The calculations D→2D and 2D→3D can be performed using the following Harley formulae:

D→2D: ExHarDBL$^{2\to3}$ (Table 9)

2D→3D: ExHarADD$^{2+3\to2}$ (Table 7)

The details of the above operations according to the Harley formulae, that is,

D→2D: ExHarDBL$^{2\to3}$ (Table 9) and

2D→3D: ExHarADD$^{2+3\to2}$ (Table 7)

are shown below in [Table 9] and [Table 7].

[Mathematic Expression 23]

TABLE 9

ExHarDBL$^{2\to3}$ (genus 3)
Input: $D_1 = (u_1, v_1)$, deg $u_1 = 2$
Output: $D_3 = (u_3, v_3) = 2D_1$

| | | |
|---|---|---|
| 1 | Compute $r = \mathrm{res}(u_1, h)$:<br>$w_0 \leftarrow u_{10}^2, w_1 \leftarrow u_{11}^2, w_2 \leftarrow u_{11}h_2, w_3 \leftarrow w_1h_2,$<br>$w_4 \leftarrow w_0(u_{10} + w_2 + h_2^2), w_5 \leftarrow (w_1 + h_1)h_1 + (h_0 + h_1h_2)u_{11},$<br>$w_5 \leftarrow w_5u_{10} + w_4, w_4 \leftarrow h_0(h_0 + w_3 + u_{11}(h_1 + w_1)).$<br>$r \leftarrow w_4 + w_5$ | 12M |
| 2 | Compute $I = i_1x + i_0 \equiv rh^{-1} \bmod u_1$<br>$i_1 \leftarrow w_1 + w_2 + h_1 + u_{10}, i_0 \leftarrow u_{11}(w_1 + h_1) + w_3 + u_{10}h_2 + h_0$ | 3M |
| 3 | Compute $K = k'_1x + k'_0 \equiv (f + hv_1 + v_1^2)/u_1 \bmod u_1$:<br>$z_0 \leftarrow h_2v_{11}, k_1 \leftarrow w_1(w_1 + f_5 + u_{10}) + (f_4 + v_{11})u_{11} + z_0 + v_{10} + f_3 + u_{10}f_5 + w_0,$<br>$k_0 \leftarrow w_1(u_{11}(w_1 + f_5) + f_4 + v_{11}) + (z_0 + v_{10} + f_3 + w_0)u_{11} + v_{11}(v_{11} + h_1) +$<br>$h_2v_{10} + f_2 + u_{10}(f_4 + v_{11}),$<br>$d_1 \leftarrow w_1 + f_5, d_0 \leftarrow v_{11} + f_4,$<br>$z_0 \leftarrow u_{10}d_0, k'_1 \leftarrow k_1 + (u_{11} + u_{10})(d_1 + d_0) + u_{11}d_1 + z_0, k'_0 \leftarrow z_0 + k_0$ | 13M |
| 3 | Compute $T = t_1x + t_0 \equiv I(f + hv_1 + v_1^2)/u_1 \bmod u_1$:<br>$z_1 \leftarrow i_1k'_1, z_0 \leftarrow i_0k'_0,$<br>$t_1 \leftarrow z_1u_{11} + (i_1 + i_0)(k'_1 + k'_0) + z_1 + z_0, t_0 \leftarrow z_0 + z_1u_{10}$ | 5M |
| 5 | Compute $S = rT = s_1x + s_0$:<br>$\mathrm{inv} \leftarrow 1/r, s_1 \leftarrow \mathrm{inv}t_1, s_0 \leftarrow \mathrm{inv}t_0$ | I + 2M |
| 6 | Compute $u_3 = x^3 + u_{32}x^2 + u_{31}x + u_{30} \equiv (S(Su_1 + h) + K)/u_1$:<br>$u_{32} \leftarrow s_1(s_1 + 1),$<br>$u_{31} \leftarrow w_1 + s_1(h_2 + u_{11}) + s_0 + f_5,$<br>$u_{30} \leftarrow s_0(s_0 + h_2 + u_{11}) + s_1(h_1 + u_{10} + u_{11}h_2 + w_1) + v_{11} + f_4$ | 5M |
| 7 | Compute $v_3 = v_{32}x^2 + v_{31}x + v_{30} \equiv Su_1 + v_1 + h \bmod u_3$:<br>$u_{32} = s_1(u_{32} + u_{11}) + u_{32} + h_2 + s_0,$<br>$v_{31} = u_{31} + h_1 + u_{11}s_0 + s_1(u_{31} + u_{10}) + v_{11},$<br>$v_{30} = v_{10} + h_0 + u_{30} + s_0u_{10} + s_1u_{30}$ | 5M |
| total | HarleyDBL | 1I + 45M |

[Mathematic Expression 24]

TABLE 7

ExHarADD$^{1+2\to3}$, ExHarADD$^{1+2\to2}$ (genus 3)
Input: $D_1 = (u_1, v_1)$, deg $u_1 = 3$, $D_2 = (u_2, v_2)$, deg $u_2 = 2$
Output: $D_3 = (u_3, v_3) = D_1 + D_2$

| | | |
|---|---|---|
| 1 | Compute $r = \mathrm{res}(u_1, u_2)$:<br>$w_0 \leftarrow u_{20}^2, w_1 \leftarrow u_{11}^2, w_2 \leftarrow u_{21}^2, w_3 \leftarrow u_{12} + u_{21}.$<br>$w_4 \leftarrow w_0(u_{20} + u_{12}w_3), w_5 \leftarrow u_{21}(u_{10} + u_{11}w_3), w_5 \leftarrow u_{20}(w_5 + w_1),$<br>$w_6 \leftarrow w_3w_2 + u_{21}u_{11}, w_6 \leftarrow u_{10}(u_{10} + w_6), r \leftarrow w_4 + w_5 + w_6$ | 11M |
| 2 | Compute $ru_1^{-1} \bmod u_2 \equiv i_1x + i_0$:<br>$i_2 \leftarrow u_{21}u_{12}, i_3 \leftarrow u_{21}u_{11}, i_4 \leftarrow u_{20}u_{12},$<br>$i_1 \leftarrow i_2 + w_2 + w_{20} + u_{11}: i_0 \leftarrow w_2w_3 + i_3 + i_4 + u_{10}$ | 4M |
| 3 | Compute $t \equiv t_1x + t_0 \equiv r(v_1 + v_2)u_1^{-1}) \bmod u_2$:<br>$c_1 \leftarrow v_{11} + v_{21} + v_{12}u_{21}, c_0 \leftarrow v_{20} + v_{10} + v_{12}u_{20},$<br>$t_2 \leftarrow i_1c_1, t_3 \leftarrow i_0c_0, t1 = t_2u_{21} + (i_1 + i_0)(c_1 + c_0) + t_2 + t_3,$<br>$t_0 \leftarrow t_3 + t_2u_{20}.$ | 7M |

TABLE 7-continued

ExHarADD$^{1+2\to 3}$, ExHarADD$^{1+2\to 2}$ (genus 3)
Input: $D_1 = (u_1, v_1)$, deg $u_1 = 3$, $D_2 = (u_2, v_2)$, deg $u_2 = 2$
Output: $D_3 = (u_3, v_3) = D_1 + D_2$

| | | |
|---|---|---|
| 4 | If $t_1 = 0$ then goto 5'. | |
| 5 | Compute $s = t/r \equiv s_1 x + s_0$: | 1I + 6M |
| | $z_1 \leftarrow rt_1, z_2 \leftarrow 1/z_1, z_3 \leftarrow z_2 r, z_4 \leftarrow z_2 t_1, z5 \leftarrow z_3 r, s_1 \leftarrow z_4 t_1, s_0 \leftarrow z_4 t_0$. | |
| 6 | Compute $v = su_1 + v_1 \equiv s_1 x^4 + k_3 x^3 + k_2 x^2 + k_1 x + k_0$: | 5M |
| | $t_0 \leftarrow s_0 u_{12}, t_1 \leftarrow s_0 u_{10}, t_2 \leftarrow s_1 u_{11}$, | |
| | $k_3 \leftarrow (s_1 + s_0)(1 + u_{12}) + s_1 + t_0, k_2 \leftarrow t_0 + t_2 + v_{12}$, | |
| | $k_1 \leftarrow (s_1 + s_0)(u_{11} + u_{10}) + t_2 + t_1 + v_{11}, k_0 \leftarrow t_1 + v_{10}$. | |
| 7 | Compute $u_3 = s_1^{-2}(f + hv + v^2)/(u_1 u_2)$: | 11M |
| | $u_{32} \leftarrow z_5(z_5 + 1) + u_{12} + u_{21}, t_0 \leftarrow k_3^2, t_1 \leftarrow u_{12}^2$, | |
| | $t_2 \leftarrow z_5(z_5(f_6 + u_{12} + u_{21} + t_0 + k_3) + u_{21} + h_2 + u_{12})$, | |
| | $u_{31} \leftarrow i_2 + u_{11} + u_{20} + t_1 + w_2 + t_2$, | |
| | $t_3 \leftarrow (t_1 + w_2)(u_2 1 + u_1 2) + i_3 + i_4 + u_{10}$, | |
| | $t_4 \leftarrow i_2 + u_{20} + w_2 + u_{11} + t_1 + f_5 + (u_{21} + u_{12})(t_0 + f_6 + k_3) + k_2$, | |
| | $t_4 \leftarrow z_5(t_4 + k_3 h_2) + h_2(u_{12} + u_{21}) + t_1 + w_2 + i_2 + u_{20} + u_{11} + h_1, t_4 \leftarrow z_5 t_4$, | |
| | $u_{30} \leftarrow t_3 + t_4$. | |
| 8 | Compute $v_3 = v_{32} x^2 + v_{31} x + v_{30} \equiv su_1 + v_1 + h \bmod u_3$: | 8M |
| | $t_0 \leftarrow s_0(u_{32} + u_{12}), t_1 \leftarrow s_1(u_{31} + u_{11}), t_2 \leftarrow s_1(u_{12} + u_{32})$. | |
| | $v_{32} \leftarrow t_0 + t_1 + t_2 u_{32} + u_{32} = v_{12} + h_2$, | |
| | $t_4 \leftarrow s0(u_{30} + u_{10}), t_5 \leftarrow (s_1 + s_0)(u_{31} + u_{11} + u_{30} + u_{10})$, | |
| | $v_{31} \leftarrow t_5 + t_1 + t_4 + t_2 u_{31} + u_{31} + v_{11} + h_1$, | |
| | $v_{30} \leftarrow t_4 + t_2 u_{30} + u_{30} + v_{10} + h_0$, | |
| total | ExHarADD$^{3+2\to 3}$ | 1I + 52M |
| 5' | Compute $s = t_0/r \equiv s_0$: | 1I + 1M |
| | $s_0 \leftarrow t_0/r$. | |
| 6' | Compute $u_3 = x^2 + u_{31} x + u_{30} = (f + hv + v^2)/(u_1 v_2)$: | 3M |
| | $w_1 \leftarrow s_0^2, u_{31} \leftarrow u_{21} + u_{12} + w_1 + s_0$, | |
| | $u_{30} \leftarrow (w_1 + u_{12})(u_{21} + u_{12}) + (h_2 + u_{21})s_0 + w_0 + u_{20} + u_{11} + v_{12} + f_5$. | |
| 7' | Compute $v_3 = v_{31} x + v_{30} \equiv s_0 u_1 + v_1 + h \bmod u_3$: | 6M |
| | $v_{31} \leftarrow (u_{30} + u_{31}(u_{31} + u_{12}) + u_{11})s_0 + u_{31}(u_{31} + h_2 + v_{12}) + u_{30} + h_1 + v_{11}$, | |
| | $v_{30} \leftarrow (u_{10} + u_{30}(u_{31} + u_{12}))s_0 + u_{30}(u_{31} + h_2 + v_{12}) + v_{10} + h_0$. | |
| total | ExHarADD$^{3+2\to 2}$ | 1I + 32M |

3D, which is a scalar multiplication of the base point D, can be obtained by performing a sequence of operations D→2D→3. By using the relational expressions obtained in the above calculation process, a base point D is detected so that D and 3D are both degenerate divisors with a weight=2. The details of the process of detecting the base point D are described below with reference to FIG. 10.

(Step 1)

When the divisor 2D is expressed in the Mumford form as $$2D = (x^3 + u_{12} x^2 + u_{11} x + u_{10}, v_{12} x^2 + v_{11} x + v_{10}),$$

parameters $u_{12}, u_{11}, u_{10}, v_{12}, v_{11}$, and $v_{10}$ appearing in this Mumford expression are expressed using parameters $u_{21}, u_{20}, v_{21}$, and $v_{20}$ appearing in the Mumford expression of D [$D = (x^2 + u_{21} x + u_{20}, v_{21} x + v_{20})$].

These parameters are denoted in the same manner as in step 1 in FIG. 10, that is, they are denoted as follows:

$$u_{12} = u_{12}(u_{21}, u_{20}, v_{21}, v_{20})$$

$$u_{11} = u_{11}(u_{21}, u_{20}, v_{21}, v_{20})$$

$$u_{10} = u_{10}(u_{21}, u_{20}, v_{21}, v_{20})$$

$$v_{12} = v_{12}(u_{21}, u_{20}, v_{21}, v_{20})$$

$$v_{11} = v_{11}(u_{21}, u_{20}, v_{21}, v_{20})$$

$$v_{10} = v_{10}(u_{21}, u_{20}, v_{21}, v_{20})$$

From the formula of D→2D, that is, the formula [ExHarDBL$^{2\to 3}$] shown in table 9, the following relational expression (5) is obtained.

[Mathematic Expression 25]

$$u_{12} = s_1 + s_1^2 \tag{Equation 5}$$

$$u_{11} = f_5 + s_0 + s_1 h_2 + u_{21}^2 + s_1 u_{21}$$

$$u_{10} = s_0 h_2 + s_0^2 + s_1 h_1 + v_{21} + f_4 +$$
$$s_1 u_{20} + s_0 u_{21} + u_{21} s_1 h_2 + s_1 u_{21}^2$$

$$v_{12} = h_2 + s_0 + s_1 u_{21} + s_1 + s_1^3$$

$$v_{11} = v_{21} + h_1 + s_0 u_{21} + s_1 u_{20} + f_5 +$$
$$s_0 + s_1 h_2 + u_{21}^2 + s_1 u_{21} + s_1 f_5 +$$
$$s_0 s_1 + s_1^2 h_2 + s_1 u_{21}^2 + s_1^2 u_{21}$$

$$v_{10} = s_0 u_{20} + v_{20} + h_0 + s_0 h_2 + s_0^2 + s_1 h_1 +$$
$$v_{21} + f_4 + s_1 u_{20} + s_0 u_{21} + u_{21} s_1 h_2 +$$
$$s_1 u_{21}^2 + s_1 s_0 h_2 + s_1 s_0^2 + s_1^2 h_1 +$$
$$s_1 v_{21} + s_1 f_4 + s_1^2 u_{20} + s_0 s_1 u_{21} +$$
$$u_{21} s_1 h_2 + u_{21} s_1^2 h_2 + s_1^2 u_{21}^2$$

$s_1, s_0$, and r in (Equation 5) shown above are functions of $(u_{21}, u_{20}, v_{21}, v_{20})$ given by (Equation 6) shown below.

[Mathematic Expression 26]

$$s_1 = (u_{20}h_1v_{21} + h_1f_2 + u_{21}^2f_2 + u_{20}^3h_2 +$$
$$h_1v_{21}^2 + u_{20}h_2f_3 + u_{20}h_2^2v_{21} + u_{20}h_2u_{21}^4 +$$
$$u_{21}^3h_2f_4 + u21^2h_2f_3 + u_{21}^4h_2f_5 + u_{21}h_2f_2 +$$
$$h_0u_{21}^2f_5 + h_0h_2v_{21} + u_{20}h_2u_{21}^2f_5 + h_1u_{21}v_{20} +$$
$$h_1u_{21}f_3 + h_1u_{21}^3f_5 + h_1h_2v_{20} + h_1u_{21}^2f_4 + u_{21}^7 +$$
$$h_1u_{20}^2u_{21} + h_1^2v_{21} + h_1u_{21}^5 + u_{21}^2v_{21}^2 + u_{21}^3u_{20}^2 +$$
$$u_{21}^3v_{20} + u20u_{21}^2v_{21} + u_{20}u_{21}^2f_4 + u_{21}^4f_4 +$$
$$u_{21}^4v_{21} + u_{21}^3f_3 + u_{21}^5f_5 + u_{21}^6h_2 + h_0u_{21}^4 +$$
$$h_0u_{20}^2 + h_0f_3 + u_{20}v_{21}^2 + u_{20}f_2 + h_0v_{20} +$$
$$u_{21}^2h_2^2v_{21} + u_{21}h_2v_{21}^2 + u_{21}^2h_2u_{20}^2 + u_{21}h_2^2v_{20})/r$$

$$s_0 = (h_0u_{20}^2u_{21} + u_{21}^2h_1u_{20}^2 + u_{20}^2v_{20} + u_{20}^2f_3 +$$
$$u_{21}^2h_1f_3 + u_{21}^4h_1f_5 + u_{21}h_1^2v_{21} + u_{21}^6h_1 +$$
$$u20h_2v_{21}^2 + u_{20}h_2u_{21}^2f_4 + h_0v_{21}^2 + h_0u_{21}^5 +$$
$$u_{20}^2h_2v_{21} + u_{20}h_2^2v_{20} + u_{21}^3h_2^2v_{21} + u_{21}^2h_2v_{21}^2 +$$
$$u_{21}^3h_2u_{20}^2 + u_{21}^4h_2f_4 + u_{21}^2h_2f_3 + u_{21}^5h_2f_5 +$$
$$u_{21}h_1f_2 + h_0h_1v_{21} + h_0h_2v_{20} + u_{20}h_1v_{20} +$$
$$u_{21}^3v_{21}^2 + u_{21}^4f_2 + u_{21}^4v_{20} + u_{21}^5f_4 + u_{21}^5v_{21} +$$
$$u_{21}^4f_3 + u_{21}^6f_5 + h_0f_2 + u_{21}h_1v_{21}^2 + u_{21}^2h_1v_{20} +$$
$$u_{21}^2h_1f_4 + u_{20}h_1f_3 + u_{21}^8 + u_{21}^2h_2f_2 + h_0u_{21}^3f_5 +$$
$$u_{21}h_1h_2v_{20} + u_{20}^3h_1 + h_0u_{21}^2v_{21} + h_0u_{21}^2f_4 +$$
$$h_0u_{21}f_3 + u_{20}^4 + u_{20}h_1u_{21}^2 + u_{20}u_{21}^2v_{20} +$$
$$u_{20}u_{21}^2f_3 + u_{20}u_{21}^4f_5 + h_0u_{21}v_{20} + u_{20}h_1u_{21}^2f_5 +$$
$$u_{21}^2h_2^2v_{20} + u_{20}h_2f_2 + u_{20}^3u_{21}^2 + u_{20}u_{21}^6 +$$
$$u_{20}^2u_{21}^2f_5 + h_0u_{21}h_2v_{21} + u_{21}^7h_2)/r$$

$$r = u_{21}u_{21}u_{21}h_0 + (h_2h_0 + h_1u_{20})u_{21}u_{21} +$$
$$(u_{20}u_{20}h_2 + (h_0 + h_1h_2)u_{20} + h_1h_0)u_{21} +$$
$$h_0h_0 + u_{20}h_1h_1 + u_{20}u_{20}u_{20} + u_{20}u_{20}h_2h_2$$

(Step 2)
Using the condition for 3D=D+2D to have a weight=2, an equation [$t_1$=0] to be solved is produced.
To determine the condition for 3D=D+2D to have a weight=2,
the algorithm of 2D→3D: ExHarADD$^{3+2\to3}$ (Table 7) is examined. In step 3 in (Table 7) described above, if $$t_1=0$$

is satisfied, then the polynomial of $u_3$ in the Mumford expression of 3D determined in step 6 has a degree of 2, that is, the weight is 2. Therefore, $$t_1=0$$

is the condition for 3D=D+2D to have a weight=2.
As shown in step 2 in FIG. 10, $t_1$ is given by $$t_1=t_1(u_{12}, u_{11}, u_{10}, v_{12}, v_{11}, v_{10}, u_{21}, u_{20}, v_{21}, v_{20})$$

which is a function of coefficients appearing in the Mumford expressions of D and 2D shown below.

$$D=(x^2+u_{21}x+u_{20}, v_{21}x+v_{20})$$

$$2D=(x^3+u_{12}x^2+u_{11}x+u_{10}, v_{12}x^2+v_{11}x+v_{10})$$

More specifically, $t_1=t_1(u_{12}, u_{11}, u_{10}, v_{12}, v_{11}, v_{10}, u_{21}, u_{20}, v_{21}, v_{20})$ is given by (Equation 7) shown below.

(Equation 6)

[Mathematic Expression 27]

$$t1 = u_{11}v_{20} + u_{10}v_{11} + u_{20}v_{20} + u_{21}^2v_{10} +$$
$$u_{21}u_{20}v_{11} + u_{11}v_{10} + u_{11}v_{12}u_{20} +$$
$$u_{20}^2v_{12} + u_{10}v_{21} + u_{21}u_{12}v_{20} +$$
$$u_{20}u_{12}v_{21} + u_{20}u_{12}v_{11} + u_{21}^2v_{20} + u_{20}v_{10} +$$
$$u_{21}u_{20}v_{21} + u_{21}u_{12}v_{10} + u_{10}v_{12}u_{21}$$

(Equation 7)

The (Equation 7) is rewritten into a simpler form expressed using only coefficients ($u_{21}$, $u_{20}$, $v_{21}$, $v_{20}$) of the Mumford expression of D shown below.

$$D=(x^2+u_{21}x+u_{20}, v_{21}x+v_{20})$$

Herein, the coefficients are given by the relational expressions determined in step 1, that is, given by $$u_{12}=u_{12}(u_{21}, u_{20}, v_{21}, v_{20})$$

$$u_{11}=u_{11}(u_{21}, u_{20}, v_{21}, v_{20})$$

$$u_{10}=u_{10}(u_{21}, u_{20}, v_{21}, v_{20})$$

$$v_{12}=v_{12}(u_{21}, u_{20}, v_{21}, v_{20})$$

$$v_{11}=v_{11}(u_{21}, u_{20}, v_{21}, v_{20})$$

$$v_{10}=v_{10}(u_{21}, u_{20}, v_{21}, v_{20})$$

Thus, the conditional expression $$t_1=t_1(u_{21}, u_{20}, v_{21}, v_{20})=0$$

has been determined.
(Step 3)
Next, as shown in step 3 in FIG. 10, parameters appearing in the conditional expression determined in step 2, that is, parameters ($u_{21}$, $u_{20}$, $v_{21}$, $v_{20}$) appearing in the following expression $$t_1=t_1(u_{21}, u_{20}, v_{21}, v_{20})=0$$

are expressed using points $P(x_1, y_1)$ and $Q(x_2, y_2)$ on the hyperelliptic curve.

As described above, any reduced divisor D of genus 3 can be expressed in the Mumford form using a set of polynomials of degree 3 or less whose coefficients are elements of the finite field $F_q$, as follows:

$$(U, V)=(x^3+u_2x^2+u_1x+u_0, v_2x^2+v_1x+v_0)$$

and the hyperelliptic curve C of genus g is defined by the following equation.

$$y^2+h(x)y=f(x)$$

where h(x), f(x)∈$F_q$[x], and f(x) is a monic polynomial of degree 2g+1. If, according to the definition of the Mumford expression, the parameters ($u_{21}$, $u_{20}$, $v_{21}$, $v_{20}$) appearing in the following expression $$t_1=t_1(u_{21}, u_{20}, v_{21}, v_{20})=0$$

are expressed using points $P(x_1, y_1)$ and $Q(x_2, y_2)$ on the hyperelliptic curve, then the relational expression shown in step 3 in FIG. 10, that is, (Equation 8) shown below is obtained.

$$u_{21}=x_1+x_2$$

$$u_{20}=x_1x_2$$

$$v_{21}=(y_1+y_2)/(x_1+x_2)$$

$$v_{20}=v_{21}x_1+y_1$$

(Equation 8)

According to (Equation 8) described above, the conditional expression $$t_1 = t_1(u_{21}, u_{20}, v_{21}, v_{20}) = 0$$

is rewritten into (Equation 9) shown below.

$$t_1 = t_1(x_1, x_2, y_1, y_2) = 0 \quad \text{(Equation 9)}$$

(Step 4)

Figure 10:
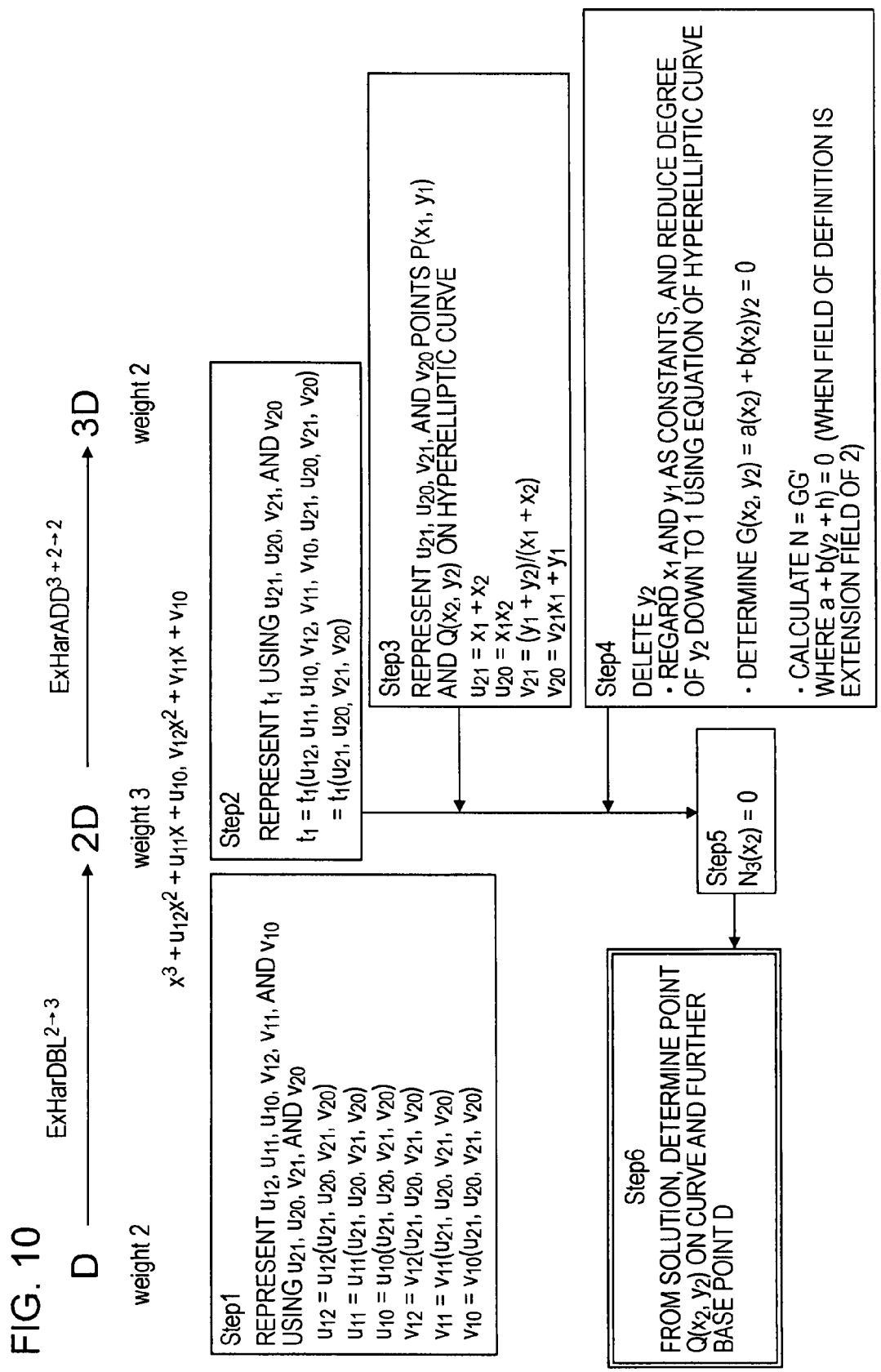
FIG. 10 is a diagram showing the details of a process of detecting a divisor D used as a base point and a divisor 3D on a curve of genus (g) of 3 such that both D and 3D are degenerate divisors with a weight=2.

As shown in step 4 in FIG. 10, in the conditional expression $$t_1 = t_1(x_1, x_2, y_1, y_2) = 0$$

obtained in step 2, if $x_1$ and $y_1$ are regarded as constants, the above expression becomes a function of $x_2$ and $y_2$. The degree of $y_2$ in this expression is reduced in a similar manner to the process of producing (Equation 3b) for the case of genus=2, by using $$y^2 + h(x)y = f(x)$$

which defines the hyperelliptic curve. Using the resultant expression, (Equation 9) is formally expressed as follows.

$$G_3(x_2, y_2) = a_3(x_2) + b_3(x_2)y_2 = 0$$

Furthermore, if a polynomial conjugate to $G_3$ is defined as follows $$G_3' = a_3(x2) + b_3(x_2)(y_2 + h(x_2))$$

then $$N_3 = G \times G' = a^2 + abh + b^2 f$$

is obtained and thus finally an one-variable equation (Equation 10) of $x_2$ is obtained as shown below.

$$N_3(x_2) = 0 \quad \text{(Equation 10)}$$

(Step 5)

If $$N_3(x_2) = 0 \quad \text{(Equation 10)}$$

has a solution with respect to $x_2$, then, using the (Equation 8), that is, $$u_{21} = x_1 + x_2$$

$$u_{20} = x_1 x_2$$

$$v_{21} = (y_1 + y_2)/(x_1 + x_2)$$

$$v_{20} = v_{21} x_1 + y_1$$

the divisor $D = (x^2 + u_{21}x + u_{20}, v_{21}x + v_{20})$ can be determined.

More specifically, as a result of the steps described above, an one-variable polynomial of degree 29 with respect to $x_2$ is obtained. As with the case of genus (g)=2, It is known that one-variable polynomial equations of finite degree can be generally solved within a polynomial time. Solutions with respect to $x_2$ are determined for the respective polynomial equations.

(Step 6)

If the solution with respect to $x_2$ of $$N_3(x_2) = 0$$

is determined, then $x_2$ is substituted into the equation $$y^2 + h(x)y = f(x)$$

which defines the hyperelliptic curve, thereby determining $y_2$.

Furthermore, from points $P(x_1, y_1)$ and $Q(x_2, y_2)$ on the hyperelliptic curve, the base point D is determined as follows.

$$D = (x^2 + u_{21}x + u_{20}, v_{21}x + v_{20})$$

The base point D determined in the above-described manner is a degenerate divisor with a weight=2, and it is guaranteed that 3D is also a degenerate divisor with a weight=2.

Figure 11:
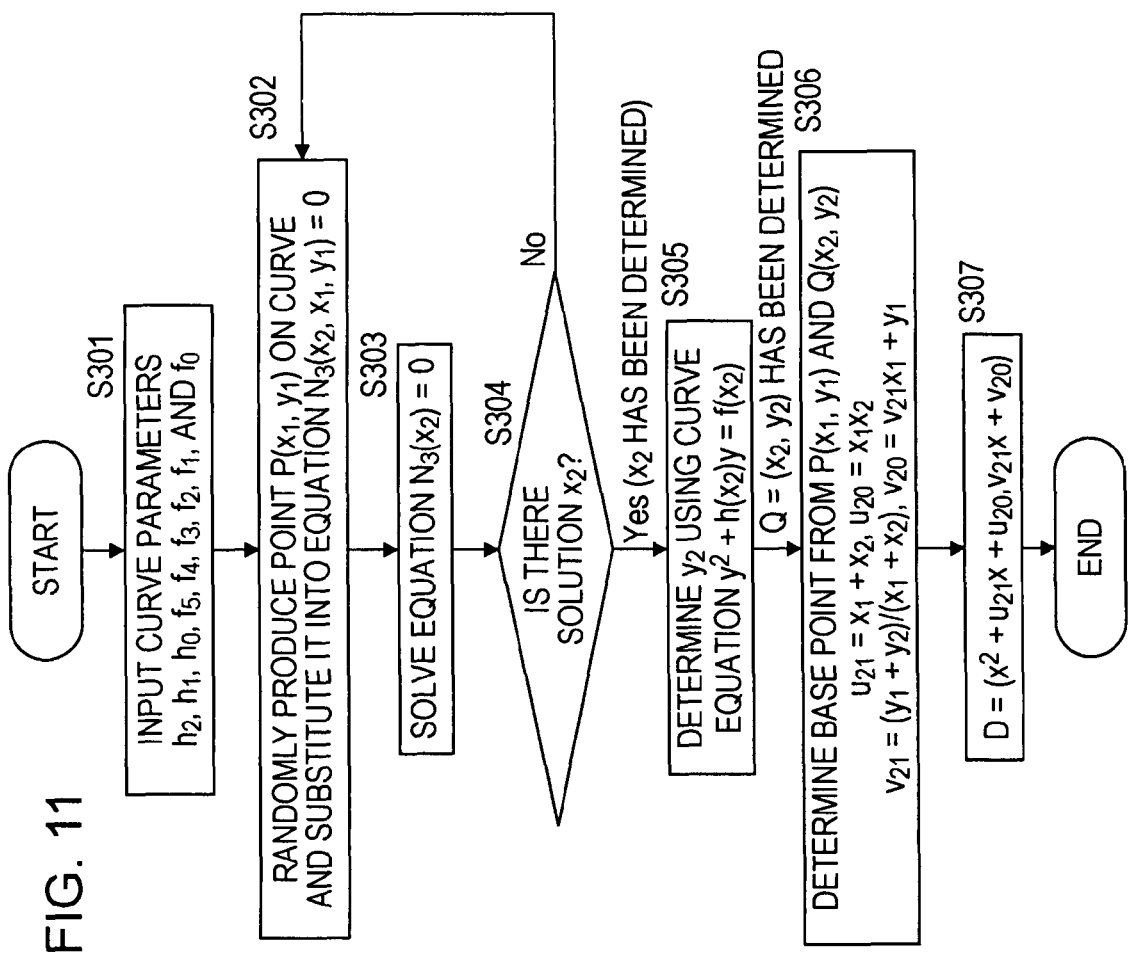
FIG. 11 is a flow chart showing the details of a process of detecting a divisor D used as a base point and a divisor 3D on a curve of genus (g) of 3 such that both D and 3D are degenerate divisors with a weight=2.

Now, referring to a flow chart shown in FIG. 11, a process of producing degenerate divisors D and 3D is described below. First, in step S301, parameters of the hyperelliptic curve are input. As described above, a hyperelliptic curve is characterized by genus g. When $q=p^n$ where p is a prime and n is a positive integer, a hyperelliptic curve C of genus g defined over a finite field $F_q$ is defined by the following equation:

$$y^2 + h(x)y = f(x)$$

where $h(x)$, $f(x) \in F_q[x]$, and $f(x)$ is a monic polynomial of degree $2g+1$.

More specifically, the hyperelliptic curve equation $y^2 + h(x) = f(x)$ is defined by $$h(x) = x^3 + h_2 x^2 + h_1 x + h_0, \text{ and}$$

$$f(x) = x^7 + f_5 x^5 + f_4 x^4 + f_3 x^3 + f_2 x^2 + f_1 x + f_0$$

Thus, as described above, the hyperelliptic curve of genus g=3 has been defined by setting the parameters $h_2$, $h_1$, $h_0$, $f_5$, $f_4$, $f_3$, $f_2$, $f_1$, and $f_0$.

In step S302, a point $P(x_1, y_1)$ on the hyperelliptic curve is randomly produced and substituted into an equation $N_3(x_2, x_1, y_1) = 0$. This equation $$N_3(x_2, x_1, y_1) = 0$$

is obtained from the condition that in the algorithm of 2D→3D: ExHarADD$^{3+2 \to 3}$ (Table 7) that is, in step 3 in (Table 7), $$t_1 = 0$$

should be satisfied in order for 3D=D+2D to have a weight 2.

More specifically, if, according to the definition of the Mumford expression, the parameters $(u_{21}, u_{20}, v_{21}, v_{20})$ appearing in the following expression $$t_1 = t_1(u_{21}, u_{20}, v_{21}, v_{20}) = 0$$

are expressed using points $P(x_1, y_1)$ and $Q(x_2, y_2)$ on the hyperelliptic curve, then the relational expression shown below is obtained.

$$u_{21} = x_1 + x_2$$

$$u_{20} = x_1 x_2$$

$$v_{21} = (y_1 + y_2)/(x_1 + x_2)$$

$$v_{20} = v_{21} x_1 + y_1$$

Herein, the conditional expression is set as below.

$$t_1 = t_1(x_1, x_2, y_1, y_2) = 0$$

Herein, if $x_1$ and $y_1$ are regarded as constants, the above expression becomes a function of $x_2$ and $y_2$. The degree of $y_2$ in this expression is reduced by using the equation $y^2 + h(x)y = f(x)$ which defines the hyperelliptic curve. Furthermore, $$t_1 = t_1(x_1, x_2, y_1, y_2) = 0$$

is rewritten as $$G_3(x_2, y_2) = a_3(x_2) + b_3(x_2)y_2 = 0.$$

Herein, if a polynomial conjugate to $G_3$ is defined as follows $$G_3' = a_3(x2) + b_3(x_2)(y_2 + h(x_2))$$

then $$N_3 = G \times G' = a^2 + abh + b^2 f$$

is obtained.

In step S303, from $N_3 = G \times G' = a^2 + abh + b^2 f$, an equation (Equation 10) including only $x_2$ as a variable is obtained as shown below.

$$N_3(x_2) = 0$$

The solution $x_2$ of this equation is determined.
If the equation $$N_3(x_2) = 0$$

does not have a solution (that is, if the answer to step S2304 is No), the process returns to step S302 to set the parameters $h_2$, $h_1$, $h_0$, $f_5$, $f_5$, $f_3$, $f_2$, $f_1$, and $f_0$ to other values and perform the calculation to find the solution ($x_2$).

If the solution ($x_2$) has been found (that is, if the answer to step S304 is Yes), the process proceeds to step S305. In step S305, $x_2$ is substituted into the hyperelliptic curve $y^2 + h(x) = f(x)$, and $y_2$ is determined. Furthermore, in steps S306 and S307, from points $P(x_1, y_1)$ and $Q(x_2, y_2)$ on the hyperelliptic curve, the base point D is determined as follows.

$$D = (x^2 + u_{21}x + u_{20}, v_{21}x + v_{20})$$

The base point D determined in the above-described manner is a degenerate divisor with a weight=2, and it is guaranteed that 3D is also a degenerate divisor with a weight=2.

(Process B2) Process of performing scalar multiplication using the precalculated data expressed only by the degenerate divisors D and 3D Now, an algorithm of a process of performing the scalar multiplication [D=dD] using the precalculated [±D,±3] expressed using only degenerate divisors D and 3D is described below. In this algorithm, the window size in the window algorithm (wNAF) is set to 2, and data [±D, ±3] are necessary as precalculated data, which can be directly calculated from the degenerate divisors D and 3D obtained by the above-described process. Therefore, unlike the previous algorithm for genus=2 in which the window size is set to 3, the conversion process using the conversion table is not necessary.

The algorithm of the scalar multiplication is shown below in [Algorithm 8].
[Mathematic Expression 28]

---
Scalar Multiplication (Algorithm8)
Input: wNAF d[i], base point D, degenerate divisors D, 3D
Output.dD 1. D ← d[n]P
2. For i from n − 1to0
   2.1. D ← 2D
   2.2. If d[i] ≠ 0 thenD ← D + d[i]D
3. Return D
---

This algorithm is different from that based on the conventional window algorithm (Algorithm 6) in that two degenerate divisors D and 3D are input and addition in step 2.2 is performed in the form of addition of a degenerate divisor and a non-degenerate divisor. Thus, as described above, and any addition operation occurring in the scalar multiplication operation is accomplished by addition of divisors including a degenerate divisor. Thus, a high-speed calculation is possible. Besides, because the addition operations do not include addition of non-degenerate divisors, there is no difference in power consumption which would otherwise occur depending on the difference in processing time between degenerate divisors and non-degenerate divisors. Thus, a high-speed calculation is achieved without causing degradation in resistance against the attack such as the SPA or the TA.

Referring to a flow chart shown in FIG. 12, there is described below a total sequence of a process of efficiently searching for degenerate divisors D and 3D on the curve of genus (g)=3 such that the base point D and 3D both have a weight=2, and performing a scalar multiplication operation by using the detected degenerate divisors D and 3D as input values.

Figure 12:
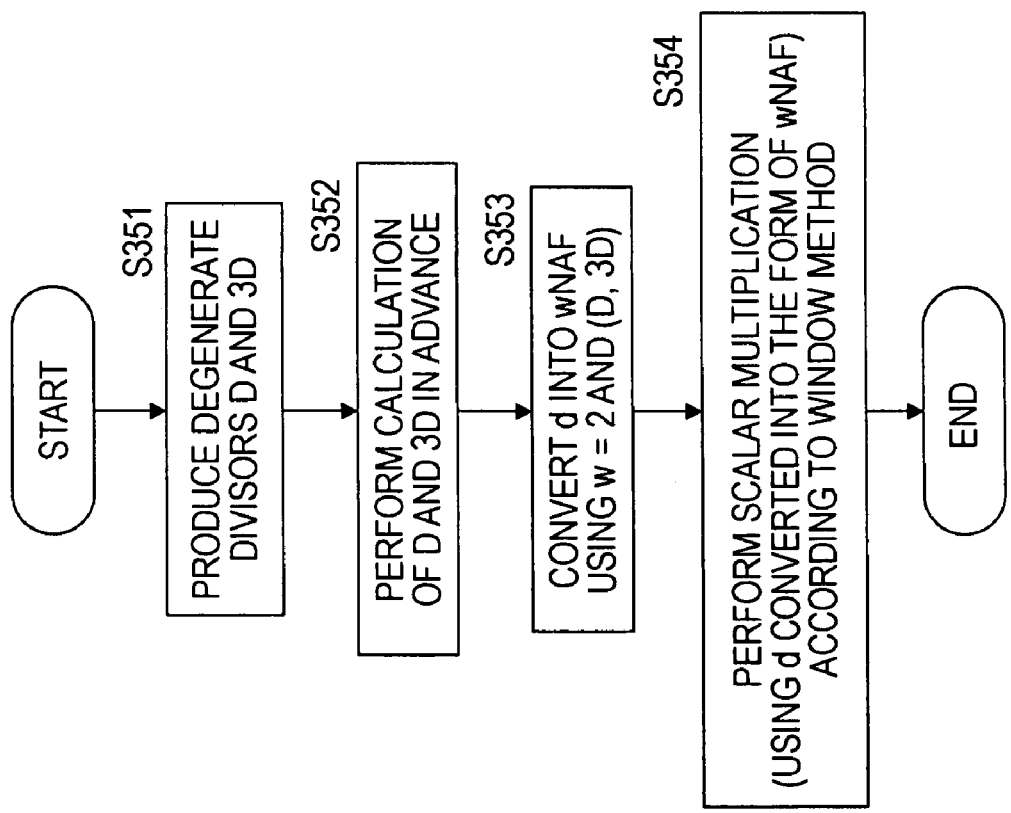
FIG. 12 is a flow chart showing a total sequence of detecting a divisor D used as a base point and a divisor 3D on a curve of genus (g) of 3 such that both D and 3D are degenerate divisors with a weight=2, converting wNAF data into modified wNAF data expressed using only the detected degenerate divisors D and 3D, and performing a scalar multiplication operation using the modified wNAF data.

First, in step S351 in FIG. 12, a divisor is detected such that the base point [D] and [3D] are both degenerate divisors with a weight=2. The detection of such a divisor can be accomplished by the process described above with reference to FIGS. 10 and 11. That is, in step 3 of the algorithm of 2D→3D: ExHarADD$^{3+2 \to 3}$ (Table 7), $$t_1 = 0$$

should be satisfied in order for 3D=D+2D to have a weight 2, and thus the following equation should hold.

$$N_3(x_2) = 0$$

The solution ($x_2$) of the above equation is determined, and the resultant value $x_2$ is substituted into the equation $y^2 + h(x) = f(x)$ which defines the hyperelliptic curve. From points $P(x_1, y_1)$ and $Q(x_2, y_2)$ on the hyperelliptic curve, the base point D is determined as follows.

$$D = (x^2 + u_{21}x + u_{20}, v_{21}x + v_{20})$$

In step S352, another degenerate divisor 3D is precalculated from the base point D calculated in step S351. This can be accomplished by performing a sequence of operations described below.

$$D \to 2D: \text{ExHarDBL}^{1 \to 2} \text{ (Table 8)}$$

$$2D \to 3D: \text{ExHarADD}^{3+2 \to 3} \text{ (Table 7)}$$

In step S353, the scalar value d given as the multiplier used in the scalar multiplication operation d=dD is converted into the wNAF form.

Finally, in step S354, the scalar multiplication operation D=dD is performed. This scalar multiplication operation is performed using the precalculated data expressed only by the degenerate divisors D and 3D according to [Algorithm 8] described above.

In the conventional calculation technique using the wNAF, the addition operation is performed using a non-degenerate divisor having a weight=3. In contrast, in the addition operation in the scalar multiplication operation according to the present algorithm, the addition operation is performed using only the degenerate divisors D and 3D, that is, the addition operation is accomplished by adding a degenerate divisor and a non-degenerate divisor. Thus, a high-speed calculation is possible. Besides, because the addition operations do not include addition of non-degenerate divisors, there is no difference in power consumption which would otherwise occur depending on the difference in processing time between degenerate divisors and non-degenerate divisors. Thus, a high-speed calculation is achieved without causing degradation in resistance against the attack such as the SPA or the TA.

The two algorithms of setting a degenerate divisor as a base point and performing the scalar multiplication operation using the window algorithm according to the present invention, that is, the following two algorithms have been described above.

(Algorithm A) Algorithm of efficiently searching for degenerate divisors D and 5D on a curve of genus (g)=2 such that the base point D and 5D both have a weight=1, converting wNAF data into a modified wNAF form expressed using only the detected degenerate divisors D and 5D, and performing the scalar multiplication using the resultant modified wNAF data (Algorithm B) Algorithm of efficiently searching for degenerate divisors D and 3D on a curve of genus (g)=3 such that the base point D and 3D both have a weight=2, expressing the wNAF data using only the detected degenerate divisors D and 3D, and performing the scalar multiplication using the resultant converted wNAF data As described above, the present invention makes it possible to apply the window algorithm to the scalar multiplication operation in the processing of the hyperelliptic curve cryptography using degenerate divisors while maintaining high security against the SPA. The algorithm according to the present invention makes it possible to perform the scalar multiplication operation at a higher speed than conventional techniques. The amount of computation needed in the algorithm according to the present invention and that needed in the conventional algorithm are shown below.

First, the amount of computation needed to perform the scalar multiplication on d with a length of 160 bits in the cryptographic processing with genus of 2 is shown for the following three algorithm.

(Algorithm According to the Present Invention A)

In this algorithm, as described above, degenerate divisors D and 5D on the curve of genus (g)=2 are searched for in a highly efficient manner such that the base point D and 5D both have a weight=1, wNAF data is converted into a modified wNAF form expressed using only the detected degenerate divisors D and 5D, and the scalar multiplication is performed using the resultant modified wNAF data.

Conventional algorithm A=(1A) Algorithm in which a degenerate divisor is used as the base point Conventional algorithm B=(1B) Algorithm based on the window algorithm (using window size=2)

Conventional Algorithm A: 318I+6028M

Conventional Algorithm B: 239I+6293M

Algorithm According to the Present Invention A: 267I+5477M

In the above description, I denotes the cost for the division operation on an element of the finite field, and M denotes the cost for the multiplication operation on an element of the finite field. The lower in cost, the greater in efficiency of the algorithm. The amount of computation has been estimated based on the amount of computation of divisors using the calculation formulae of Algorithm 1 to 9 described above. Note that "Conventional Algorithm A" corresponds to "Algorithm 3", Conventional Algorithm B" corresponds to "Algorithm 5", and Algorithm According to the Present Invention A" corresponds to "Algorithm 7".

For example, the cost for Conventional Algorithm A is calculated as follows.

$$(I+7M)+(I+27M)+158\times\{(I+27M)+(I+11M)\}=318I+6028M$$

I and M vary depending on the computer used. In the estimation, it was assumed that I=4M. The result of the estimation performed under the above assumption indicates that "Algorithm According to the Present Invention A" (computation cost=267I+5477M) is higher in the processing speed by about 10% than "Conventional Algorithm A" (computation cost=318I+6028M). Algorithm According to the Present Invention A" (computation cost=267I+5477M) is also higher in the processing speed by about 10% than "Conventional Algorithm B" (computation cost=239I+6293M). In the comparison between "Conventional Algorithm B" and "Algorithm According to the Present Invention A", the number of precalculated data was set to be equal to each other. That is, in "Conventional Algorithm B", the window size was set to 2 (the precalculated data=D and 3D), while in "Algorithm According to the Present Invention A", the window size was set to 3 (the precalculated data=D and 5D (degenerate divisors)).

Next, the amount of computation needed to perform the scalar multiplication on d with a length of 160 bits in the cryptographic processing with genus of 3 is shown for the following three algorithm.

(Algorithm According to the Present Invention B)

In this algorithm, as described above, degenerate divisors D and 3D on the curve of genus (g)=3 are searched for in a highly efficient manner such that the base point D and 5D both have a weight=2, wNAF data is converted into a modified wNAF form expressed using only the detected degenerate divisors D and 3D, and the scalar multiplication is performed using the resultant modified wNAF data.

Conventional algorithm A=(1A) Algorithm in which a degenerate divisor (with weight=2) is used as the base point Conventional algorithm B=(1B) Algorithm based on the window algorithm (using window size=2)

Conventional Algorithm A: 318I+21111M

Conventional Algorithm B: 239I+19119M

Algorithm According to the Present Invention B: 239I+17003M

The amount of computation has been estimated based on the amount of computation of divisors using the calculation formulae of Algorithm 1 to 9 described above. Note that "Conventional Algorithm A" corresponds to "Algorithm 3", Conventional Algorithm B" corresponds to "Algorithm 5", and Algorithm According to the Present Invention B" corresponds to "Algorithm 8".

In the estimation, it was also assumed that I=4M as with the case of the genus=2. The result of the estimation indicates that "Algorithm According to the Present Invention A" (computation cost=239I+17003M) is higher in the processing speed by about 20% than "Conventional Algorithm A" (computation cost=318I+21111M). Algorithm According to the Present Invention A" (computation cost=239I+17003M) is higher in the processing speed by about 11% than "Conventional Algorithm B" (computation cost=239I+17003M). In the comparison, the window size was set to 2 for all algorithms (the precalculated data=D and 3D).

In the present invention, as described above, a degenerate divisor with a weight smaller than the genus g of the hyperelliptic curve is used as the base point, and precalculated data used in the window algorithm are expressed using degenerate divisors. The addition operation in the scalar multiplication is performed in the form of addition between a non-degenerate divisor and a degenerate divisor thereby achieving a high-speed operation. Because the addition operation is limited to the form of addition of a degenerate divisor and a non-degenerate divisor, a high-speed calculation is achieved without causing degradation in security against the attack (SPA or TA) based on the variation in the power consumption or the processing time.

In the cryptographic processing operation including the operation of divisors on the hyperelliptic curve, the scalar multiplication operation of divisors needs a long processing time. Use of the above-described algorithm according to the present invention makes it possible to increase the processing speed of the scalar multiplication operation, and thus a great improvement in the processing speed of the hyperelliptic curve cryptography is achieved.

As described above, the hyperelliptic curve cryptography (HECC) is generalization of the elliptic curve cryptography (ECC) and can be applied to a wide variety of cryptographic processes based on the elliptic curve cryptography (ECC) such as digital signature, encryption of data, decryption of encrypted data, processing of a common encryption key, authentication processing, etc. By replacing the conventional scalar multiplication operation in the process of the elliptic curve cryptography (ECC) by the scalar multiplication operation according to the present invention, it is possible to increase the processing speed.

3. Functional Configuration of Cryptographic Processing Apparatus

Figure 13:
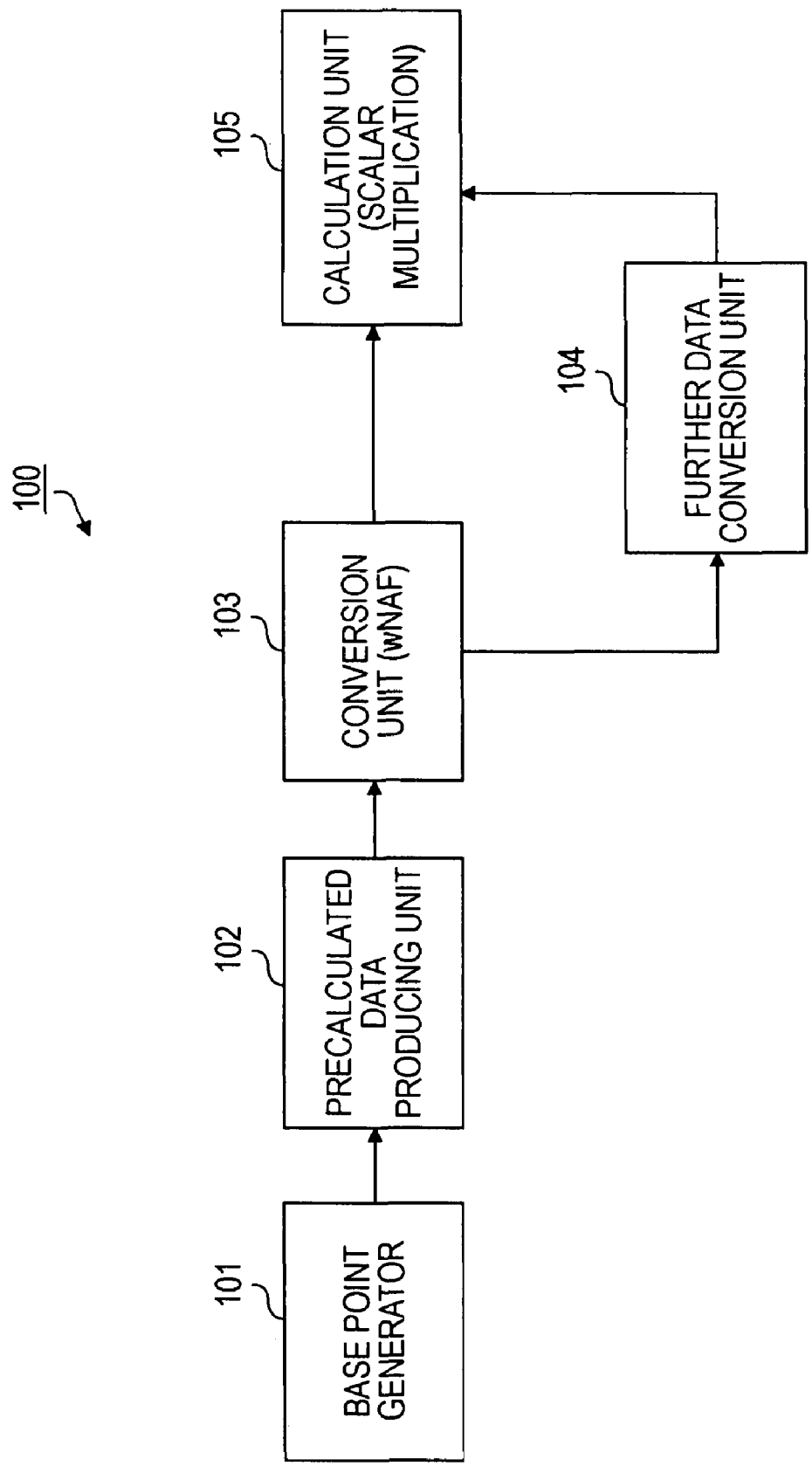
FIG. 13 is a block diagram showing a functional configuration of a cryptographic processing apparatus according to an embodiment of the present invention.

FIG. 13 is a block diagram showing a functional configuration of a cryptographic processing apparatus according to an embodiment of the present invention. The cryptographic processing apparatus 100 is configured to perform a cryptographic processing operation based on hyperelliptic curve cryptography. The cryptographic processing apparatus 100 includes a base point producing unit 101 configured to produce, as a base point, a degenerate divisor D with a weight $g_0$ smaller than genus g of a hyperelliptic curve (where $1 \leq g_0 < g$) such that, in addition to the base point, one or more divisors needed to produce precalculated data used in the window algorithm, such as 5D in Algorithm A or 3D in Algorithm B, are also degenerate divisors.

A precalculated data producing unit 102 serves as precalculated data producing means for producing precalculated degenerate divisor data such as 3D or 5D from the base point D produced by the base point producing unit 101.

The cryptographic processing apparatus 100 also includes a conversion unit 103 configured to convert a scalar value d given as a multiplier to be multiplied with the divisor D in the scalar multiplication operation [D=dD] into WNAF data, a further-conversion unit 104 configured to further convert the wNAF data produced by the conversion unit 103 in accordance with a conversion table so as to produce modified wNAF data expressed using only degenerate divisors, and an operation unit 105 configured to perform the scalar multiplication operation to produce a scalar product of divisors including the divisor set as the base point.

The base point producing unit 101 is configured to randomly select $g_0$ elements on the finite field $F_q$ given as the field of definition thereby producing $g_0$ points $P_i$ ($i=1, \ldots, g_0$) on the hyperelliptic curve, determine coefficients $v_i$ of $$U(x) = (x-x_1)(x-x_2) \ldots (x-x_{g0}), \text{ and}$$

$$V(x) = v_{g0-1}x^{g0-1} + v_{g0-2}x^{g0-2} + \ldots + v_0$$

thereby determining the divisor of the base point $D_0 = (U(x), V(x))$.

More specifically, for example, the base point producing unit 101 produces, as the base point, a degenerate divisor with a weight=1 when the genus g of the hyperelliptic curve is 2. When the genus g of the hyperelliptic curve is 3, the base point producing unit 101 produces, as the base point, a degenerate divisor with a weight=1 or 2. In the above-described process of producing the base point, the base point producing unit 101 produces the divisor D as the based point D such that, not only the base point but also one or more divisors needed to produce precalculated data used in the window algorithm, such as 5D in Algorithm A or 3D in Algorithm B, also become degenerate.

The precalculated data producing unit 102 produces the precalculated degenerate divisor data such as 3D or 5D used in the window algorithm from the base point D produced by the base point producing unit 101. In the case of Algorithm A (genus (g)=2), the window size is set to 3, and the degenerate divisor 5D is precalculated. In the case of Algorithm B (genus (g)=3), the window size is set to 2, and the degenerate divisor 3D is precalculated.

The conversion unit 103 converts the scalar value d given as the multiplier to be multiplied with the divisor D in the scalar multiplication operation [D=dD] into wNAF data. More specifically, the multiplier d expressed in the binary form is divided by the window (with the predetermined window size) into blocks as follows.

|00 . . . 0x|00 . . . 0x|00 . . . 0x| . . .

where x is an odd integer ($\pm 1, \pm 3, \ldots$).

The further-conversion unit 104 further converts the wNAF data produced by the conversion unit 103 in accordance with the conversion table so as to produce modified wNAF data expressed using only degenerate divisors. Note that this process is performed in Algorithm A, but this process is not necessary in Algorithm B. The reason is as follows. In Algorithm A, the window size is set to 3. In the case where the window size is set to 3 in the conventional wNAF process, $\pm D, \pm 3D, \pm 5D,$ and $\pm 7D$ are needed to be stored as precalculated data in the table. However, in Algorithm A, only degenerate divisors D and 5D are prepared as the precalculated data, and thus it is needed to convert the other precalculated data into a form expressed using only D and 5D. On the other hand, in the case of Algorithm B, the window size is set to 2, and $\pm D$ and $\pm 3D$ are needed to be stored as precalculated data in the table. Fortunately, in Algorithm B, degenerate divisors D and 3D are prepared as the precalculated data, and thus it is not needed to prepare further precalculated data, that is, it is not needed to perform the further conversion of the wNAF data.

The operation unit 105 performs the scalar multiplication operation according to Algorithm 7 (Algorithm A) or Algorithm 8 (Algorithm B) described above. In the conventional wNAF process, the addition operation is performed using a non-degenerate divisor having a weight equal to the genus (g). In contrast, in the addition operation in the scalar multiplication operation according to the present algorithm, the addition operation is accomplished for divisors including a divisor with a weight smaller than the genus (g), that is, the addition operation is accomplished by adding a degenerate divisor and a non-degenerate divisor. Thus, a high-speed calculation is possible. Besides, because the addition operations do not include addition of non-degenerate divisors, there is no difference in power consumption which would otherwise occur depending on the difference in processing time between degenerate divisors and non-degenerate divisors. Thus, a high-speed calculation is achieved without causing degradation in resistance against the attack such as the SPA or the TA.

4. Examples of Applications of the Present Invention to Production and Verification of Digital Signature A specific example of an application of the cryptographic process algorithm according to the present invention is described below. In this specific example, it is assumed that the operation algorithm according to the present invention is applied to the scalar multiplication operation in production and verification of digital signature using the elliptic curve cryptography based on ECDSA (EC-Digital Signature Algorithm). According to the IEEE1363 standard, production and verification of digital signature based on the ECDSA are performed via a sequence shown below.

(1) Input (1-1) Domain parameters of an elliptic curve and a base point G (with order r)

(1-2) Secret key s of a signer (1-3) Plaintext M (2) Key production
(2-1) For the given secret key s, W=sG is produced as a public key.
(3) Production of Signature
(3-1) Random integer 0<u<r is produced.
(3-2) V=uG=($x_v$, $y_v$) is calculated.
(3-3) $x_v$ is converted into in integer i.
(3-4) c=i mod r is calculated. If c=0 then the process returns to step 3-1.
(3-5) f=h(M), where h is a hash function.
(3-6) d=$u^{-1}$(f+sc) mod r is calculated. If d=0, then the process returns to step 3-1.
(3-7) (c, d) is employed as signature for the plaintext M.
(4) Signature Verification
(4-1) Checking is performed to determine whether 0<c<r and 0<d<r. If not so, "invalid" is output.
(4-2) h=$d^{-1}$ mod r, $h_1$=fh mod r, and $h_2$=ch mod r are calculated.
(4-3) P=($x_p$, $y_p$)=$h_1$G+$h_2$W is calculated. If P=0, then "invalid" is output.
(4-4) $x_p$ is converted into in integer i.
(4-5) c'=i mod r is calculated.
(4-6) If c'=c, "valid" is output, but otherwise, "invalid" is output.

In the algorithm described above, the technique using the hyperelliptic curve according to the present invention may be advantageously applied to the following steps.
(2-1) For the given secret key s, W=sG is produced as a public key.
(3-2) V=uG=($x_v$, $y_v$) is calculated.
(4-3) P=($x_p$, $y_p$)=$h_1$G+$h_2$W is calculated. If P=0, then "invalid" is output.

In the above steps (2-1), (3-2), and (4-3), the process W=sG, the process V=uG, and the process $h_1$ in P=($x_p$, $y_p$)=$h_1$G+$h_2$W are scalar multiplication operations of given divisors, and thus it possible to increase the processing speed by applying the technique according to the present invention.

5. Example of Hardware Configuration of Cryptographic Processing Apparatus

Finally, an example of a configuration of an IC module 200, which is a device configured to perform the cryptographic process described above, is described below with reference to FIG. 14. The process described above can be performed in a wide variety of information processing apparatus such as a PC, an IC card, and a reader/writer. The IC module 200 shown in FIG. 14 may be configured to provide desired one or more such functions.

Figure 14:
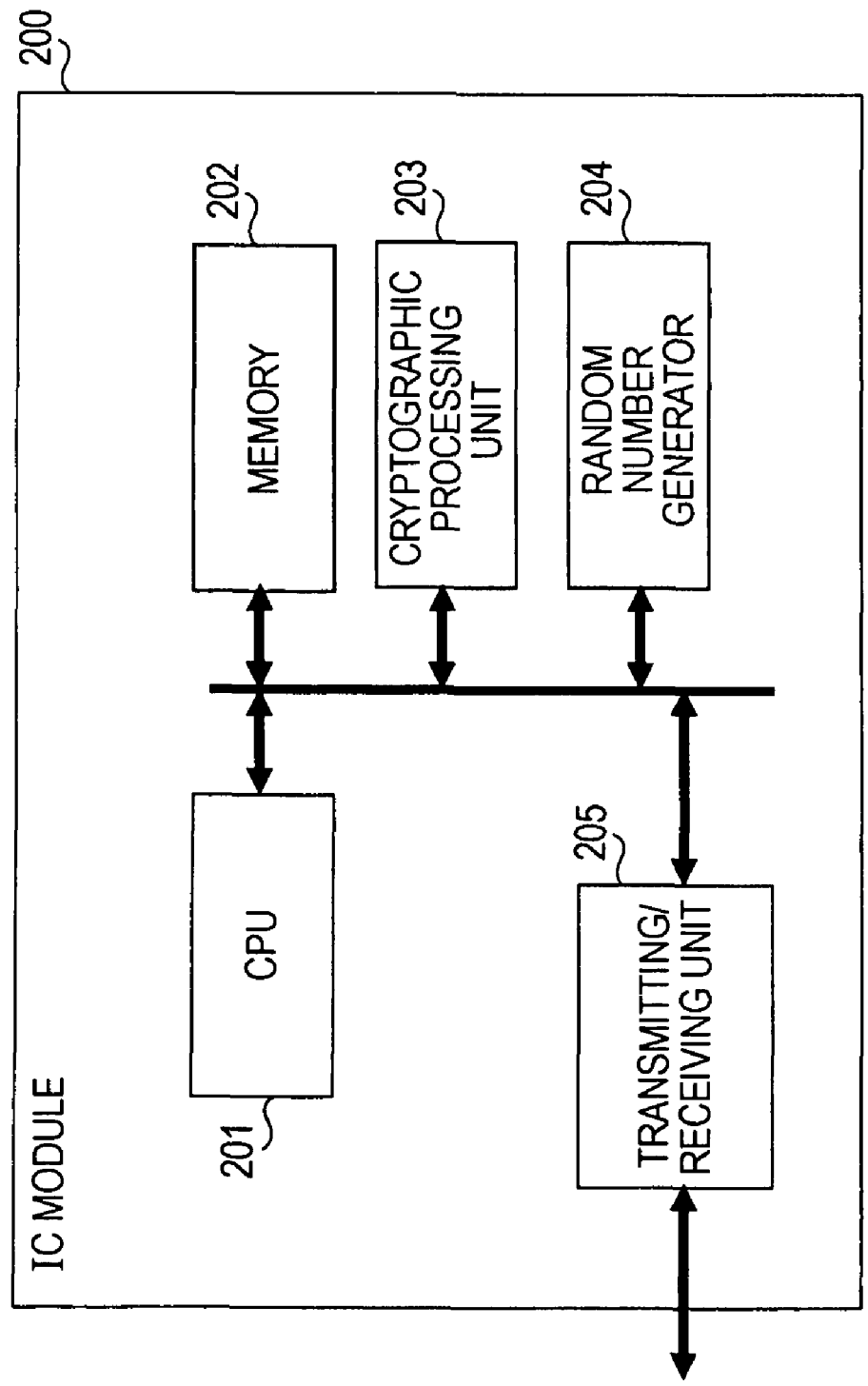
FIG. 14 is a diagram showing an example of a configuration of an IC module as an example of a device configured to perform a cryptographic process according to an embodiment of the present invention.

In FIG. 14, a CPU (Central Processing Unit) 201 is a processor configured to control start/end of the cryptographic process, a transmitting/receiving operation of data, and transferring of data among various units, and also perform various kinds of other programs. A memory 202 includes a ROM (Read Only Memory) and a RAM (Random Access Memory). The ROM is used to store a program executed by the CPU 201. The ROM is also used to store fixed data of operation parameters. The RAM is used as a work area or a storage area for storing a program executed by the CPU 201 and for storing parameters which vary during the execution of the program.

The processing program stored in the memory 202 includes a base point setting program module, a scalar multiplication operation program module, and a doubling operation program module. The memory 202 may also be used as a storage area for storing key data or the like necessary in the cryptographic process. It is desirable that the data storage area be configured so as to be secure against tampering.

A cryptographic processing unit 203 performs the encryption/decryption process including the scalar multiplication operation described above. Although in the present example, the cryptographic processing means is implemented in the form of a separate module, the cryptographic processing means may be implemented in a different manner. For example, a cryptographic processing program stored in the ROM may be read and executed by the CPU 201 thereby implementing the cryptographic processing means.

A random number generator 204 generates a random number necessary in production of a key in the cryptographic process.

A transmitting/receiving unit 205 is a data communication processing unit configured to perform data communication between the IC module and an external apparatus such as a reader/writer. More specifically, the transmitting/receiving unit 205 outputs encrypted data generated in the IC module and receives data from the external apparatus such as the reader/writer.

The present invention has been described above with reference to specific embodiments by way of example and not limitation. It should be apparent to those skilled in the art that various modifications and substitutions are possible without departing from the spirit and the scope of the invention That is, the embodiments have been described above by way of example and not limitation. The scope of the invention is to be determined solely by the claims.

Any of the processes disclosed in the present description may be performed by means of hardware, software, or a combination of hardware and software. In the case in which a process is performed by means of software, a program of the process may be installed into a memory disposed in a dedicated computer embedded in hardware and the program may be executed by the computer, or the program may be installed on a general-purpose computer capable of executing various processes and may be executed on the general-purpose computer.

The program may be stored in advance in a storage medium such as a hard disk or a ROM (Read Only Memory). The program may also be temporarily or permanently stored in a removable storage medium such as a flexible disk, a CD-ROM (Compact Disc Read Only Memory), an MO (Magneto-optical) disk, a DVD (Digital Versatile Disc), a magnetic disk, or a semiconductor memory. The program stored on such a removable storage medium may be supplied in the form of so-called packaged software.

Instead of installing the program from the removable storage medium onto the computer, the program may also be transferred to the computer from a download site via radio transmission or via a network such as an LAN (Local Area Network) or the Internet by means of wire communication. In this case, the computer receives the program transmitted in the above-described manner and installs the program on a storage medium such as a hard disk disposed in the computer.

The processes disclosed in the present description may be performed time-sequentially in the same order as that described in the program, or may be performed in parallel or individually depending on the processing power of the computer. In the present description, the term "system" is used to describe a logical collection of a plurality of devices, and it is not necessarily required that the plurality of devices be disposed in a single case.

INDUSTRIAL APPLICABILITY

In an aspect of the present invention, the base point D is produced such that the base point D and one or more of precalculated data, in addition to the base point, used in the scalar multiplication operation based on the window algorithm are degenerate divisors with a weight $g_0$ smaller than genus g of the hyperelliptic curve (where $1 \leq g_0 < g$), and the addition operation included in the scalar multiplication operation based on the window algorithm is accomplished by performing an addition operation of adding a non-degenerate divisor and a precalculated degenerate divisor. Thus, a high-speed operation is achieved. Besides, because the addition operations do not include addition of non-degenerate divisors, there is no difference in power consumption which would otherwise occur depending on the difference in processing time between degenerate divisors and non-degenerate divisors. Thus, a high-speed calculation is achieved without causing degradation in resistance against the attack such as the SPA or the TA. Therefore, the present invention can be advantageously applied to a wide variety devices such as an IC card which need a high processing speed and high security in the cryptographic processing operation.

In an aspect of the present invention, a multiplier d to be multiplied with a divisor D in the scalar multiplication operation D=dD is converted into a wNAF (width-wNon-Adjacent Form) form based on the window algorithm, thereby producing wNAF data. If precalculated data to be produced from the wNAF data produced above includes data other than the degenerate divisors, then the wNAF data is further converted so as to obtain modified wNAF data expressed only by the degenerate divisors. The degenerate divisor data are related to the modified wNAF data, and the addition operation in the scalar multiplication is performed in the form of addition between a non-degenerate divisor and a degenerate divisor. Thus, a high-speed calculation is achieved without causing degradation in resistance against the attack such as the SPA or the TA. Therefore, the present invention can be advantageously applied to a wide variety devices such as an IC card which need a high processing speed and high security in the cryptographic processing operation.

The invention claimed is:

1. A cryptographic processing method of performing a cryptographic processing operation based on hyperelliptic curve cryptography, comprising the steps of:
producing a base point such that the base point given as input divisor in a scalar multiplication operation based on the hyperelliptic curve cryptography and one or more of precalculated data, in addition to the base point, used in the scalar multiplication operation based on a window algorithm are degenerate divisors with a weight $g_0$ smaller than genus g of a hyperelliptic curve (where $1 \leq g_0 < g$);
producing precalculated degenerate divisor data used in the window algorithm from the base point produced in the base point producing step, such that the precalculated data includes only degenerate divisors; and
performing, with at least one processor, the scalar multiplication operation based on the window algorithm using the precalculated degenerate divisor data produced in the precalculated degenerate divisor data producing step such that the scalar multiplication operation is accomplished by performing an addition operation of adding degenerate divisors including a precalculated degenerate divisor.

2. The cryptographic processing method according to claim 1, wherein the operation performing step includes the steps of
converting a multiplier d to be multiplied with a divisor D in the scalar multiplication operation D=dD into a wNAF (width-wNon-Adjacent Form) form based on the window algorithm thereby producing wNAF data; and
relating the precalculated degenerate divisor data to the wNAF data produced in the conversion step.

3. The cryptographic processing method according to claim 1, wherein
the operation performing step includes the steps of
converting a multiplier d to be multiplied with a divisor D in the scalar multiplication operation D=dD into a wNAF (width-wNon-Adjacent Form) form based on the window algorithm thereby producing wNAF data;
if precalculated data to be produced from the wNAF data produced in the conversion step includes data other than the precalculated degenerate divisor data, further converting the wNAF data into modified wNAF data expressed only by the precalculated degenerate divisor data; and
relating the precalculated degenerate divisor data to the modified wNAF data produced in the further-conversion step.

4. The cryptographic processing method according to claim 1, wherein
the base point producing step is the step of
producing the base point D such that the base point D and one or more of precalculated data nD (where n is an integer other than 1) in addition to the base point used in the algorithm of executing the scalar multiplication operation based on the window algorithm are degenerate divisors with a weight $g_0$ smaller than genus g of the hyperelliptic curve (where $1 \leq g_0 < g$).

5. The cryptographic processing method according to claim 1, wherein
the cryptographic processing method is a method of performing a scalar multiplication operation on a hyperelliptic curve with genus g=2; and wherein
the base point producing step is the step of
producing the base point such that the base point D and 5D are degenerate divisors with a weight =1, and
the operation performing step includes the steps of
converting a multiplier d to be multiplied with a divisor D in the scalar multiplication operation D=dD into a wNAF (width-wNon-Adjacent Form) form based on the window algorithm using a window size =3 thereby producing wNAF data;
if precalculated data to be produced from the wNAF data produced in the conversion step includes data other than the degenerate divisor D or 5D, further converting the wNAF data into modified wNAF data expressed only by the degenerate divisors D and 5D; and
performing the addition operation included in the scalar multiplication operation such that the degenerate divisors D and 5D are related to the modified wNAF data produced in the further-conversion step, and the addition operation is performed by adding degenerate divisors including the degenerate divisor D and/or 5D.

6. The cryptographic processing method according to claim 1, wherein
the cryptographic processing method is a method of performing a scalar multiplication operation on a hyperelliptic curve with genus g=3; and wherein
the base point producing step is the step of
producing the base point such that the base point D and 3D are degenerate divisors with a weight =2, and the operation performing step includes the steps of
converting a multiplier d to be multiplied with a divisor D in the scalar multiplication operation D=dD into a wNAF (width-wNon-Adjacent Form) form based on the window algorithm using a window size =2 thereby producing wNAF data; and
performing the addition operation included in the scalar multiplication operation such that the degenerate divisors D and 3D are related to the wNAF data produced in the conversion step, and the addition operation is performed by adding degenerate divisors including the degenerate divisor D and/or 3D.

7. A cryptographic processing apparatus configured to perform a cryptographic processing operation based on hyperelliptic curve cryptography, comprising:
a base point producing means for producing a base point such that the base point given as input divisor in a scalar multiplication operation based on the hyperelliptic curve cryptography and one or more of precalculated data, in addition to the base point, used in the scalar multiplication operation based on a window algorithm are degenerate divisors with a weight $g_0$ smaller than genus g of a hyperelliptic curve (where $1 \leq g_0 < g$);
precalculated degenerate divisor data producing means for producing precalculated degenerate divisor data used in the window algorithm from the base point produced by the base point producing means, such that the precalculated data includes only degenerate divisors, said precalculated degenerate divisor data producing means including at least one processor; and
operation means for performing the scalar multiplication operation based on the window algorithm using the precalculated degenerate divisor data produced by the precalculated degenerate divisor data producing means such that the scalar multiplication operation is accomplished by performing an addition operation of adding degenerate divisors including a precalculated degenerate divisor.

8. The cryptographic processing apparatus according to claim 7, further comprising
conversion means for converting a multiplier d to be multiplied with a divisor D in the scalar multiplication operation D=dD into a wNAF (width-wNon-Adjacent Form) form based on the window algorithm, thereby producing wNAF data,
wherein the operation means performs
an operation of relating the precalculated degenerate divisor data to the wNAF data produced by the conversion means.

9. The cryptographic processing apparatus according to claim 7, further comprising
conversion means for converting a multiplier d to be multiplied with a divisor D in the scalar multiplication operation D=dD into a wNAF (width-wNon-Adjacent Form) form based on the window algorithm, thereby producing wNAF data; and
further-conversion means for, if precalculated data to be produced from the wNAF data produced by the conversion means includes data other than the precalculated degenerate divisor data, further converting the wNAF data into modified wNAF data expressed only by the precalculated degenerate divisor data,
wherein the operation means performs
an operation of relating the precalculated degenerate divisor data to the modified wNAF data produced by the further-conversion means.

10. The cryptographic processing apparatus according to claim 7, wherein
the base point producing means is configured to
produce the base point D such that the base point D and one or more of precalculated data nD (where n is an integer other than 1) in addition to the base point used in the algorithm of executing the scalar multiplication operation based on the window algorithm are degenerate divisors with a weight $g_0$ smaller than genus g of the hyperelliptic curve (where $1 \leq g_0 < g$).

11. The cryptographic processing apparatus according to claim 7, wherein
the cryptographic processing apparatus is configured to perform a scalar multiplication operation on a hyperelliptic curve with genus g=2; and wherein
the base point producing means is configured to
produce the base point such that the base point D and 5D are degenerate divisors with a weight =1, and
the base point producing means includes
conversion means for converting a multiplier d to be multiplied with a divisor D in the scalar multiplication operation D=dD into a wNAF (width-wNon-Adjacent Form) form based on the window algorithm using a window size =3 thereby producing wNAF data;
further-conversion means for, if precalculated data to be produced from the wNAF data produced by the conversion means includes data other than the degenerate divisor D or 5D, further converting the wNAF data into modified wNAF data expressed only by the degenerate divisors D and 5D; and
operation means for performing the addition operation included in the scalar multiplication operation such that the degenerate divisors D and 5D are related to the modified wNAF data produced by the further-conversion means, and the addition operation is performed by adding degenerate divisors including the degenerate divisor D and/or 5D.

12. The cryptographic processing apparatus according to claim 7, wherein
the cryptographic processing apparatus is configured to perform a scalar multiplication operation on a hyperelliptic curve with genus g=3; and wherein
the base point producing means is configured to
produce the base point such that the base point D and 3D are degenerate divisors with a weight =2, and
the base point producing means includes
conversion means for converting a multiplier d to be multiplied with a divisor D in the scalar multiplication operation D=dD into a wNAF (width-wNon-Adjacent Form) form based on the window algorithm using a window size =2 thereby producing wNAF data; and
operation means for performing the addition operation included in the scalar multiplication operation such that the degenerate divisors D and 3D are related to the wNAF data produced by the conversion means, and the addition operation is performed by adding degenerate divisors including the degenerate divisor D and/or 3D.

13. A non-transitory computer readable medium having stored therein a computer program configured to be executed on a computer to perform cryptographic processing operation based on hyperelliptic curve cryptography, the computer program comprising the steps of
producing a base point such that the base point given as input divisor in a scalar multiplication operation based on the hyperelliptic curve cryptography and one or more of precalculated data, in addition to the base point, used in the scalar multiplication operation based on a window algorithm are degenerate divisors with a weight $g_0$ smaller than genus g of a hyperelliptic curve (where $1 \leq g_0 < g$);

producing precalculated degenerate divisor data used in the window algorithm from the base point produced in the base point producing step, such that the precalculated data includes only degenerate divisors; and performing the scalar multiplication operation based on the window algorithm using the precalculated degenerate divisor data produced in the precalculated degenerate divisor data producing step such that the scalar multiplication operation is accomplished by performing an addition operation of adding degenerate divisors including a precalculated degenerate divisor.

* * * * *